(12) United States Patent
Wang et al.

(10) Patent No.: US 11,118,936 B1
(45) Date of Patent: Sep. 14, 2021

(54) SYSTEM AND METHOD FOR PERFORMING OPERATIONS ON FLIGHT SENSOR DATA

(71) Applicant: THE BOEING COMPANY, Chicago, IL (US)

(72) Inventors: Changzhou Wang, Bellevue, WA (US); Jun Yuan, Sammamish, WA (US); Darren Puigh, Bellevue, WA (US); Greg Jackson, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 332 days.

(21) Appl. No.: 16/248,682

(22) Filed: Jan. 15, 2019

(51) Int. Cl.
*G06F 9/44* (2018.01)
*G01C 23/00* (2006.01)
*B64D 43/00* (2006.01)
*G06N 20/00* (2019.01)
*G06F 8/30* (2018.01)

(52) U.S. Cl.
CPC .......... *G01C 23/005* (2013.01); *B64D 43/00* (2013.01); *G06F 8/31* (2013.01); *G06N 20/00* (2019.01)

(58) Field of Classification Search
CPC ...... G01C 23/005; B64D 43/00; G06N 20/00; G06F 8/31
USPC ........................................................ 717/108
See application file for complete search history.

(56) References Cited

U.S. PATENT DOCUMENTS

| 10,007,513 | B2 * | 6/2018 | Malladi | G06F 8/70 |
| 2007/0006188 | A1 * | 1/2007 | Schroth | G06F 8/447 717/140 |
| 2008/0228331 | A1 | 9/2008 | McNerney et al. | |
| 2010/0082556 | A1 * | 4/2010 | Srinivasan | G06F 16/972 707/693 |
| 2013/0197725 | A1 | 8/2013 | O'Dell et al. | |
| 2013/0197739 | A1 | 8/2013 | Gallagher et al. | |
| 2016/0314692 | A1 * | 10/2016 | Bahrami | G08G 5/0013 |
| 2017/0032263 | A1 * | 2/2017 | Yuan | G06N 5/045 |
| 2017/0337754 | A1 * | 11/2017 | Wang | B64D 45/0005 |

\* cited by examiner

*Primary Examiner* — Anna C Deng
(74) *Attorney, Agent, or Firm* — Moore IP Law

(57) ABSTRACT

A method for performing an operation on a flight sensor parameter includes receiving instructions indicating a description of a flight sensor parameter and an operation to be performed on the flight sensor parameter. The method includes generating executable code based on the instructions indicating the description and the operation. The method includes, after generating the executable code, associating the executable code with flight sensor data from one or more sensors. The flight sensor parameter includes a variable of the flight sensor data. The method further includes executing the executable code at a processor using the flight sensor data as an input to generate an output that indicates results of the operation.

20 Claims, 43 Drawing Sheets

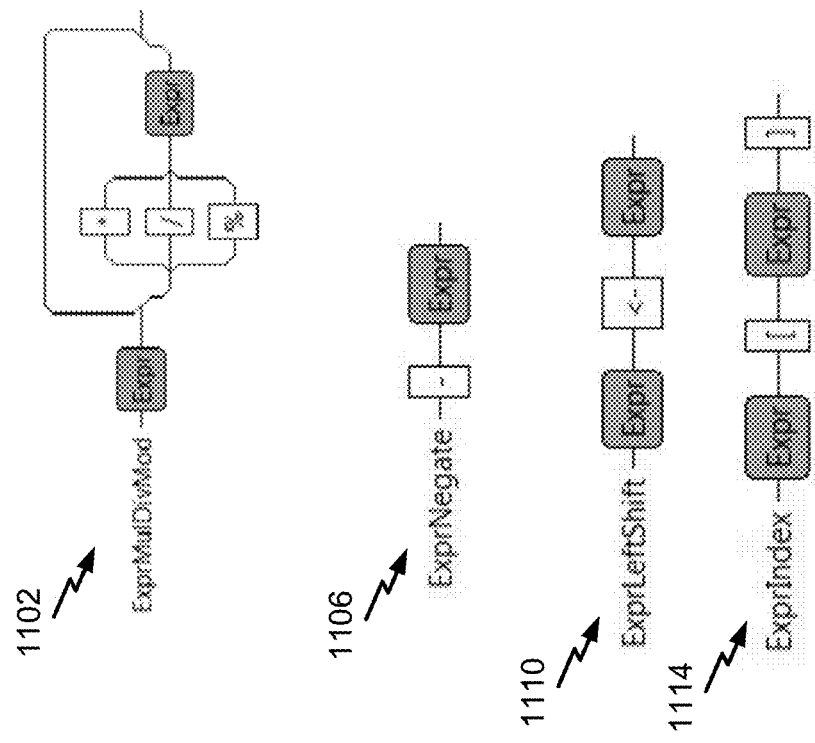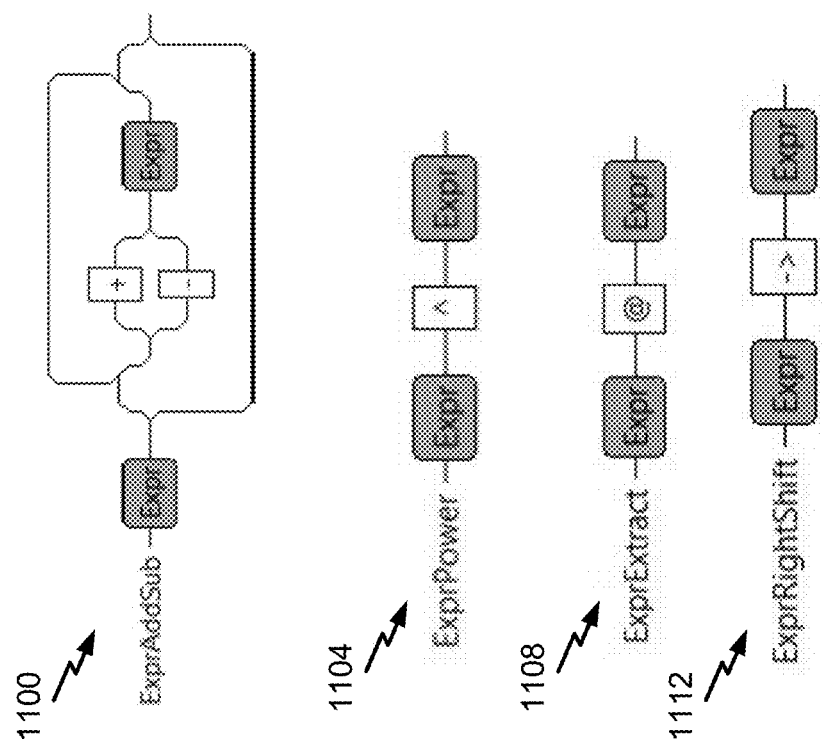
FIG. 11

SYSTEM AND METHOD FOR PERFORMING OPERATIONS ON FLIGHT SENSOR DATA

FIELD OF THE DISCLOSURE

The present disclosure is generally related to performing operations on flight sensor data.

BACKGROUND

Improvements in technology have led to an increasing number of sensors on board vehicles, such as aircraft, automobiles, ships, drones, rockets, spacecraft, and so forth. These sensors may record data before, during, and after transit of the vehicles. For example, parametric flight data may be recorded by a Flight Data Recorder (FDR), a Quick Access Recorder (QAR), a Continuous Parameter Logging (CPL) System, an Enhanced Airborne Flight Recorder (EAFR), or other types of sensor systems. This sensor data can be used for a variety of purposes.

Common analysis tasks that rely on flight sensor data often involve manipulation of recorded samples of different sensor parameters (e.g., variables). To enable such analysis tasks, generic visualization and analysis tools, such as Python, can be used. However, these generic visualization and analysis tools can be complex and require hands-on experience with computer programming. For example, such tools often require analysts to perform in-depth and technical operations to load data from different sources, clean up flight sensor data readings, and transform and combine sample values in order to generate a usable output. Due to these operations, it can be difficult for engineers or data analysts who lack computer programming knowledge to use these tools. Additionally, computer code that is generated to perform such technical operations can contain errors, which can lead to significant debugging time and resource usage.

SUMMARY

In a particular implementation, a method for performing an operation on a flight sensor parameter includes receiving instructions indicating a description of a flight sensor parameter and an operation to be performed on the flight sensor parameter. The method includes generating executable code based on the instructions indicating the description and the operation. The method includes, after generating the executable code, associating the executable code with flight sensor data from one or more sensors. The flight sensor parameter includes a variable of the flight sensor data. The method further includes executing the executable code at a processor using the flight sensor data as an input to generate an output that indicates results of the operation.

In another particular implementation, a system for performing an operation on a flight sensor parameter includes a processor and a memory coupled to the processor and storing instructions executable by the processor to perform operations including receiving instructions indicating a description of a flight sensor parameter and an operation to be performed on the flight sensor parameter. The operations include generating executable code based on the instructions indicating the description and the operation. The operations include, after generating the executable code, associating the executable code with the flight sensor data. The flight sensor parameter includes a variable of the flight sensor data. The operations further include executing the executable code using the flight sensor data as an input to generate an output that indicates results of the operation.

In another particular implementation, a computer-readable storage device stores instructions that, when executed by a processor, cause the processor to perform operations to perform an operation on a flight sensor parameter, the operations including receiving instructions indicating a description of a flight sensor parameter and an operation to be performed on the flight sensor parameter. The operations include generating executable code based on the instructions indicating the description and the operation. The operations include, after generating the executable code, associating the executable code with flight sensor data from one or more sensors. The flight sensor parameter includes a variable of the flight sensor data. The operations further include executing the executable code using the flight sensor data as input to generate an output that indicates results of the operation.

BRIEF DESCRIPTION OF THE DRAWINGS

FIG. 11 illustrates examples of syntax diagrams of elements of PML;

DETAILED DESCRIPTION

Figure 1:
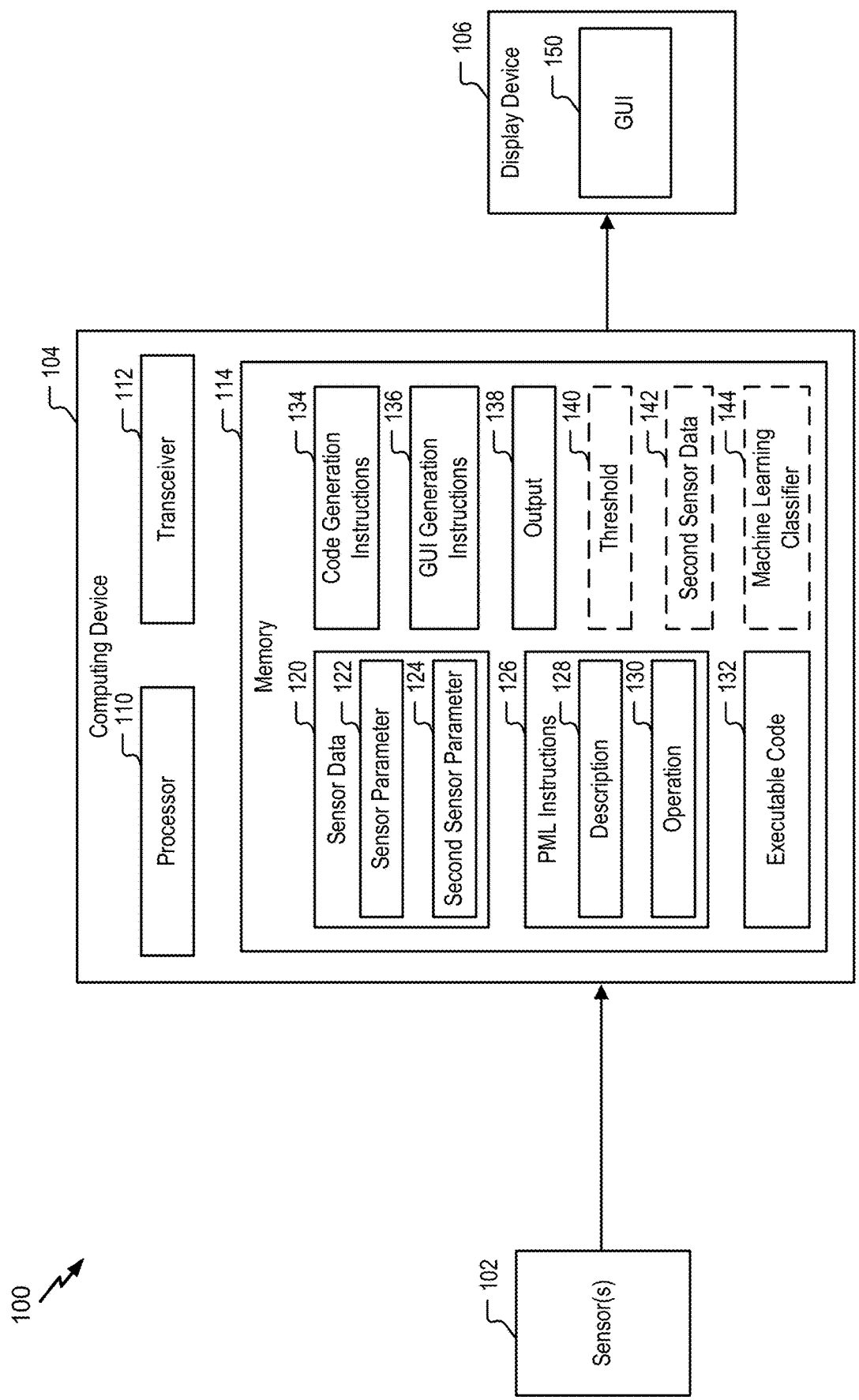
FIG. 1 is a block diagram that illustrates a particular implementation of a system that implements a Parameter Manipulation Language (PML)

Particular implementations are described with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining", "calculating", "generating", "adjusting", "modifying", etc. may be used to describe how one or more operations are performed. It should be noted that such terms are not to be construed as limiting and other techniques may be utilized to perform similar operations. Additionally, as referred to herein, "generating", "calculating", "using", "selecting", "accessing", and "determining" may be used interchangeably. For example, "generating", "calculating", or "determining" a parameter (or a signal) may refer to actively generating, calculating, or determining the parameter (or the signal) or may refer to using, selecting, or accessing the parameter (or signal) that is already generated, such as by another component or device. Additionally, "adjusting" and "modifying" may be used interchangeably. For example, "adjusting" or "modifying" a parameter may refer to changing the parameter from a first value to a second value (a "modified value" or an "adjusted value"). As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

The present disclosure describes systems and methods to perform operations on flight sensor data. For example, flight sensor data can be manipulated and analyzed to determine information indicated by the flight sensor data that may not be obvious due to the large amounts of flight sensor data and due to relationships between variables within the flight sensor data. To enable such manipulation of flight sensor data, a computer programming language, referred to herein as Parameter Manipulation Language (PML), for the manipulation and analysis of flight sensor data is described. As used herein, a "flight sensor parameter" refers to a variable of flight sensor data (e.g., parametric flight sensor data). For example, flight sensor parameters can include temperature, altitude, speed, etc. PML enables users to manipulate flight sensor parameters of the flight sensor data, such as by performing operations on the flight sensor parameters, comparing the flight sensor parameters to other flight sensor parameters, or comparing the flight sensor parameters to thresholds, without having to write code to deal with lower-level technical details such as how the flight sensor data is loaded, processed, and saved. Thus, PML is easier to understand and use than conventional analysis tools, thereby enabling engineers or data scientists who may lack computer programming knowledge to more easily generate programs to perform operations on flight sensor data. Additionally, because PML can be used to generate programs using fewer instructions, such as specific high-level instructions described further herein, fewer errors are introduced into the PML code as compared to using lower-level code. Reducing the number of errors in the PML code reduces an amount of debugging time and associated computing resources (e.g., debugging processors and memory platforms), which improves development speed associated with the PML code.

PML is focused on sensor parameters, and common manipulations of sensor parameters are supported via high-level operations. For example, PML enables performance of arithmetic operations, Boolean operations, and other types of operations on the sensor parameters using single commands. Additionally, PML enables comparisons of sensor parameters to thresholds or to other sensor parameters through the use of time predicates. Time predicates are a unique variable in PML that indicates time periods when a particular expression is true. For example, for a first sensor parameter, a first time predicate can be defined such that the first time predicate indicates time periods when the first sensor parameter satisfies a threshold. The first time predicate can indicate a sequence of disjoint time intervals, or "always" (if the expression is true for an entire duration associated with the first sensor parameter) or "never" (if the expression is not true at any point during the entire duration associated with the first flight sensor parameter). Use of time predicates enables quick comparisons of sensor parameters to other values or sensor parameters and enables change point detection (e.g., when a value of a sensor parameter changes value).

Additionally, PML includes look, filter, and aggregation operations that enable more complex manipulations of sensor parameters using single operations. These manipulations are enabled using single expressions instead of requiring the user to implement complex control logic to perform the operations. For example, multiple lines of user-generated code to aggregate multiple sensor parameters are replaced with a single aggregation command in PML, and PML is converted to executable code without additional input from the user. Thus, sensor parameter manipulations beyond those of conventional tools are supported in PML using single operations, which can reduce the number of errors introduced in PML code, thereby reducing the debugging time and resources and improving development time associated with the PML code.

Additionally, as described further herein, PML is configured to handle null values for sensor parameters. The null values propagate through operations and expressions within PML without causing errors or incorrect values to be generated. Handling of null values in this manner can result in fewer errors or meaningless responses, which can further reduce debugging time and reduce an amount of processor cycles that would otherwise be consumed executing operations on incorrect values.

The systems and methods described herein enable conversion of PML to executable code that can be executed by a processor to perform user designated operations on the flight sensor data. To illustrate, a processor receives data that indicates descriptions of one or more sensor parameters and operations to be performed on the one or more sensor parameters, as further described herein. The data includes PML instructions generated by a user. The data (e.g., the PML instructions) is used to generate executable code, as further described herein. The executable code is a different type of code than PML. In a particular implementation, the executable code includes Java code. After the executable code is generated, the processor associates the executable code with flight sensor data. For example, a user specifies loaders and savers to load the flight sensor data and to store the results. Decoupling the flight sensor loaders from PML enables PML to be used on different files having different formats (e.g., text or binary, as non-limiting examples) and at different locations, such as at a local file system or at a remote platform. After specifying the loaders and the savers, the executable code is executed by the processor using the flight sensor data as input to generate an output that indicates results of the operations. The results can be indicated using text, graphs or other visualizations, or a combination thereof, for example via a graphical user interface. Thus, manipulations (e.g., operations) on flight sensor data performed by code written in PML is used to generate executable code to perform the manipulations, enabling PML to support manipulation of flight sensor parameters at a high level (e.g., using fewer instructions), which can reduce the number of errors in the PML code and thereby reduce debugging time.

FIG. 1 illustrates an example of a particular implementation of a system 100 that implements PML to perform operations on sensor data. The system 100 includes one or more sensors 102, a computing device 104, and a display device 106. In a particular implementation, the system 100 is integrated into a vehicle. For example, the system 100 can be integrated in an aircraft, an unmanned aerial vehicle (UAV) (e.g., a drone aircraft), an automobile, a train, a motorcycle, a bus, a ship or boat, a rocket, a spacecraft, an autonomous vehicle, or another vehicle, as illustrative, non-limiting examples. In other implementations, one or more components can be external to the vehicle, such as the sensors 102, the computing device 104, the display device 106, or a combination thereof.

In a particular implementation, the sensors 102 are configured to perform readings of one or more aspects or characteristics of the vehicle to generate flight sensor data 120. In a particular implementation, the sensors 102 are coupled to one or more aircraft, and the sensors 102 are configured to generate the flight sensor data 120 before, during, and after a flight of the one or more aircraft. The sensors 102 can include multiple types of sensors. As illustrative examples, the sensors 102 can include a speed sensor, an altitude sensor, a pressure sensor, a control surface sensor (e.g., a flap position indicator), a landing gear position indicator, a fuel flow rate sensor, an engine sensor (e.g., an engine revolutions-per-minute (RPM) sensor), a vibration sensor, a temperature sensor, one or more other sensors, or a combination thereof. Although described as flight sensor data, in other implementations, the sensors 102 are coupled to a different type of vehicle and generate sensor data for that vehicle.

The flight sensor data 120 includes time-series data indicating values of one or more parameters (e.g., variables). To illustrate, the sensors 102 are configured to measure one or more characteristics, either continually or at discrete intervals. The measured values are referred to as samples, and the measurement rate is referred to as a sampling rate. The flight sensor data 120 includes any type of sensor values, including parametric sensor data from a Flight Data Recorder (FDR), a Quick Access Recorder (QAR), a Continuous Parameter Logging (CPL) System, and Enhanced Airborne Flight Recorder (EAFR), or from other types of sensor systems. In some implementations, the flight sensor data 120 is time-stamped. In other implementations, the flight sensor data 120 includes a start time and a sampling rate, and the sensor data is timestamped or synchronized by the computing device 104 or by another component, such as another processor or a controller of the aircraft.

In some implementations, the computing device 104 is coupled to the sensors 102 and configured to obtain the flight sensor data 120 from the sensors 102. In a particular implementation, the computing device 104 is coupled to the sensors 102 via a network. The network can include a wired network or a wireless network. The network can be configured in accordance with one or more wireless communication protocols, such as an Institute of Electrical and Electronics Engineers (IEEE) protocol, a Wi-Fi Alliance protocol, a Bluetooth® protocol, a Zigbee® protocol, a near-field communication protocol, a cellular protocol, a Long Term Evolution (LTE) protocol, or a combination thereof. Bluetooth is a registered trademark of Bluetooth Special Interest Group (SIG), and Zigbee is a registered trademark of Zigbee Alliance. In another particular implementation, the computing device 104 is coupled to an interface (e.g., a bus) of a sensor system of the aircraft and configured to receive the flight sensor data 120 via the interface. In other implementations, the computing device 104 is external to the aircraft and configured to receive the flight sensor data 120 from one or more intermediary devices, such as a data storage device or other memory of the aircraft that stores the flight sensor data 120. In some implementations, the flight sensor data 120 is received from multiple aircraft via one or more intermediary devices, such as a server (e.g., a remote platform) that stores the flight sensor data 120.

The computing device 104 includes a processor 110, a transceiver 112 coupled to the processor 110, and a memory 114 coupled to the processor 110. In a particular implementation, the processor 110, the transceiver 112, and the memory 114 are coupled together via a bus or other interface. The transceiver 112 is configured to receive data from other devices and to send data to other devices. In other implementations, the computing device 104 includes a transmitter, a receiver, or both. In some implementations, the computing device 104 includes fewer or more components than illustrated in FIG. 1. For example, the computing device 104 can include an input interface that is configured to receive user input from a user input device, such as a keyboard, a mouse, a touchscreen, a camera (for gesture commands), a microphone (for voice commands), or a combination thereof, as non-limiting examples.

The processor 110 is configured to execute instructions stored at the memory 114 to perform the operations described herein. The memory 114 includes a volatile memory, a non-volatile memory, or a combination thereof. For example, the memory 114 includes random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. In the implementation illustrated in FIG. 1, the instructions include code generation instructions 134 and graphical user interface (GUI) generation instructions 136. The code generation instructions 134 are configured to receive instructions in PML and to generate executable code based on the instructions, as further described herein. The GUI generation instructions 136 are configured to generate a GUI that provides a user with information when generating the PML instructions, that displays the results of operations performed by the executed code, or both, as further described herein.

The display device 106 is coupled to the computing device 104 and configured to display an output based on data from the computing device 104. For example, the display device 106 can include a screen, a touchscreen, a monitor, or another type of display device. Although illustrated as being external to the computing device 104, in other implementations, the display device 106 is integrated within the computing device 104.

In a particular implementation, the computing device 104 is integrated within the control panel of an aircraft. To illustrate, the computing device 104 can be part of the instruments included in the control panel, and the display device 106 can be a monitor or display screen within the cockpit. In another particular implementation, the computing device 104 is a computer that is external to an aircraft, such as a computer of a ground station. In another particular implementation, the computing device 104 includes a mobile device, such as a mobile phone, a tablet computing device, a laptop computing device, or another type of mobile device.

During operation, a user of the computing device 104 enters one or more PML instructions (e.g., PML code), such as via a user input device. The processor 110 receives the PML instructions as PML instructions 126. For example, a user may enter one or more lines of PML code to perform user-designated operation(s) on sensor parameters included in the flight sensor data 120. Additionally, or alternatively, the user interacts with a GUI 150 displayed by the display device 106 to select operation(s) to be performed on sensor parameters, and the PML instructions 126 are generated based on the user inputs (e.g., PML code is generated by the processor 110 based on user selections with respect to options displayed via the GUI 150). For example, the GUI generation instructions 136 are configured to generate the GUI 150 that provides explanations and user-selectable options for manipulating flight sensor parameters (such as filtering sensor parameters, aggregating sensor parameters, performing arithmetic operations on sensor parameters, etc.), and the user selects particular options to cause performance of particular operations on particular sensor parameters, as further described herein. In this implementation, the PML code is generated automatically by the processor 110 based on the user selections.

PML is a high-level programming language that supports description and manipulation of sensor parameters. For example, a user can define one or more sensor parameters in flight sensor data. The one or more sensor parameters include time-value pairs. For example, a sensor parameter is formatted as sensor values at various sample times. Although sensor parameters are typically sampled at a fixed rate, there can be missing samples, drifting time, or changing of sample rates. Thus, PML does not assume fixed sample rates for sensor parameters. In addition, different parameters can have different sampling times or rates.

Different sensor parameters can have different types of values, such as discrete categorical codes, continuous numeric values, or text, as illustrative, non-limiting examples. By default in some implementations of PML, a sensor parameter is set to hold single-precision floating-point numeric values. PML also enables a user to explicitly specify the value type of a sensor parameter. For example, a user can define a flight number parameter (which often includes characters) as type string.

Additionally, since a sensor parameter includes values sampled at selected times, an Estimator is provided in PML for estimating the value of a given sensor parameter at any time, including before the first sample or after the last sample, using surrounding values. By default, PML intelligently determines the appropriate Estimator for each sensor parameter. Additionally, a user is able to explicitly specify the Estimator for a given sensor parameter. Estimators can include carryForward estimators, carryBackward estimators, NearestNeighbor estimators, or linear-interpolation estimators, as non-limiting examples.

PML supports a flight sensor Dataset that includes a set of sensor parameters, each with a unique name. Usually a single Dataset contains all parameters for a single flight, e.g., from taxi out to taxi in. In addition, a Dataset can also contain a set of metadata items, each with a unique name. Examples of metadata include airline operator, aircraft identification, flight number, etc.

PML also handles missing sensor parameters automatically. For example, if a particular sensor parameter does not exist for a flight, all manipulations and tests on the particular sensor parameter yield null. The null values automatically propagate through the PML logic, instead of erroneous values. Additionally, a user can explicitly test whether a parameter is null and provide different logic for the different test results. Thus, null values are handled automatically, which prevents erroneous values from being propagated through the PML logic.

Engineers or data analysts often desire to compare sensor parameters against a threshold or with each other. PML supports such comparisons using time predicates. For example, a result of a comparison can be provided as a time predicate. A time predicate is a parameter with Boolean values that indicates a sequence of zero or more pairwise disjoint truth intervals (e.g., when the comparison is true)—the value is true for any time within one of these truth intervals and the value is false for any time outside all of the truth intervals. Additionally, a time predicate can have one of two special values: NEVER if there is no truth interval and ALWAYS if there is a single truth interval. Examples of time predicates are described further herein with reference to FIG. 2. The core of PML is defined around sensor parameters and time predicates, with common data types of values, variables, operations, and functions to express the description and manipulation of sensor parameters. Additional details with regard to specific functions, expressions, and operations in PML are described herein with reference to FIGS. 4-13.

In a particular implementation, the PML instructions 126 include a description 128 of a sensor parameter 122 and an operation 130 to be performed on the sensor parameter 122. The description 128 describes or defines the sensor parameter 122 in PML. The operation 130 includes an operation to be performed on the sensor parameter 122. For example, the operation 130 includes an arithmetic operation, a Boolean operation, a comparison, or another type of operation. In a particular implementation, the sensor parameter 122 is formatted as time-value pairs of measurement values and time values (e.g., as samples based on a sampling rate).

In a particular implementation, the operation 130 includes a comparison of the sensor parameter 122 to a threshold 140. For example, the sensor parameter 122 is compared to the threshold 140 to generate a time predicate that indicates time periods when the threshold 140 is satisfied, as further described with reference to FIG. 2. Using a single operation to compare the sensor parameter 122 to the threshold 140 enables faster and easier comparisons, as compared to generating complex logic to perform the comparison. In another particular implementation, the operation 130 includes a comparison of the sensor parameter 122 to a second sensor parameter 124 of the flight sensor data 120. For example, the sensor parameter 122 is compared to the second sensor parameter 124 to generate a time predicate that indicates time periods when the sensor parameter 122 is greater than the second sensor parameter 124. Using a single operation to compare the sensor parameter 122 to the second sensor parameter 124 enables faster and easier comparisons, as compared to generating complex logic to perform the comparison.

After the PML instructions 126 are received or generated by the processor 110, the processor 110 generates executable code 132 based on the PML instructions 126. For example, the code generation instructions 134 are configured to receive PML code (e.g., the PML instructions 126) as input and to output executable code based on the PML code. To illustrate, the description 128 and the operation 130 (e.g., the PML instructions 126) are in a first programming language (e.g., PML), and the executable code 132 is in a second programming language that is different than the first programming language. In a particular implementation, the executable code 132 includes Java code. Details of generating Java code (e.g., the executable code 132) are further described herein with reference to FIGS. 14-40. In other implementations, the executable code 132 is other types of code, such as Python, as a non-limiting example. Converting PML to the executable code 132 enables execution of PML instructions on a wide variety of different computing systems.

After generating the executable code 132, the processor 110 associates the executable code 132 with the flight sensor data 120. For example, the GUI 150 indicates instructions to specify the location of the flight sensor data 120. In a particular implementation, the flight sensor data 120 is stored locally (e.g., at the memory 114). In other implementations, the flight sensor data 120 is stored remotely, such as at a remote platform (e.g., one or more servers). Additionally, the GUI 150 indicates instructions to specify the loaders associated with loading the flight sensor data 120 and the savers associated with storing results. Responsive to inputs from the user based on the GUI 150, the processor 110 associates the flight sensor data 120 with the executable code 132.

After associating the executable code 132 with the flight sensor data 120, the processor 110 executes the executable code 132 using the flight sensor data 120 as input to generate an output 138 that indicates results of the operation 130. For example, executing the executable code 132 performs the operation 130 on the sensor parameter 122. The output 138 includes results of the operation 130. For example, if the operation 130 is an arithmetic operation, the output 138 includes a manipulated sensor parameter. As another example, if the operation 130 is a comparison, the output 138 includes a time predicate indicating when the comparison is satisfied for time periods associated with the sensor parameter 122. In this example, executing the executable code 132 generates a time predicate associated with the sensor parameter 122 and the operation 130 (which includes a comparison), and the time predicate indicates one or more time periods during which the comparison is true or a particular value indicating the comparison is always true or never true, as further described with reference to FIG. 2.

The executable code 132 can be executed using different sensor data as input. For example, in a particular implementation, the executable code 132 is executed by the processor 110 with second sensor data 142 as input to generate a second output that indicates results of the operation 130. In a particular implementation, the second sensor data 142 is included in a file that has a different file type than a file that includes the flight sensor data 120. For example, the flight sensor data 120 can be included in a text file, and the second sensor data 142 can be included in a binary file. Because the executable code 132 is agnostic to the file type, the executable code 132 can be executed on both files, which improves the utility of the executable code 132 as compared to executable code that can only be executed on a particular file type.

After generating the output 138, the output 138 can be used to generate the GUI 150. For example, the GUI generation instructions 136 are configured to generate the GUI 150 based on the output 138. To further illustrate, the GUI 150 can include text results of the operation 130, graphs (or other visualizations) indicating one or more time predicates (e.g., one or more time periods indicated by time predicates) or one or more manipulated sensor parameters, or a combination thereof. Displaying the output 138 via the GUI 150 enables a user to quickly and easily perceive the results of the operations performed on the flight sensor data 120.

In a particular implementation, the output 138 is used to train a machine learning classifier 144. For example, the processor 110 generates training data based on the output 138 and the flight sensor data 120, and the processor 110 provides the training data to the machine learning classifier 144 to configure the machine learning classifier 144 to predict a fault state associated with an aircraft. The machine learning classifier 144 can include a neural network classifier, a support vector machine classifier, a Bayesian classifier, a perceptron classifier, or another type of classifier. To further illustrate, the operation 130 can compare sensor parameters to a threshold, and if the values of the sensor parameters are greater than a threshold, these sensor values can be indicated by the output 138. These sensor parameters are labeled as corresponding to a fault state (or a precursor to a fault state), while other sensor parameters are labeled as corresponding to normal states. The labels and the flight sensor data 120 can be used as supervised training data to train the machine learning classifier 144 to predict a fault state of the aircraft based on real-time sensor data from the sensors 102. For example, based on receiving real-time flight sensor data from an aircraft, the machine learning classifier 144 can predict whether a fault state is likely to occur. Using the machine learning classifier 144 to predict a fault of the aircraft can cause repairs to be initiated before a fault occurs, which can reduce downtime of the aircraft due to occurrence of a fault.

In a particular implementation, the operation 130 includes a look expression, and the output 138 further indicates whether the sensor parameter 122 has a particular value during a particular time period indicated as an input to the look expression. For example, the look expression is configured to compare the value of the sensor parameter 122 at a particular time period (indicated by the input to the look expression) to a particular value (indicated by a second input to the look expression). The look expression is further described with reference to FIG. 10. By using the look expression, a user can perform a comparison on a particular time period of a sensor parameter using a single operation. Using a single look operation instead of multiple operations can reduce the number of errors in the PML code, which reduces debugging time and improves development speed.

In a particular implementation, the operation 130 includes a filter expression, and the output 138 further indicates a list of time periods during which the sensor parameter 122 has one or more particular values allowed by the filter expression. For example, the filter expression is configured to filter out values of the sensor parameter 122 that do not have allowed values (indicated by one of the inputs to the filter expression). The filter expression is further described with reference to FIG. 12. By using the filter expression, a user can perform a complex filtering operation using a single operation. Using a single filter operation instead of multiple operations can reduce the number of errors in the PML code, which reduces debugging time and improves development speed.

In a particular implementation, the operation 130 includes an aggregation operation, and the output 138 further indicates an aggregation of multiple sensor parameters indicated as inputs to the aggregation expression. For example, the aggregation expression is configured to aggregate multiple sensor parameters together into a single sensor parameter. The aggregation operation is further described with reference to FIG. 13. By using the aggregation expression, a user can perform a complex aggregation operation using a single operation. Using a single operation instead of multiple operations to aggregate sensor parameters can reduce the number of errors in the PML code, which reduces debugging time and improves development speed.

In a particular implementation, the operation 130 includes a Boolean operation, and the output 138 further indicates a Boolean combination of inputs to the Boolean expression. For example, the Boolean expression is configured to perform a Boolean combination (e.g., an AND operation or an OR operation, as non-limiting examples) on multiple inputs. The Boolean operation is further described with reference to FIG. 10. By using the Boolean operation, a user can perform a Boolean operation using a single operation. Using a single operation instead of multiple operations to evaluate Boolean expressions can reduce the number of errors in the PML code, which reduces debugging time and improves development speed.

In a particular implementation, the operation 130 includes an arithmetic expression, and the output 138 further indicates an arithmetic operation result of an arithmetic operation performed on inputs of the arithmetic expression. For example, the arithmetic expression is configured to perform an arithmetic operation, such as an addition operation, a subtraction operation, a multiplication operation, a division operation, etc., on multiple inputs. The arithmetic operation is further described with reference to FIG. 11. By using the arithmetic expression, a user can perform an arithmetic operation using a single operation. Using a single arithmetic operation instead of multiple operations can reduce the number of errors in the PML code, which reduces debugging time and improves development speed.

In a particular implementation, the operation 130 includes an invocation expression, and the output 138 further indicates an invocation result of a function indicated as an input to the invocation expression. For example, the invocation expression invokes a function indicated as an input to the invocation expression. The invocation expression (e.g., a call expression) is further described with reference to FIG. 12. By using the invocation expression, a user can perform a function using a single operation. Using a single operation instead of multiple operations to invoke a function can reduce the number of errors in the PML code, which reduces debugging time and improves development speed.

The system 100 enables description and manipulation of sensor parameters using PML, a domain specific language that operates on sensor parameters at a high level (e.g., without requiring complex logic to load, clean up, and access sensor parameters). Common parameter manipulations are supported by operations in PML, such as Boolean operations, arithmetic operations, etc. Additionally, parameter comparisons (with other parameters or thresholds) are supported through the use of time predicates. Additionally, as further described herein, more complicated look, filter, and aggregation operations are supported using single operations, thereby enabling complex sensor parameter manipulations without requiring complicated logic (e.g., multiple commands or operations) to perform the manipulations. Reducing the number of commands that are used in the PML code reduces the opportunities for errors to be introduced in the PML code, which reduces debugging time and resources and improves development speed of the PML code. Additionally, missing data (e.g., sensor parameters) are handled via null values that are propagated throughout the PML code, which can further reduce the number of errors (and thereby reduce debugging time). Also, the flight sensor loaders are decoupled from the PML code (e.g., the PML code is used to generate the executable code 132 that is associated with the flight sensor data 120), so that the same executable code can be executed on different files having different file types. Thus, the amount of code stored at the memory 114 is reduced, as compared to storing separate sets of instructions for different types of flight sensor data.

Figure 2:
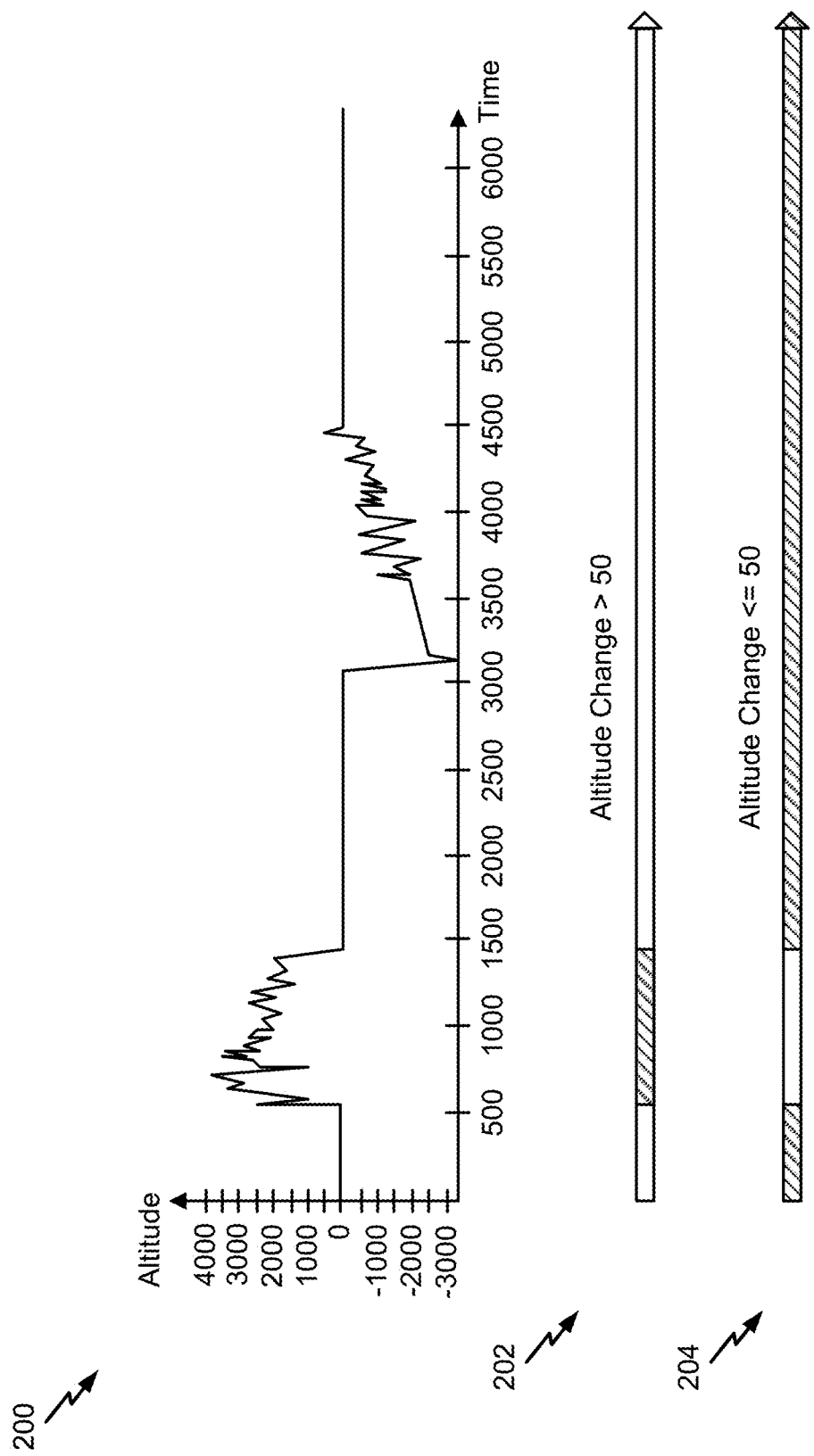
FIG. 2 illustrates examples of time predicates of PML.

FIG. 2 illustrates examples of time predicates of PML. As described with reference to FIG. 1, time predicates are a type of variable used in PML to indicate time periods when a particular expression is true. Stated another way, a time predicate is a function to map a time input to a Boolean output. For example, a time predicate can be considered as a parameter with Boolean values.

Time predicates are results of comparisons in PML. For example, a time predicate can be a result of a comparison of a sensor parameter to a threshold or a comparison of a sensor parameter to another sensor parameter. Time predicates also provide static, read-only fields for two special values: ALWAYS and NEVER. In addition, time predicates provide non-static read-only fields for the number, start time, and end time of truth intervals (e.g., time periods when an expression is true) as well as the total length of all truth intervals, as further described herein.

In the example of FIG. 2, a graphical depiction of a first sensor parameter 200 is displayed. As a particular example, the first sensor parameter 200 includes altitude. In other examples, the first sensor parameter 200 is a different sensor parameter. A first comparison is performed on the first sensor parameter 200 and a threshold to generate a first time predicate 202. In the example illustrated in FIG. 2, the first time predicate 202 indicates time period(s) when the first sensor parameter 200 is greater than 50 (e.g., a threshold). In this example, the first time predicate 202 includes a single time interval from approximately 500 to approximately 1500 that is indicated as true (e.g., the shaded portion), and the remaining time periods are indicated as false (e.g., the blank portions).

A second comparison is performed on the first sensor parameter 200 and the threshold to generate a second time predicate 204. In the example illustrated in FIG. 2, the second time predicate 204 indicates time period(s) when the first sensor parameter 200 is less than or equal to 50 (e.g., the threshold). In this example, the second time predicate 204 includes a first time interval from 0 to approximately 500 and a second time interval from approximately 1500 to a final time associated with the first sensor parameter 200. In other examples, time predicates are generated by comparing the first sensor parameter 200 to other sensor parameters. In some examples, time predicates can have a single value. For example, a time predicate based on determining when the first sensor parameter 200 is greater than 4000 has a value of NEVER indicating that this expression (e.g., first sensor parameter >4000) is not true for any time period associated with the first sensor parameter 200. As another example, a time predicate based on determining when the first sensor parameter 200 is less than or equal to 4000 has a value of ALWAYS indicating that this expression (e.g., first sensor parameter <=4000) is true for all of the time periods associated with the first sensor parameter 200.

The time predicates of FIG. 2 can be used to generate output displayed via the GUI 150 of FIG. 1. For example, timelines, graphs, or other visualizations of the time predicates can be displayed via the GUI 150. Additionally, the time predicates can be used as inputs to other operations in PML, such as filtering operations or aggregation operations, thereby enabling more complex sensor parameter manipulations to be performed.

Figure 3:
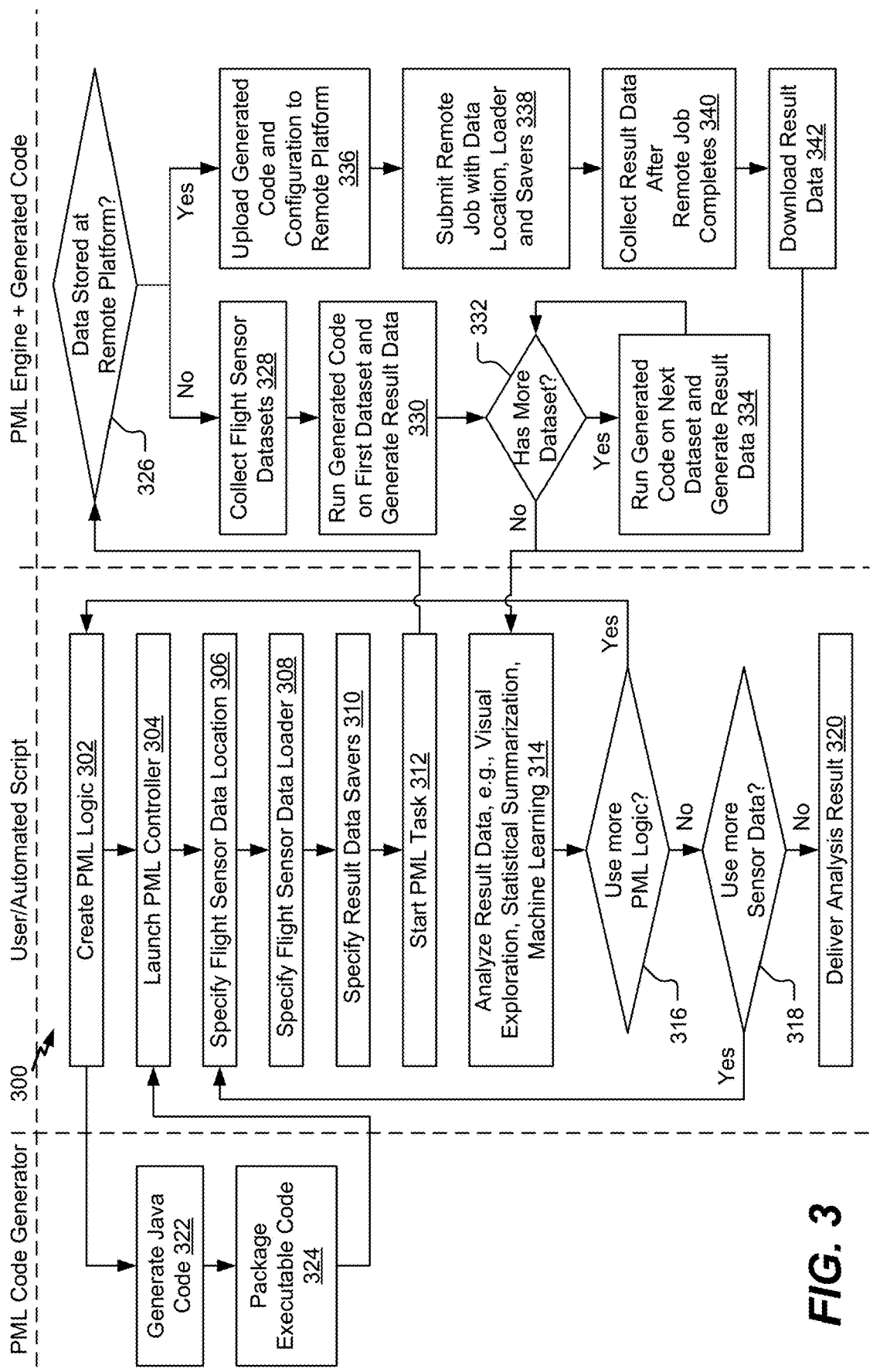
FIG. 3 is a flow chart of an example of a method of using PML to analyze flight sensor data.

FIG. 3 illustrates a method 300 of using PML to analyze flight sensor data. In a particular implementation, the method 300 is performed by the computing device 104 (e.g., the processor 110) of FIG. 1. In FIG. 3, operations in the left column are performed by a PML code generator, operations in the middle column are performed using a user or automated script, and operations in the right column are performed by a PML engine based on the generated code (e.g., the executable code 132 of FIG. 1).

The method 300 includes creating PML logic, at 302. For example, the processor 110 receives or generates the PML instructions 126 based on PML code input by a user (or generated based on user inputs responsive to the GUI 150). After the PML logic is created, the method continues to 322, and Java code is generated. Executable code is packaged, at 324. For example, the executable code 132 is generated based on the PML instructions 126. Examples of generating executable code based on PML are further described with reference to FIGS. 14-40.

After packaging the executable code, the method 300 continues to 304, where a PML controller is launched. At 306, a location of flight sensor data is specified, at 308, a flight sensor data loader is specified, and at 310, result data savers are specified. For example, the executable code 132 is associated with the flight sensor data 120. At 312, a PML task is started, for example by executing the executable code 132.

The method 300 continues to 326, and it is determined whether flight sensor data is stored at a remote platform. If flight sensor data is not stored at a remote platform, the method 300 continues to 328, and flight sensor data sets are collected. At 330, the generated code is run on a first data set to generate result data.

After generating the result data, a determination is made whether there are more data sets, at 332. If there are more data sets, the method continues to 334, and the generated code is run on the next data set to generate additional result data. After generating the additional result data, the method 300 returns to 332. If there are no more data sets at 332, the method continues to 314.

Returning to 326, if flight sensor data is stored at a remote platform, the method 300 continues to 336, and the generated code and configuration is uploaded to the remote platform. A remote job with data location, loader, and savers is submitted at 338, and after the remote job is complete, result data is collected at 340 and downloaded at 342. After downloading the result data, the method 300 continues to 314.

The result data in analyzed, at 314. The analysis can include visual exploration (e.g., via the GUI 150), statistical summarization, or use of machine learning, as non-limiting examples. After the analysis, at 316, it is determined whether more PML logic is to be used. If more PML logic is to be used, the method 300 returns to 302, and the additional PML logic is created. If there is no more PML logic to be used, it is determined whether more flight sensor data is to be analyzed, at 318. If additional flight sensor data is to be analyzed, the method 300 returns to 306, and the location of the additional flight sensor data is specified. If no more flight sensor data is to be analyzed, the method 300 ends at 320, and the results of the analysis are delivered. For example, the GUI 150 indicating the output 138 is displayed at the display device 106.

Referring to FIGS. 4-13, syntax graphs of various elements of PML are illustrated. Syntax graphs describe PML definition syntax and are read from left to right. Text on the left (outside of any box) defines a new syntax rule. Text in white boxes is used literally (e.g., character-by-character). Text in gray boxes refers to another rule by name. Some syntax graphs include branches. Branches that are empty (e.g., branches that do not include an element) on the bottom represent optional branches. For example, the element in a branch above an empty bottom branch is optional (e.g., either the top branch is taken and the element is included or the bottom branch is taken and the element is not included). Branches that are empty on the top indicate potential loops. For example, an element that is on the bottom of a branch that has an empty top branch can be included one or more times before continuing to the right (e.g., the syntax graph loops around and the bottom element is included again).

Figure 4:
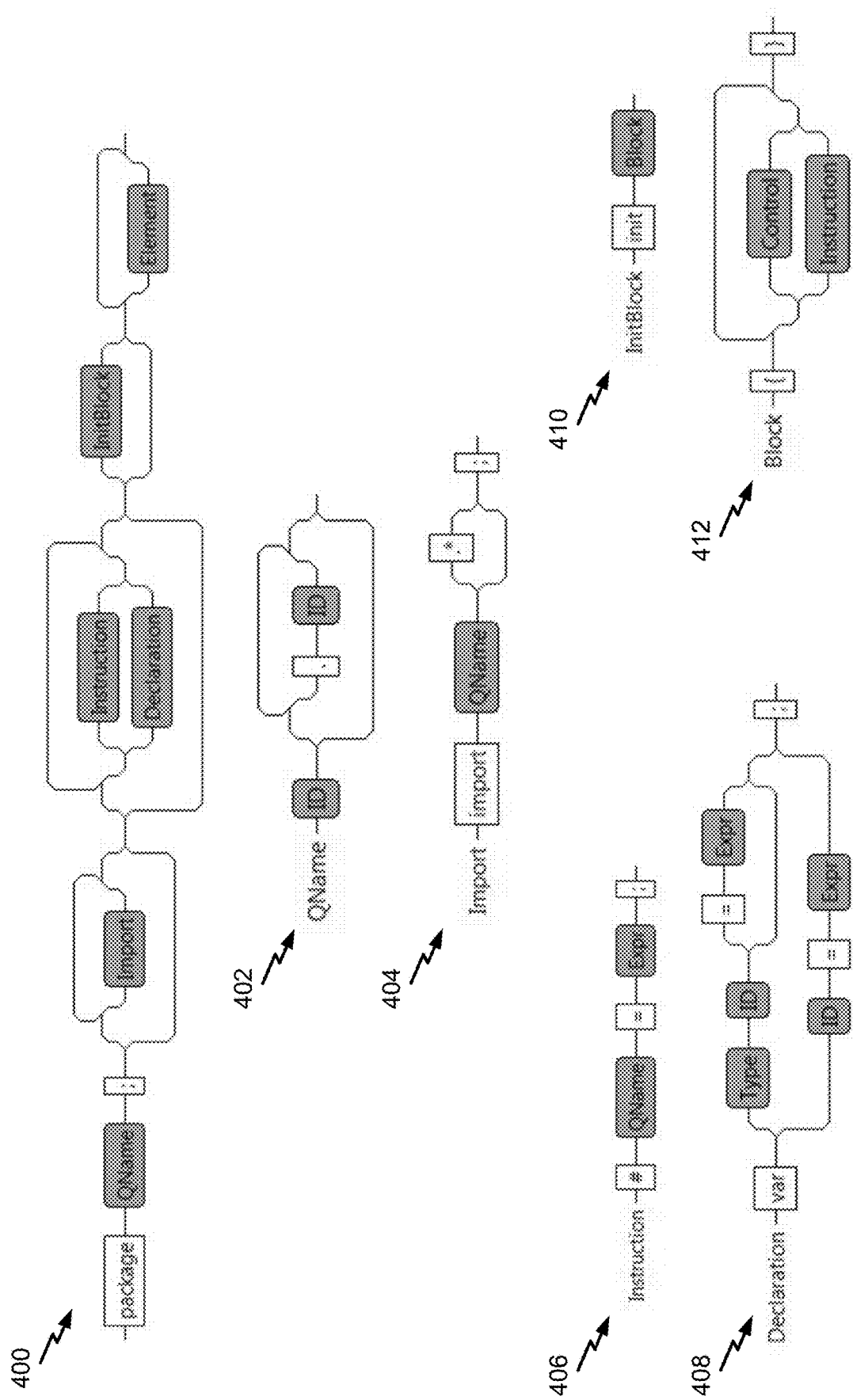
FIG. 4 illustrates examples of syntax diagrams of elements of PML.

FIG. 4 illustrates syntax diagrams associated with packages. Each PML file is considered a single package that defines functions, data types, events, states, and featuresets for manipulating flight sensor data. A PML package can use the definitions from other PML packages to avoid redundant logic definitions.

A first syntax graph 400 corresponds to a PML package definition. A PML package has a unique qualified name (QName) corresponding to the file path (relative to a PML file source repository folder). A QName is a sequence of identifiers (IDs) separated by the character dot (e.g., "."), as shown by a second syntax graph 402. The last identifier in the sequence corresponds to the file name, and other identifiers in the sequence correspond to folder names in the path. An identifier (ID) is a sequence of ASCII letters and digits and underscores where the first character cannot be a digit. Returning to the first syntax graph 400, after the QName and a semicolon, the PML package definition includes one or more optional import statements, one or more optional instructions or declarations, an optional InitBlock, and one or more Elements.

A package can import definitions from one or more other PML packages (files). Import definitions have syntax illustrated by a third syntax graph 404. With ".*", all definitions from a given PML package specified by the QName are imported. Without ".*", a specific element is imported: the last identifier in the QName specifies the element, and previous identifiers specify the containing PML package.

At the package level, a user can declare global instructions and variables (visible to all elements in the PML file). Instructions fine-tune the smartness of PML, e.g., how to ignore noise when comparing sensor parameters, and how to determine the right estimator for parameters from the values of the sensor parameters. Instructions are defined according to a fourth syntax graph 406.

Variables are used to remember states or to break complex logic into multiple steps (where intermediate results are stored into variables and used in successive steps). In variable declarations, a user can declare a variable with an initial value. PML can automatically infer the data types from the value for the variable. In some implementations, if no initial value is given, a type must be explicitly declared for the variable. A variable is declared according to a fifth syntax graph 408. PML implicitly defines a global variable input to hold the data of the current input flight. The data type of this variable is Dataset, as further described herein.

The optional InitBlock is a block of logic applied before loading any data. The InitBlock is defined according to a sixth syntax graph 410. A Block is defined according to a seventh syntax graph 412. A Block includes a sequence of Instructions or Control Statements within a pair of curly brackets { }. Unlike global Instructions, each Instruction within a Block is local to the Block and only applies to statements after the Instruction, including nesting sub-Blocks. Control statements are described further herein with reference to FIGS. 5 and 6.

The main body of a package consists of one or more Elements. An Element includes Instructions, Enum types, and Functions. Again, each Instruction in the main body is global, but only applies to elements defined after the Instruction. The Enum type and Function are described further herein.

Figure 5:
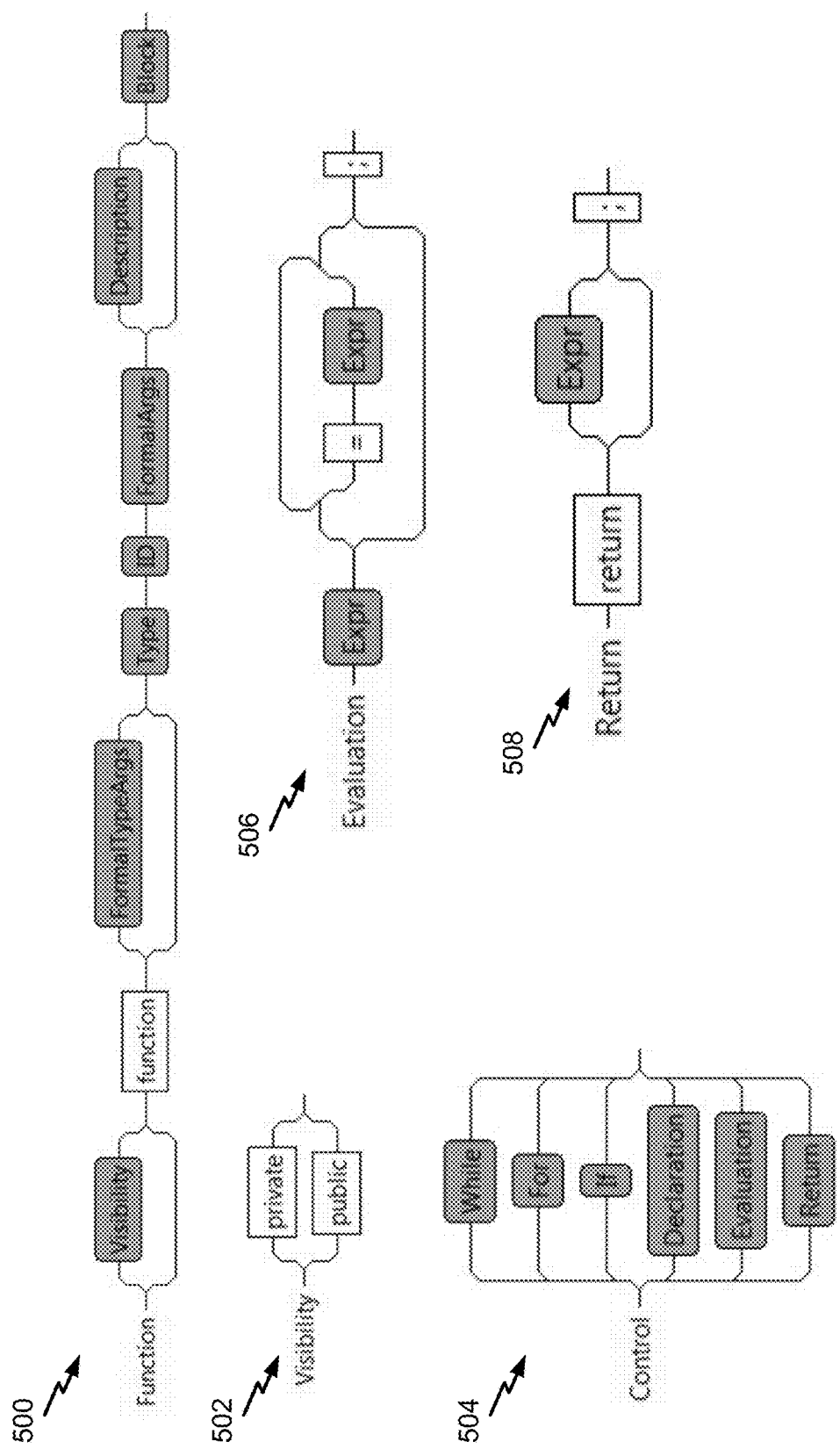
FIG. 5 illustrates examples of syntax diagrams of elements of PML.

FIG. 5 illustrates syntax graphs associated with Functions and with Control Statements. A PML function is a basic element in the main package body. The function is often used to obtain a single output from a list of inputs (also referred to as arguments), much like a mathematical function. Additionally, some functions are used for their side effects (e.g., modification of a global variable, as a non-limiting example).

A function is defined according to a first syntax graph 500. The function includes Visibility, followed by "function", followed by an optional FormalTypeArguments, followed by Type, followed by an Identifier, followed by FormalArgs, followed by an optional Description, and ending with a Block. The Visibility can be "private" or "public", as illustrated by a second syntax graph 502. If not specified, the default visibility is private. A public function can be imported by other PML files. A private function is hidden and can only be used in the same PML file. The function usually consists of a return type (Type), a name (ID), zero or more formal arguments (FormalArgs), and main body (Block). In some implementations, different functions in the same PML file must have different names. The optional STRING (Description) before the Block is the free-text description of the function. Sometimes, a function can use arguments or return values of some generic data types, where the exact data types are determined only when the function is called. For example, in function <T> T f(Parameter<T> p) {return p.getValue(p.size−1);}, the generic data type is a generic parameter type with values of to-be-determined data type T, and the return value has the same data type T. Formal arguments and formal type arguments are further described herein with reference to FIG. 13.

Control statements are used to define complex logic. Even though PML is a high-level language to manipulate parameters, such as by using expressions like look, filter, and aggregation, sometimes control statements are still useful. Thus, PML supports while loops, for loops, if statements, declaration statements, evaluation statements, and return statements, as illustrated by a third syntax graph 504. It will be appreciated that variable Declaration statements inside a Block have the same syntax as the global variable Declaration at the package level. However, in some implementations, variables declared inside a Block can only be used inside that Block and any nested sub-blocks.

The Evaluation statement has a syntax according to a fourth syntax graph 506. The evaluation statement is used to evaluate an expression (the last Expr), and optionally assign it to one or many targets (all except the last Expr). The assignment target can be a variable, a field of an object, an item in a List (e.g., an array or sequence) object, or a value for a Map (e.g., a dictionary, associative array, or hash) object.

The Return statement has a syntax according to a fifth syntax graph 508. The return statement is used in a function to return the result. If a function has a return type of Void, nothing is returned. In this case, the Return statement simply stops any further logic and exits the function. Alternatively, the Return statement returns the results of an Expr.

Figure 6:
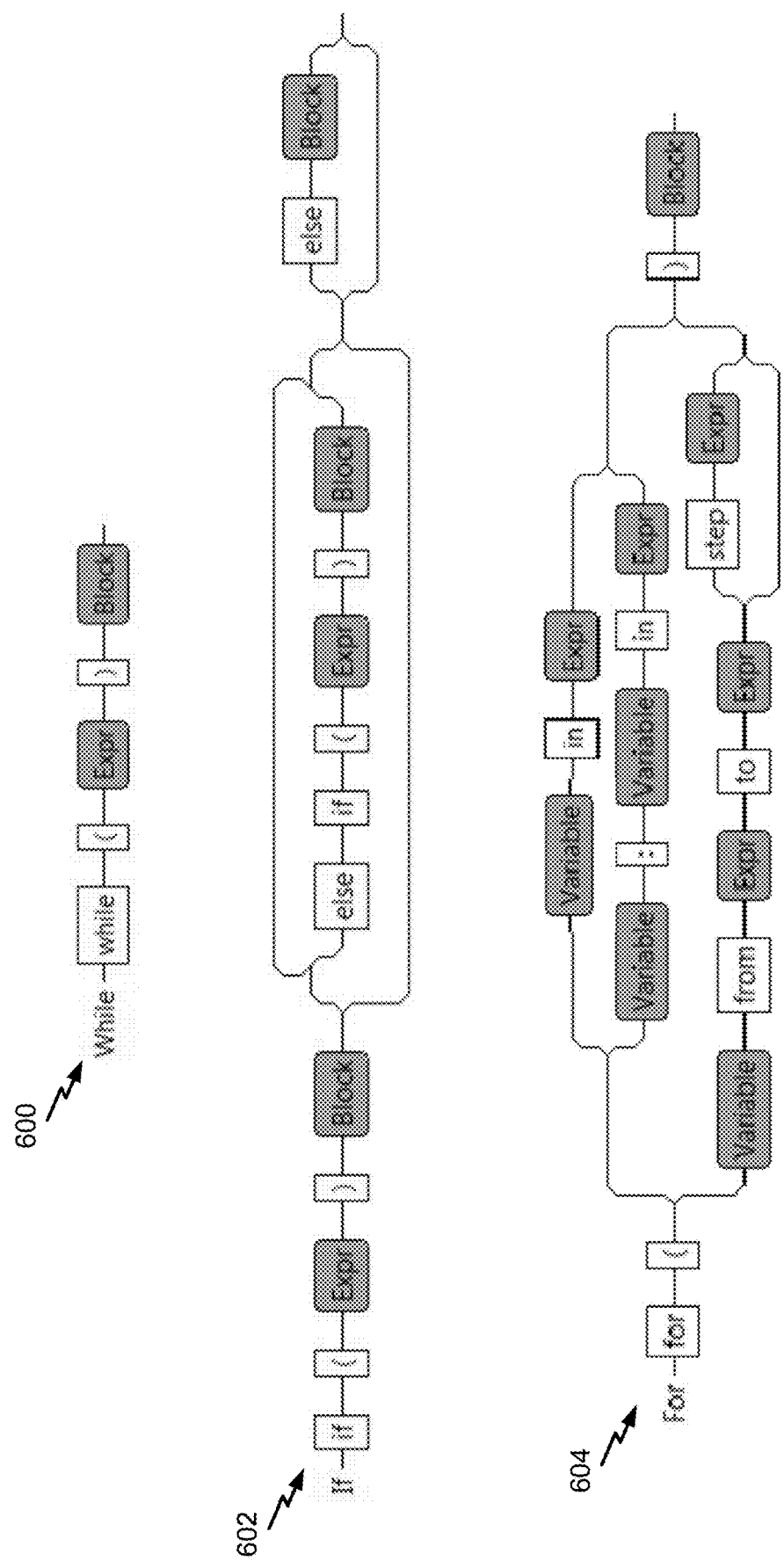
FIG. 6 illustrates examples of syntax diagrams of elements of PML.

FIG. 6 illustrates syntax graphs associated with control statements. A While loop has a syntax according to a first syntax graph 600. The While loop repeatedly evaluates the block (Block) as long as the condition expression (Expr) is true. The condition expression has a Boolean type, and the value is changed by the block to avoid an infinite loop. If the condition expression is null, the block is not applied An If statement has a syntax according to a second syntax graph 602. The If statement includes one or more conditional branches, and an optional catch-all (else) branch at the end. Each conditional expression (Expr) has the Boolean type. In some implementations, only the block of the first branch satisfying the following condition is evaluated: (1) the condition is true and (2) the condition for each of the previous branches is false. As described with reference to the while loop, a conditional expression can be null. If a conditional expression is null and no previous branch exists with a true condition, no branch for the whole If statement (including the optional catch-all else branch) is applied.

A For loop has a syntax according to a third syntax graph 604. PML provides three different versions of the For loop. The first version is to loop over a list (e.g., a sequence or array) of items, and evaluate the logic in the Block on each item in the list. Inside the Block, the Variable is used to refer to the current item in the list for each loop iteration. If the list is null, the Block is not evaluated. However, if the list includes null items, the logic will be applied on each of such null items (together with other non-null items) in the list.

The second version of the For loop is to loop over a map (e.g., a dictionary, associative array, or hash) of key-value pairs, and evaluate the logic in the Block on each key-value pair from the map. Maps are further described herein with reference to FIG. 9. Inside the Block, the two Variables are used to refer to the key and the value, respectively, of the current pair in the map for each loop iteration. If the map is null, the Block is not evaluated. However, if the map includes null values (with non-null values), the logic will be applied on each of such null values (together with other non-null values) in the map.

The third version of the For loop is to loop over a range of values defined by the start value (first Expr), the end value (second Expr), and optionally a step value (third Expr). All these three values have the same type, which can be either Time or Number. In a particular implementation, both the start and the end value are inclusive. If the step value is not specified, a default step value is assumed: one second for Time and one for Number. Inside the Block, the Variable is used to refer to the current value for each loop iteration. If the end value is greater than the start value, the Variable is increased by the step value after each iteration; otherwise, the Variable is decreased by the step value. If any of the three values is null, or the step value is non-positive, the Block logic is not evaluated.

Figure 7:
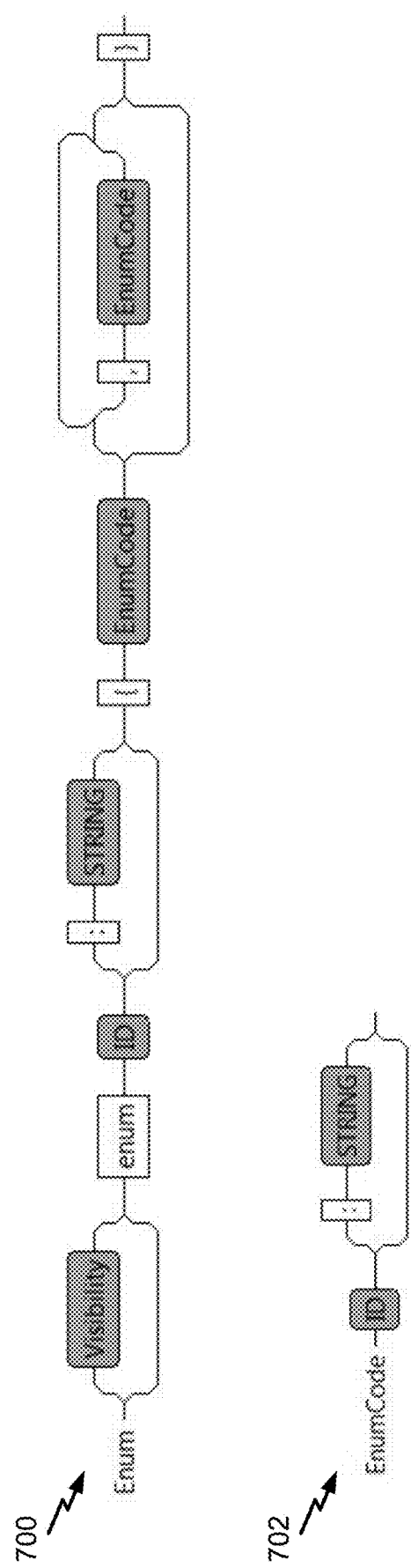
FIG. 7 illustrates examples of syntax diagrams of elements of PML.

FIG. 7 illustrates syntax graphs associated with various data types. Flight sensor data can have values of different data types, such as integer and real numbers as well as text strings. PML provides a collection of built-in data types and allows the user to define different Enum (enumerate) data types. Even though the user is not required to explicitly specify the data type most of the time, PML is still strong-typed and implicitly infers the data types from the expressions.

As used herein, "objects" refer to PML items of a given Type. When the Type is simple, "values" are also used instead of objects. For example, there can be a Time value, an Integer value, an Integer, a Parameter object, etc. Additionally, as used herein, "a Parameter value" refers to a value in the list of time-value pairs of a Parameter object.

Each type provides a set of fields and methods. Each field holds a value of some Type. Some field values are read-only, while others can be modified. Methods are similar to functions, except that methods can access fields in the same Type. Fields and methods can be static, i.e., associated with the type itself. For example, the TimePredicate type has two static fields, NEVER and ALWAYS. These fields are accessible from the type itself. Non-static fields and methods are associated with each object of the type. For example, the Parameter type has a non-static field name. Different parameter objects have different names.

The scalar types include Mappable types (e.g., can be used as a Map key) and Boolean. Boolean includes "true" or "false" and provides a static method to parse and create Boolean values from String, and a non-static method to format value to String. The Mappable type includes ParameterValue (which can be used as Parameter values) and Time. The Time type includes a duration (e.g., 1 second or 2 days, as non-limiting examples) or a timestamp (e.g., obtained by adding a duration to an initial start time). The Time type includes two static fields for special values INFINITE_PAST and INFINITE_FUTURE. The Time type also includes two read-only fields to get the previous and the next discernible time values (given internal representation of time resolution), a static method to parse and create Time values from String, and a non-static method to format Time values to String.

The ParameterValue type includes the Number type and the Text Type. The Number type includes, for each sub-type, a static method to parse and create a value from String, a static method to cast Number from different sub-types, and a non-static method to format the value into a string. The sub-types of the Number type include Integer, Float, and Double. Integer includes four sub-types: Byte (1-byte signed integer, $-128$ to $127$), Short (2-byte singed integer, $-32768$ to $32767$), Int (4-byte signed integer, $-2^31$ to $2^31-1$), and Long (8-byte signed integer, $-2^63$ to $2^63-1$). Float includes a 4-byte floating point number and includes two static fields for special values: NEGATIVE_INFINITY and POSITIVE_INFINITY. Double includes an 8-byte floating point number and includes static fields for special values: NEGATIVE_INFINITY AND POSITIVE_INFINITY.

The Text type includes two sub-types: Character and String. Character includes a single character and provides a static method to cast a number into a character using the Unicode encoding. String includes a sequence of characters and provides a read-only field for the length of the sequence and common methods to transform strings, tests, and to extract the content.

PML additionally provides complex types, some of which are generic (e.g., include arguments of other types). These complex types include List, Map, Parameter, TimePredicate, Dataset, and Void. The Void type is a special type that indicates that a function or method does not return anything.

The List type, illustrated by List<T>, includes an array (e.g., a sequence) where each item in the array is of type T. T can be any PML type (including List or Map). The List type provides non-static read-only fields for the number of items in the List, a static method to create a List by repeating an item for a specified number of times, and non-static methods to add/remove/search items. If T is Scalar or its sub-types, a List also provides non-static read-only fields for quantile statistics. If T is Number or its sub-types, a List also provides non-static read-only fields for aggregation statistics.

The Map type, illustrated by Map<K, V>, includes a dictionary (e.g., a hash) where the key is of type K and the value is of type V. K can be Mappable or its sub-types. V can be any PML type (including List or Map). The Map type provides non-static read-only fields for the number of pairs in the map, the list of keys, and the list of values. The Map type also provides non-static methods to test key containment and to remove keys from the Map.

The Parameter type, illustrated by Parameter<T>, includes a sensor data parameter including a list of time-value samples, where the value is of type T (and the time is of type Time). T can be Parameter value or its sub-types. The Parameter type provides non-static read-only fields for the name, Estimator, start time, end time, duration, and number of samples. The Parameter type also provides static methods for creating Parameters from Map or another Parameter and non-static methods for accessing samples by index, obtaining quantile and aggregation statistics, value differentiation and resampling, time-range clipping, and piecewise application of common mathematical functions.

The TimePredicate type provides a Boolean value at any given time. Conceptually, this can be thought of as Parameter<Boolean>. The TimePredicate type provides static read-only fields for the two special values ALWAYS and NEVER. The TimePredicate type also provides non-static read-only fields for the number, start time, and end time of truth intervals as well as the total length of all truth intervals. The TimePredicate type also provides non-static methods to access individual truth intervals, filter out long or short intervals, clip the intervals, and test what is covered by the truth intervals.

The Dataset type includes a start time and an end time (both of type Time), metadata (as a Map<String, Scalar>), and parameters (as a Map<String, Parameter>). In a particular implementation, the Dataset type also provides a static method to load and create Dataset from files or String, non-static field for the start time, end time, duration, parameter map, metadata map, source, airline operator, aircraft identifier, and flight leg identifier. In other implementations, the Dataset type includes fewer than or more than the described fields.

In a particular implementation, generic types are instantiated by replacing their formal type arguments (e.g., T in List<T>, or K and V in Map<K, V>) by the non-generic types (e.g., List<Integer>) or instantiated generic types (e.g., Map<String, List<Float>>). Generic types can also be partially instantiated (e.g., Map<String, List<T>>).

Another type supported by PML is Enum, which is a user-defined type. The syntax of the Enum definition is illustrated by a first syntax graph 700. Similar to function, an Enum type can be private or public, with the default being private. The name of an Enum type is an Identifier (ID) and the body of an Enum type includes a list of code (EnumCode) inside a pair of curly brackets { }. The EnumCode has a syntax illustrated by a second syntax graph 702. Each EnumCode has a unique name (ID) in the same Enum type. Both the Enum and the EnumCode can have an optional free-text description (STRING). Each Enum type is a distinct type, defining a list of enumerated code. As an example, the PML code enum FlightPhase {Takeoff, Climb, Cruise, Descent, Landing} defines an enumerated type FlightPhase that can have one of five possible values: Takeoff, Climb, Cruise, Descent, and Landing. PML also has a built-in enum type for estimating values in a Parameter: enum Estimator {carryForward, carryBackward, nearestNeighbor, LinearinterpolateCx, LinearinterpolateLx}.

Figure 8:
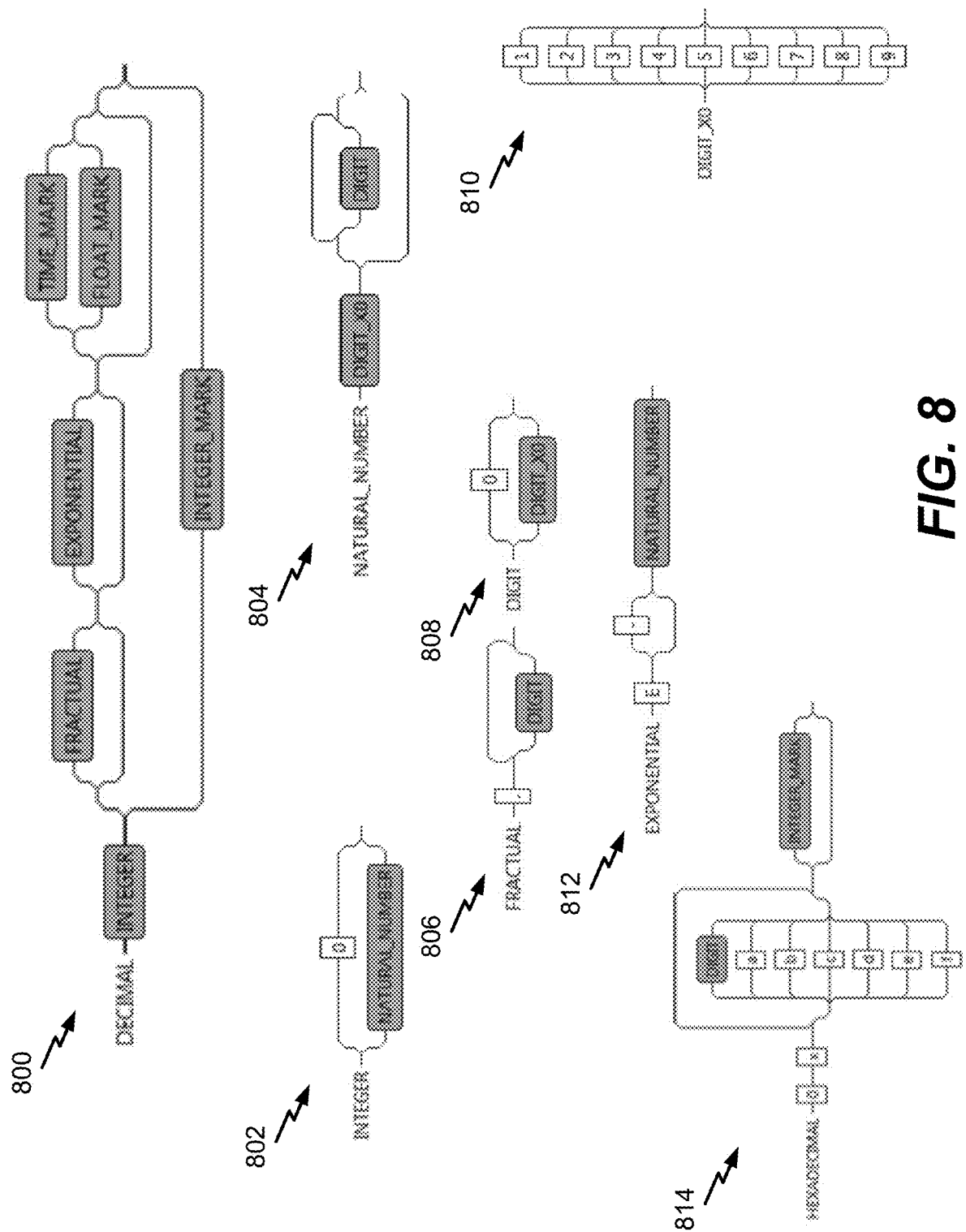
FIG. 8 illustrates examples of syntax diagrams of elements of PML.
Figure 9:
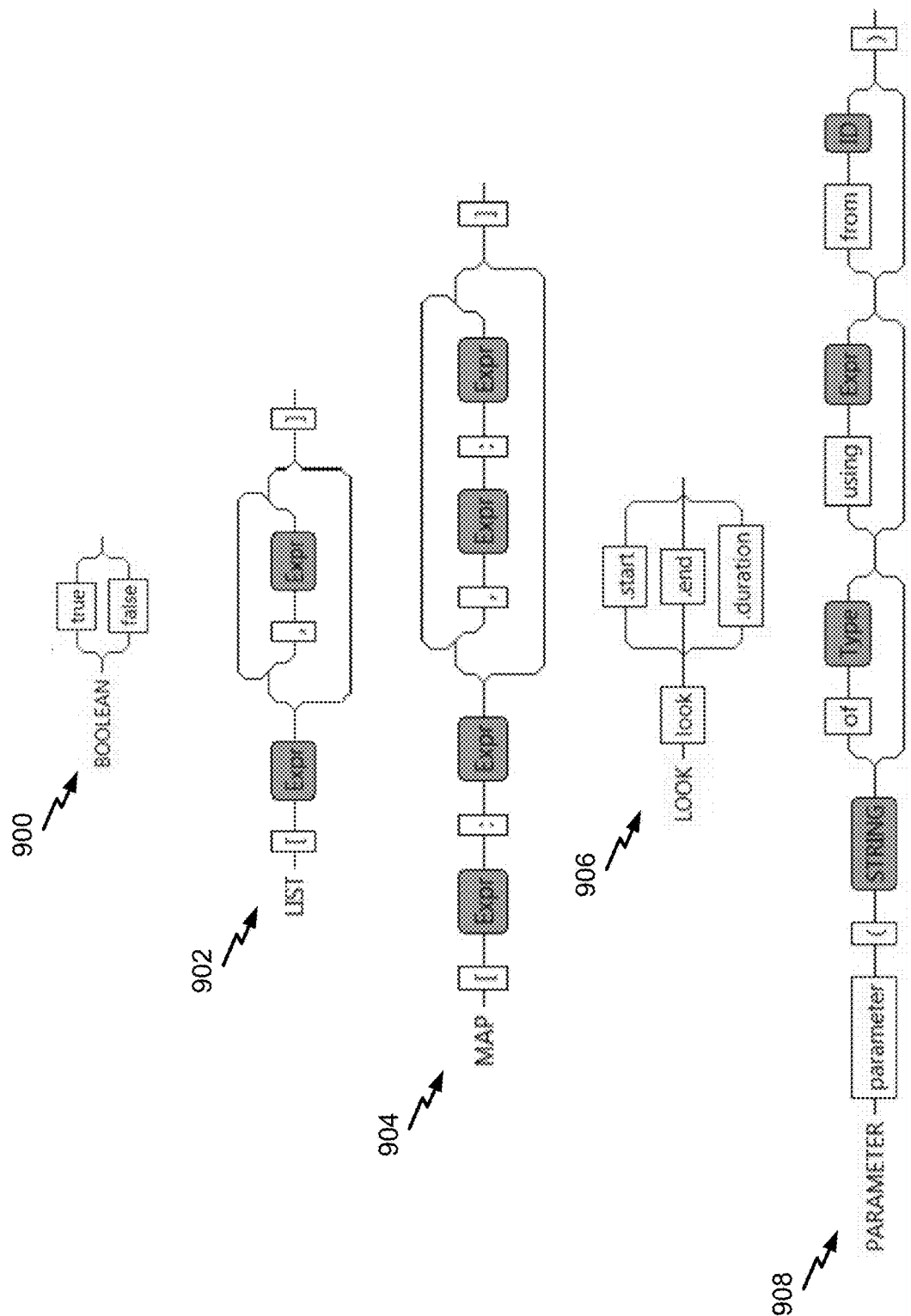
FIG. 9 illustrates examples of syntax diagrams of elements of PML.

FIGS. 8 and 9 illustrate syntax graphs associated with various literals. PML supports literals. Literals are values directly specified instead of calculated from others. Literals are often used for constants. Types of literals include DECIMAL, HEXADECIMAL, CHARACTER, STRING, BOOLEAN, THIS, LOOK, LIST, MAP, and PARAMETER.

PML supports both decimal and hexadecimal literals. A syntax of a DECIMAL literal is illustrated by a first syntax graph 800 of FIG. 8. DECIMAL can be a Number or Time constant. Time constants are clearly marked by TIME_MARK in the first syntax graph 800. As a number can be different sub-types, INTEGER_MARK and FLOAT_MARK are used to differentiate them. Without any mark, a DECIMAL literal has a Double type if it has a FRACTUAL part, an EXPONENTIAL part, or both, otherwise it has an Int type. The Integer type includes zero or a NATURAL_NUMBER, as indicated by a second syntax graph 802. NATURAL_NUMBER includes a DIGIT_X0 followed by zero or more DIGITS, as indicated by a third syntax graph 804.

FRACTUAL includes a "." followed by one or more DIGITs, as indicated by a fourth syntax graph 806. DIGIT includes a zero or a DIGIT_X0, as indicated by a fifth syntax graph 808. DIGIT_X0 includes one, two, three, four, five, six, seven, eight, or nine, as indicated by a sixth syntax graph 810. EXPONENTIAL includes "E" followed by an optional "-" followed by a NATURAL_NUMBER, as indicated by a seventh syntax graph 812.

INTEGER_MARK includes a Byte, a Short, an Int, or a Long. FLOAT_MARK includes a Float or a Double. In a particular implementation, TIME_MARK includes nanosecond, microsecond, millisecond, second, minute, hour, and day. In other implementations, other designations of time are included in TIME_MARK.

HEXADECIMAL has a syntax according to an eighth syntax graph 814. HEXADECIMAL is a constant of an Integer sub-type, depending on the INTEGER_MARK. However, the digits after the "0x" are interpreted using sixteen as a basis, instead of ten as in DECIMAL.

PML also supports text literals with either a single character or a sequence of characters, both in Unicode. CHARACTER is a constant that includes a single Unicode character inside a pair of single quotes ' '. As an example, a text literal can be defined 'X', where X is either a backslash \ followed by any single Unicode character or a single Unicode character which is neither backslash \ nor single quote '. STRING is a sequence of characters inside a pair of double quotes " ". As an example, a string literal can be defined "X", where X is one or more of a backslash \ followed by any single Unicode character or a Unicode character which is neither a backslash \ nor a double quote ". In both CHARACTER and STRING, the backslash \ can be used to introduce a special character: tab (\t), backspace (\b), new line (\n), carriage return (\r), form feed (\f), single quote (\'), double quote (\"), or backslash (\\), as non-limiting examples.

PML supports Boolean literals. A Boolean literal is either true or false, as indicated by a first syntax diagram 900 of FIG. 9. PML also supports two types of collections: list (e.g., array or sequence) and map (e.g., dictionary, associative array, or hash). A List literal has a syntax indicated by a second syntax diagram 902. The List literal has type List<T>, where T is the least common parent type of all the list items. A Map literal has a syntax indicated by a third syntax diagram 904. The Map literal includes a set of key-value expression (Expr) pairs. All keys must be the value of a common (possibly parent) type K and K is mappable. Each key is distinct in the map. The value can be null.

PML supports Look forward and Look backward expressions, as further described herein. In these expressions, LOOK literals can be used to refer to the time constraining the Look expression. Specifically, LOOK can be one of the following three cases: look.start, look.end, and look.duration, as indicated by a fourth syntax diagram 906. Look.start is a value of type Time (usually considered as milliseconds since epoch starts) and is the starting time of the current look forward/backward period. Look.end is a value of type Time (usually considered as milliseconds since epoch starts) and is the end time of the current look forward/backward period. Look.duration is a value of type Time (usually milliseconds between look.start and look.end) and is the length of the current look forward/backward period.

PML also supports Parameter literals, as indicated by a fifth syntax graph 908. PARAMETER refers to a parameter in a sensor dataset. The STRING literal (not a general expression) here specifies the name of the parameter. The optional Type operand specifies the value type of the parameter; if not provided, it defaults to Float. The optional Expr specifies an Estimator (enum object) used to estimate values at arbitrary time using samples in the parameter. The optional ID specifies the dataset variable name; if not specified, it defaults to the input sensor dataset.

FIGS. 10-13 illustrate syntax graphs for various expressions and operations in PML. In PML, expressions can be references to a (global or local) variable, a formal argument (in a function or a template), a literal, or operations on sub-expressions. Variables and formal arguments are directly referenced by their names, which are simply identifiers (IDs). Table 1 lists operations supported by PML.

TABLE 1

| Operators | Precedence, Name: Description |
| --- | --- |
| ? : | 1, Condition: take one of the last two operands per test condition |
| Look from to .. : | 2, Look: look backward/forward for a constrained period such that a condition holds true for the whole period |
| ? : | 3, Trace: find the first operand that is not null |
| \|\| | 4, OR: Boolean disjunction, TimePredicate union |
| && | 5, AND: Boolean conjunction, TimePredicate intersection |
| is not null | 7, TestNull: test an object to see whether it is, or is not, null |
| is not | 7, TestType: test an object to see whether it is, or is not, of a given Type |
| _/ | 8, BecomesTrue: find when a TimePredicate changes from false to true |
| \_ | 8, BecomesFalse: find when a TimePredicate changes from true to false |
| < <= > >= == != | 9, Compare: compare Number, Text, Time and Parameter in pairwise fashion |
| + − | 10, AddSub: Number/Time add/subtract, String concatenation, Parameter/List/Map piecewise add/subtract/concatenation |

TABLE 1-continued

| Operators | Precedence, Name: Description |
| --- | --- |
| * / % | 11, MulDivMod: Number/Time multiply/divide/modulo; Parameter/List/Map piecewise multiply/divide/modulo |
| @ | 12, Extract: extract Parameter and TimePredicate value at given time |
| _> | 12, RightShift: shift Parameter and TimePredicate time towards future |
| <_ | 12, LeftShift: shift Parameter and TimePredicate time towards past |
| ^ | 13, Power: Number exponential, Parameter/list/Map piecewise exponential |
| − | 14, Negate: Number/Time negation, Parameter/List/Map piecewise negation |
| [ ] | 15, Index: get item from a List by index, get value from a Map by key |
|  | 16, ObjectField: access non-static field of an object |
| . < , > ( ) | 16, ObjectMethod: call non-static method of an object |
| $ : | 16, StaticField: access static field of a data type |
| $ : < , > ( ) | 16, StaticMethod: call static method of a data type |
| < , > ( ) | 17, Call: call a function |
| new < , > ( ) | 17, New: create a new object of a given type |
| [? : for in \| ] | 18, Filter: create a new List/Map using values in existing List/Map with optional condition test |
| any all ( : for in \| ) | 18, Aggregate: apply Boolean OR/AND on a list of Boolean values, apply TimePredicate union / intersection on a list of TimePredicate objects |
| ( ) | 19, Group: group the sub-expressions together |

The precedence determines the priority to bind operators with operands. For example, $1+2*3==1+(2*3)!=(1+2)*3$, as multiplication has a higher priority than addition. In the syntax graphs of FIGS. 10-13, the Expr in the syntax graphs refer to another valid expression with a higher precedence than the current expression under definition.

Figure 10:
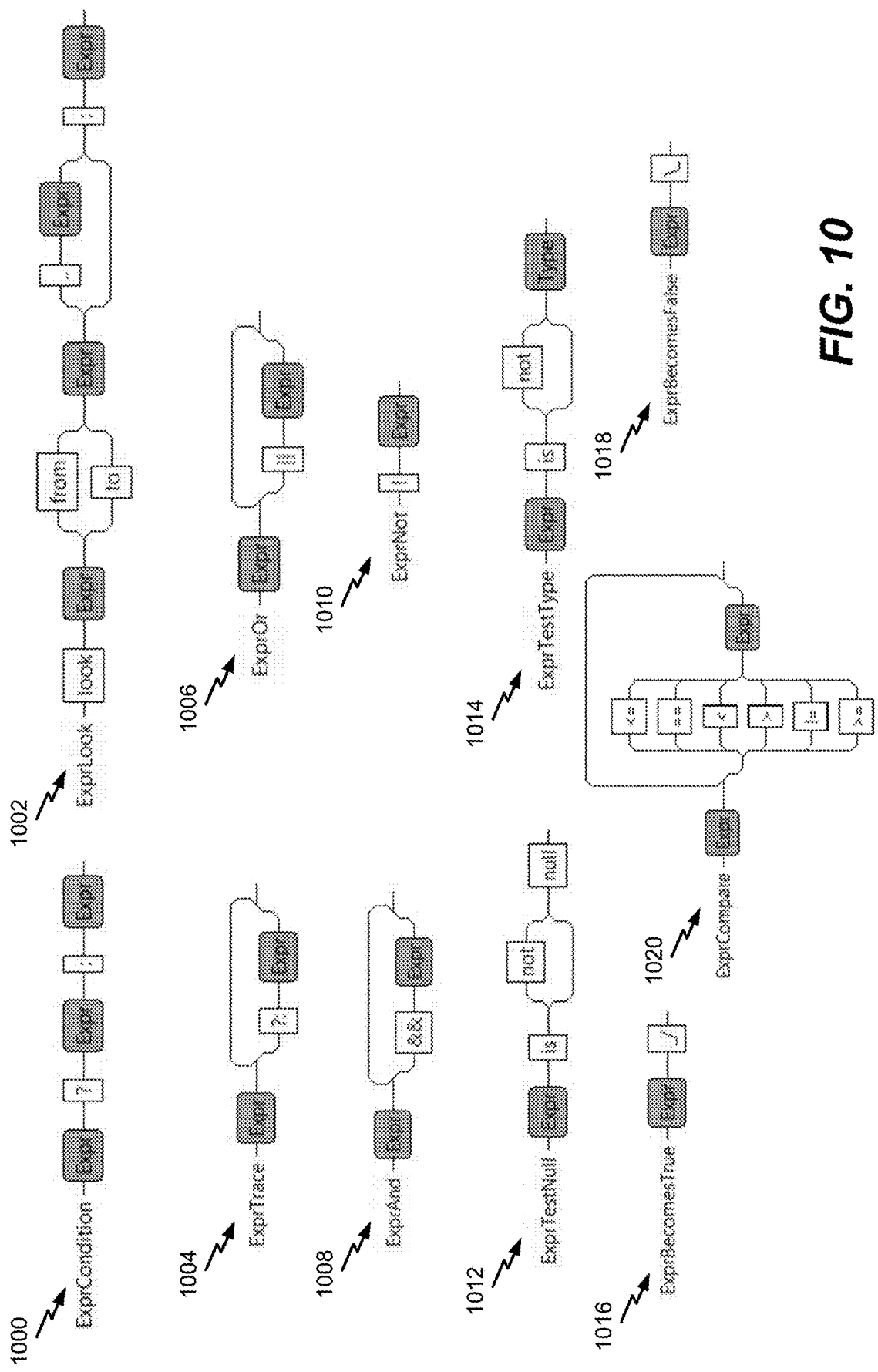
FIG. 10 illustrates examples of syntax diagrams of elements of PML.

PML supports a condition expression having a syntax as indicated by a first syntax graph 1000 of FIG. 10. The condition expression (ExprCondition) has two operators and three operands. The first operand (Expr) is the condition and has a Boolean type. The result of ExprCondition has the type T, where T is the least common super type of the last two (Expr) operands. If the condition is true, the result is the second operand; if the condition is false, the result is the last operand; otherwise (i.e., the condition is null) the result is null. For example, a condition expression can be defined as parameter("X").size >100 ? "Many": "Few". If parameter X does not exist for the particular flight, the result is null. Otherwise, if the size of parameter X is greater than 100, the result is "Many", otherwise the result is "Few".

PML supports a Look expression having a syntax as indicated by a second syntax graph 1002. The Look expression (ExprLook) yields a Boolean true value if a condition holds all the time for a constrained period. The look expression has three or four operands. The first operand (Expr) is of type Time, and specifies the length of the look period. The last operand (Expr) specifies the condition to be tested for the whole period. Not only is the period length specified, the period anchoring time is also constrained. If keyword "from" is used, the period is anchored by its starting time; otherwise (e.g., the keyword "to" is used), the period is anchored by its ending time. With three operands, the period anchoring time is specified by the second operand (Expr), which has type Time. With four operands, the period anchoring time is constrained between the second and the third operands, both with type Time. In other words, the period is floating within the constraint, and the ExprLook yields true as long as there exists a single period within this constraint and the condition holds true for the whole period.

The last operand, condition, usually has type TimePredicate. If it is a Boolean, then a true value is treated as TimePredicate ALWAYS, and a false value is treated as TimePredicate NEVER. If any operand is null, the ExprLook yields a null value. If the period length (first Expr operand) is not positive, the ExprLook yields a false value. For the floating period case (with four operands), if the second operand is greater than the third operand, the ExprLook also yields a false value. The ExprLook yields a true value if the condition of the fourth operand holds true for all the time indicated by the constrained time period. Thus, the output of the Look expression indicates whether a sensor parameter has a particular value during a particular time period (e.g., the constrained time period) indicated as an input (e.g., by the first, second, and third operands) to the Look expression.

PML supports a Trace expression having a syntax as indicated by a third syntax graph 1004. The Trace expression (ExprTrace) can have two or more operands (Expr). The result has type T, where T is the least common super type of all operands. The Trace expression yields the value of the first operand (from left to right) that does not have a null value. If all operands have a null value, the Trace expression yields null.

PML supports an OR expression having a syntax as indicated by a fourth syntax graph 1006. The OR expression (ExprOr) has two or more operands. The OR expression is used for two cases. The first case is to find Boolean disjunction of a list of Boolean (Expr) operands. In this case, ExprOr yields true if any operand has a value of true; otherwise, ExprOr yields null if any operand has a null value; otherwise, ExprOr yields false (e.g., if all operands are non-null and have a value of false). The second case is to create a new TimePredicate from a list of TimePredicate objects, where the truth interval of the result is the union of all truth intervals of the operands. In other words, if one operand has value ALWAYS, the result is ALWAYS; else, if one operand has a null value, the result is null; otherwise, the result is a TimePredicate that returns true at and only at any time that at least one operand returns true.

PML supports an AND expression having a syntax as indicated by a fifth syntax graph 1008. The AND expression (ExprAnd) has two or more operands. The AND expression is used for two cases. The first case is to find the Boolean conjunction of a list of Boolean (Expr) operands. In this case, ExprAnd yields false if any operand has a value of false; otherwise, ExprAnd yields null if any operand has a null value; otherwise, ExprAnd yields true (e.g., if all operands are non-null and have a value of true). The second case is to create a new TimePredicate from a list of TimePredicate objects, where the truth interval of the result is the intersection of all truth intervals of the operands. In other words, if one operand has the value NEVER, the result is NEVER; otherwise if one operand has a null value, the result is null; otherwise, the result is a TimePredicate that returns true at and only at any time that all operands return true.

PML supports a NOT expression having a syntax as indicated by a sixth syntax graph 1010. The NOT expression (ExprNot) takes a single operand. The NOT expression is used for two cases. The first case is to find the Boolean negation of the Boolean (Expr) operand. In this case, ExprNot yields false if the operand has a value of true; otherwise, ExprNot yields null if the operand has a null value; otherwise, ExprNot yields true (e.g., if the operand has a value of false). The second case is to create a new TimePredicate from the TimePredicate operand, where the truth interval of the result is the complement of the truth interval of the operand. In other words, if the operand has a null value, the result is null; otherwise, the result is a TimePredicate that returns true at and only at any time when the operand returns false.

PML supports a TestNull expression having a syntax as indicated by a seventh syntax graph 1012. The TestNull expression tests whether the operand is null or not. With the keyword "not", the TestNull expression yields true if and only if the (Expr) operand is not null. Without the keyword "not", the TestNull expression yields true if and only if the (Expr) operand is null.

PML supports a TestType expression having a syntax as indicated by an eighth syntax graph 1014. The TestType expression tests whether the (Expr) operand has a given type (Type operand). If the operand has a null value, the result is null. Otherwise, with the keyword "not", the result is false if and only if the operand has a value of the given type or its sub-type. Without the keyword "not", the result is true if and only if the operand has a value of the given type or its sub-type.

PML supports a BecomesTrue expression having a syntax as indicated by a ninth syntax graph 1016. The BecomesTrue expression has a single operand of type TimePredicate and finds all the instances when the TimePredicate changes from false to true. The result has type List<Time>. If the TimePredicate is null, the result is null. If the TimePredicate never changes from false to true, the result is an empty List<Time>. For example, if the TimePredicate is NEVER or ALWAYS, there is no change, and the result is an empty list. If the TimePredicate is true from the infinite past, and because false at a given time and stays false afterwards, the result is also an empty list. If the TimePredicate becomes true at a particular set of times, the result is a list of the particular set of times.

PML supports a BecomesFalse expression having a syntax as indicated by a tenth syntax graph 1018. The BecomesFalse expression has a single operand of type TimePredicate and finds all the instances when the TimePredicate changes from true to false. The result has type List<Time>. If the TimePredicate is null, the result is null. If the TimePredicate never changes from true to false, the result is an empty List<Time>. For example, if the TimePredicate is NEVER or ALWAYS, there is no change, and the result is an empty list. If the TimePredicate is false from the infinite past, and because true at a given time and stays true afterwards, the result is also an empty list. If the TimePredicate becomes false at a particular set of times, the result is a list of the particular set of times.

PML supports a Compare expression having a syntax as indicated by an eleventh syntax graph 1020. The compare expression contains two or more (Expr) operands. Each consecutive pair yields a Boolean or TimePredicate value, and all these yielded values are combined with the AND operator to yield the result of the Compare expression. For each consecutive pair of operands, if one of them is a null value, then the comparison of the pair yields a null value. Otherwise, the result of the comparison for each consecutive pair of operands depends on the comparison operator between them and the data types of the two operands. For example, if two Number values are compared, the result if Boolean. If two Character values are compared, the result is Boolean. If two String values are compared, the result is Boolean. If two Time values are compared, the result is Boolean. If two codes from the same Enum type are compared, the result is Boolean according to the definition order of the two codes in the Enum type. If two Parameters (each having values that are both Numbers, Characters, or Strings)

are compared, the result is a TimePredicate that returns true for any time when the estimated pair of values at that time from the two Parameter objects satisfy the comparison operator between the operands. If a Parameter object is compared to a threshold (and both the Parameter object and the threshold are Numbers, Characters, or Strings), the result is a TimePredicate that returns true for any time when the estimated value at that time from the Parameter object and the threshold satisfy the comparison operator between the two operands.

PML supports multiple arithmetic expressions, including an AddSubtract expression having a syntax as indicated by a first syntax graph 1100 of FIG. 11. The AddSubtract expression has two or more operands. If any operand is null, the result is null. In a particular implementation, numeric overflow and underflow is not handled by the AddSubtract expression. The result of the AddSubtract expression is obtained by applying the operators from left to right. Each time, an operator is applied on the result obtained from the left of the operator and the operand at the right of the operator. If both operands are Number (or its sub-types), the result is the addition or subtraction with the type being the minimum common parent type of the operands' types. If both operands are Time, the result is the addition or subtraction of time durations. If the left operand is Text and the right operand is Text or Number, the result is the concatenation of the left and right operands, where Number is converted to its natural text representation. If both operands are Parameter objects, the result is a new Parameter with a value at any sampled time of either operand as the addition, subtraction, or concatenation of the values estimated at that time from the two operands.

If both operands are List, the result is a new List with an item at any index that is the addition, subtraction, or concatenation of the items at the same index from the two operands. If the two operand lists do not have the same length, the items in the shorter one are repeated to meet the length of the longer one. For example, ["A", "B"]+[1, 2, 3, 4, 5] yields ["A1", "B2", "A3", "B4", "A5"] because the shorter list is implicitly updated to ["A", "B", "A", "B", "A"].

If both operands are Map, the result is a new Map with a value at any key that is common to both operands and is the addition, subtraction, or concatenation of the values at the same key from the two operands. In a particular implementation, keys that only exist in one operand are ignored. For example, ["A":3, "B":4]+["A":1, "C":2] yields ["A":4] since "A" is the only common key.

A MulDivMod (MultipleDivideModulo) expression has a syntax as indicated by a second syntax graph 1102. The MulDivMod expression has two or more operands. If any operand is null, the result is null. In a particular implementation, numeric overflow or underflow is not handled. For Integers, dividing by zero will result in errors. For Float, Double, and Time, dividing by zero will yield positive infinity, negative infinity, or NaN (not-a-number, as a result of 0 divided by 0). The result of the MulDivMod expression is obtained by applying the operators from left to right. Each time, an operator is applied on the result obtained from the left of the operator and the operand at the right of the operator. If both operands are Number (or its sub-types), the result is the multiplication/division/modulo with the type of the minimum common parent type of the operands' types. If both operands are Time and the operator is division, the result is Numbers as the ratio between the two Time operands. If both operands are Time and the operator is modulo, the result is Time as the modulo of the first operand with respect to the second operand.

If the left operand is Time, the right operand is Number, and the operator is multiplication or division, the result is Time (as a duration) as the left operand (Time as a duration) stretched/shrunk by the right operand (Number as a ratio). If the left operand is Number, the right operand is Time, and the operator is multiplication, the result is Time (as a duration) as the right operand (Time as a duration) stretched by the left operand (Number as a ratio).

If both operands are Parameter objects, the result is a new Parameter with a value at any sampled time of either operand being the multiplication/division/modulo of the values estimated at that time from the two operands. If one operand is Parameter and the other is Time or Number, the result is a new Parameter with a value at any sampled time of the first operand being the multiplication/division/modulo of the values estimated at that time from the first operand and the value of the second operand.

If both operands are List, the result is a new List with an item at any index being the multiplication/division/modulo of the items at the same index from the two operands. If the two operand Lists do not have the same length, the items in the shorter List are repeated to meet the length of the longer List. If both operands are Map, the result is a new Map with a value at any key that is common to both operands being the multiplication/division/modulo of the values at the same key from the two operands. In a particular implementation, keys that only exist in one operand are ignored.

A power expression has a syntax as indicated by a third syntax graph 1104. The power expression has two operands. If either operand is null, the result is null. If both operands are Number (or its sub-types), the result is the left operand raised to the power of the right operand. The result is Double, and can be infinity or NaN per mathematical definition. If both operands are Parameter objects, the result is a new Parameter<Double> with a value at any sampled time of either operand being the Power expression result (as described with reference to Numbers) on the values estimated at that time from the two operands. If one operand is Parameter and the other is Number, the result is a new Parameter having a value at any sampled time of the first operand being the Power expression result (as described with reference to Numbers) of the value estimated at that time from the Parameter operand and the Number operand. If both operands are Lists, the result is a new List having an item at any index that is the Power expression result (as described with reference to Numbers) of the items at the same index from the two operands. If the two operand lists do not have the same length, the items in the shorter List are repeated to meet the length of the longer List. If both operands are Map, the result is a new Map having a value at any key that is common to both operands as the power expression result (as described with reference to Numbers) of the values at the same key from the two operands. In a particular implementation, keys that exist in only one operand are ignored.

A negate expression has a syntax as indicated by a fourth syntax graph 1106. The negate expression has a single operand. If the operand is null, the result is null. If the operand is Number (or its sub-types), the result is the negation of the operand and has the same data type. In a particular implementation, overflow is ignored. If the operand is Time (as a duration) the result is the negation of the operand and has the same data type. If the operand is Parameter, the result is a new Parameter having a value at any sampled time of the operand that is the negation of the value estimated at that time from the operand. If the operand is List, the result is a new List having an item at any index that is the nation of the item at the same index from the operand. If the operand is Map, the result is a new Map having a value at any key that is the negation of the value at the same key from the operand.

PML supports an Extract expression having a syntax as indicated by a fifth syntax graph 1108. The Extract expression has two operands. The right operand is of type Time (as offset from the epoch start). The left operand is Parameter or TimePredicate. If either operand is null, the result is null. If the left operand is Parameter, the result is the estimated value of the Parameter at the given time. If the left operand is a TimePredicate, the result is the Boolean value of the TimePredicate at the given time.

PML supports a LeftShift expression having a syntax as indicated by a sixth syntax graph 1110. The LeftShift expression has two operands. The right operand is Time (as offset from the epoch start). The left operand is Parameter or TimePredicate. If either operand is null, the result is null. If the left operand is Parameter, the result is a new Parameter with the same samples from the Parameter operand except that the time of each sample is shifted to the past by the second operand. If the left operand is a TimePredicate, the result is a new TimePredicate that returns at time t true if and only if the left operand returns true at time t plus the second operand.

PML supports a RightShift expression having a syntax as indicated by a seventh syntax graph 1112. The RightShift expression has two operands. The right operand is Time (as offset from the epoch start). The left operand is Parameter or TimePredicate. If either operand is null, the result is null. If the left operand is Parameter, the result is a new Parameter with the same samples from the Parameter operand except that the time of each sample is shifted to the future by the second operand. If the left operand is a TimePredicate, the result is a new TimePredicate that returns at time t true if and only if the left operand returns true at time t minus the second operand.

PML supports an Index expression having a syntax as indicated by an eighth syntax graph 1114. The Index expression has two operands. If either operand is null, the result is null. If the left operand is List and the right operand is an Integer, the result is the item in the List at the given index specified by the right operand. In a particular implementation, the index is 0-based (i.e., the first item in the List has index 0). For a List having N items, where the index is K, if K>=N or K<–N, the result is null. If 0<=K<N, the result is the (K+1)th item in the List. If –C<=K<0, the result is the (K+C+1)th item in the list. If the left operand is Map and the right operand is a value of the key type of the Map, the result is the value (which can be null) for the key in the Map. If the key does not exist in the Map, the result is null. The List items and Map values can themselves be a nested List or Map. As a result, the Index expression can be chained to identify the nested item or value.

Figure 12:
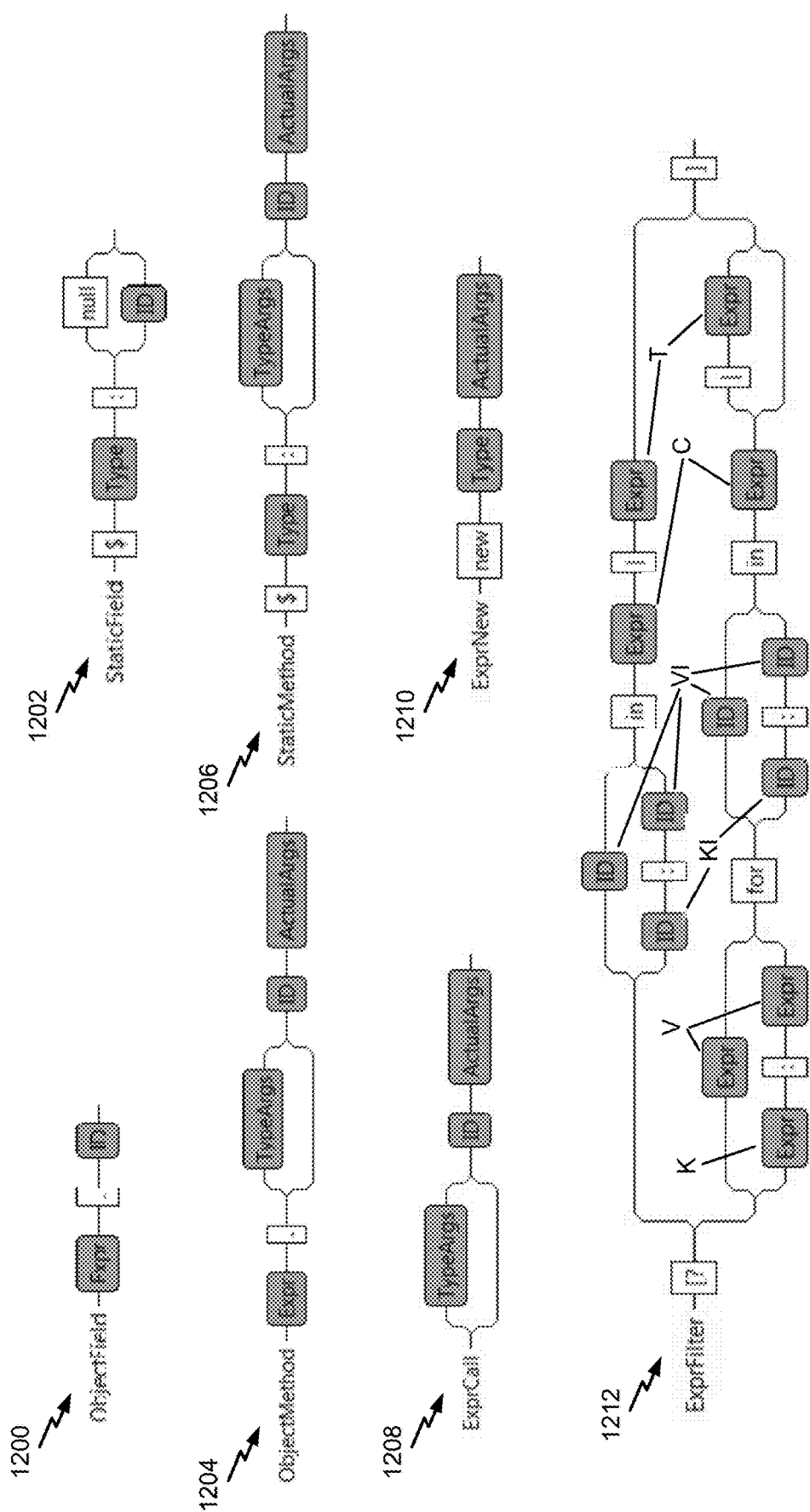
FIG. 12 illustrates examples of syntax diagrams of elements of PML.

FIG. 12 depicts syntax graphs of various expressions in PML. FIG. 12 includes an ObjectField expression having a syntax as indicated by a first syntax graph 1200. The ObjectField expression has two operands. The left operand is an object (Expr) of any type, and the right operand (ID) is a non-static field name of that type. If the left operand is null, the result is null. Otherwise, the result is the given field of the object.

PML supports a StaticField expression having a syntax as indicated by a second syntax graph 1202. The StaticField expression has two operands. The left operand is a type. The right operand has one of two possible values. In a first case, the right operand is a static field name (ID) of the type of the left operand. In this case, the result is the static field of the given type. In a second case, the right operand is the keyword null. In this case, the result is the special null object for the type of the left operand.

PML supports an ObjectMethod expression having a syntax as indicated by a third syntax graph 1204. The ObjectMethod expression has an object (Expr) as the first operand and a non-static method name (ID) from the type of the object. In addition, a list of actual arguments (ActualArgs) should match the formal arguments in the method definition. If the method definition uses FormalTypeArgs, a corresponding list of actual TypeArgs should be provided. Formal arguments and actual arguments are described further herein with reference to FIG. 13.

PML supports a StaticMethod expression having a syntax as indicated by a fourth syntax graph 1206. The StaticMethod expression has a Type as a first operand and a static method name (ID) from the type as another operand. In addition, a list of actual arguments (ActualArgs) should match the formal arguments in the method definition. If the method definition uses FormalTypeArgs, a corresponding list of actual TypeArgs should be provided. Formal arguments and actual arguments are described further herein with reference to FIG. 13.

PML supports a Call expression having a syntax as indicated by a fifth syntax graph 1208. The Call expression can also be referred to as an Invoke expression or an Invocation expression. The Call expression has a function name (ID) as an operand. In addition, a list of actual arguments (ActualArgs) should match the formal arguments in the function definition. If the function definition uses FormalTypeArgs, a corresponding list of actual TypeArgs should be provided. Formal arguments and actual arguments are described further herein with reference to FIG. 13. The Call expression (e.g., the Invocation expression) returns a result of the function name (ID) called with the list of actual arguments.

PML supports a New expression having a syntax as indicated by a sixth syntax graph 1210. The New expression has a Type for an operand. In addition, a list of actual arguments (ActualArgs) should match the formal arguments in one of the constructors of the type. Actual arguments are described further herein with reference to FIG. 13.

PML supports a Filter expression having a syntax as indicated by a seventh syntax graph 1212. The Filter expression outputs a list of time periods during which a sensor parameter has one or more particular values (indicated as inputs to the Filter expression). The Filter expression has a few different operands, as labeled in the seventh syntax graph 1212. The last Expr operand before the keyword for is referred to as V (e.g., value), the last Variable operand before the keyword in is referred to as VI (e.g., value iterator), the Expr operand after the keyword in is referred to as C (e.g., collection), and the Expr operand after the is referred to as T (e.g., test condition). In addition, if there are two Expr operands before the keyword for, the first operand is referred to as K (e.g., key). If there are two Variable operands, the first Variable operand is referred to as KI (e.g., key iterator). If C is null, the result is null. Otherwise, the Filter expression has different versions, examples of which are presented below.

[? VI in C|T]–C is a List object, VI is an item inside the List, and T is Boolean. Usually, VI is used inside T. The result is a new List object that contains only each item of VI in C such that T is true (neither false nor null) for the given value of VI.

[? KI:VI in C|T]–C is a Map object, KI and VI are a key-value pair inside the Map, and T is Boolean. Usually, KI or VI are both used inside T. The result is a new Map object that contains only each pair of KI:VI pair in C such that T is true given the value of KI and VI.

[? V for VI in C]–C is a List object, VI is an item inside the List. Usually VI is used in the expression V. The result is a new List object that contains the value of V for each item of VI in C.

[? V for VI in C|T]–C is a List object, VI is an item inside the List, and T is Boolean. Usually VI is used inside T and V. The result is a new List object that contains the value of V for each item of VI in C such that T is true given the value of VI.

[? V for KI:VI in C]–C is a Map object, KI and VI are a key-value pair in the Map. Usually KI or VI or both are used inside V. The result is a new List object that contains the value of V for each pair of KI and VI in C.

[? K:V for VI in C]–C is a List object, VI is an item inside the List. Usually VI is used in the expression K and V. The result is a new Map object that contains the key-value pair of K and V for each item of VI in C.

[? K:V for VI in C|T]–C is a list object, VI is an item inside the List, and T is Boolean. Usually VI is used inside T, K, and V. The result is a Map object that contains the key-value pair of K and V for each item of VI in C such that T is true given the value of VI.

[? K:V for KI:VI in C]–C is a Map object, KI and VI are a key-value pair in the Map. Usually KI or VI or both are used inside K and V. The result is a Map object that contains the key-value pair of K and V for each pair of KI and VI in C.

[? K:V for KI:VI in C|T]–C is a Map object, KI and VI are a key-value pair in the Map, and T is Boolean. Usually KI or VI or both are used inside T, K, and V. The result is a Map object that contains the key-value pair of K and V for each pair of KI and VI in C such that T is true given the values of KI and VI.

Figure 13:
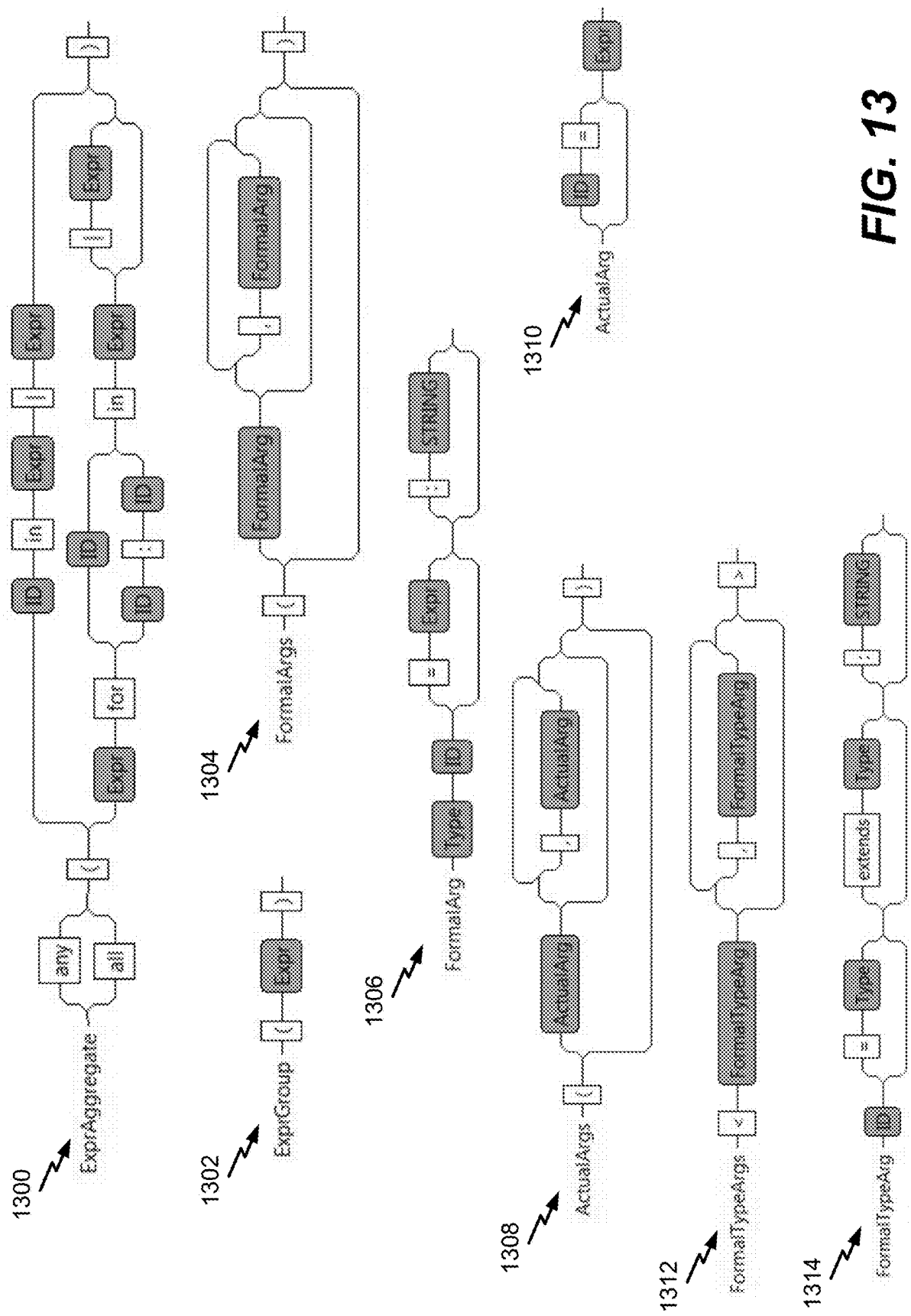
FIG. 13 illustrates examples of syntax diagrams of elements of PML.

PML supports an Aggregation expression having a syntax as indicated by a first syntax graph 1300 of FIG. 13. The Aggregation operation outputs an aggregation of multiple inputs. The Aggregation operation has a few different operands within the parentheses, similar to the operands within the squared brackets of the Filter expression. In some implementations, as the Aggregation operation is applied to a list of Boolean values or a list of TimePredicate objects, the operands within the parentheses are only used to produce a List, not a Map. As a result, when there is not keyword "for", K in the Filter expression is not allowed; when there is a keyword "for", KI in the Filter expression is not allowed.

The operands in the Aggregation expression are used to yield a list as in the Filter expression. If this list is null, the result of the Aggregation expression is null. Different types of aggregations are performed on different types of Lists. A Boolean conjunction is performed when the keyword "all" is used and the operands yield a list of Boolean values. In this case, the result of the Aggregation expression is the same as an AND expression performed on the List. A Boolean disjunction is performed when the keyword "any" is used and the operands yield a list of Boolean values. In this case, the result of the Aggregation expression is the same as an OR expression performed on the List. A TimePredicate intersection is performed when the keyword "all" is used and the operands yield a list of TimePredicate values. In this case, the result of the Aggregation expression is the same as an AND expression performed on the List. A TimePredicate union is performed when the keyword "any" is used and the operands yield a list of TimePredicate values. In this case, the result of the Aggregation expression is the same as an OR expression performed on the List.

PML supports a Group expression having a syntax as indicated by a second syntax graph 1302. The Group expression has a single operand within the parentheses. The result of the Group expression is the operand value.

FIG. 13 also depicts syntax graphs associated with arguments. Functions and methods are often defined with formal arguments. Inside the function or method definition, these formal arguments are used in expressions. When functions or methods are used (called), actual arguments should be provided to match the corresponding formal arguments.

Formal arguments have a syntax as indicated by a third syntax graph 1304. The list of formal arguments (FormalArgs) are separated by commas and enclosed in a pair of parentheses for any function or method definition. Each formal argument has a syntax as indicated by a fourth syntax graph 1306. Each formal argument (FormalArg) has a data Type, a name (ID), an optional default value (Expr) and an optional free-text description (STRING). In the same list, different formal arguments must have different names. If a default value exists, the formal argument is optional; otherwise, it is mandatory. In some implementations, in any function or method definition, optional formal arguments must be defined after mandatory formal arguments.

Actual arguments have a syntax as indicated by a fifth syntax graph 1308. The list of actual arguments (ActualArgs) are also separated by commas and enclosed in parentheses for any function or method call. Each actual argument has a syntax as indicated by a sixth syntax graph 1310. Each actual argument (ActualArg) has a value (Expr) and an optional name (ID). For the same list, different actual arguments must have different names, if specified.

For any function or method, if it has M mandatory formal arguments and O optional formal arguments in the definition, any call to this function or method shall have at least M actual arguments, where the k-th actual argument matches the k-th mandatory formal argument for k=1, . . . , M. In some implementations, if an actual argument (matching a mandatory formal argument) specifies a name, it must be the same as the corresponding matched formal argument. For any actual argument after these M arguments, it must match one of the optional formal arguments with the same name. For the value of each actual argument, its type must be the same as or a sub-type of the corresponding matched formal argument.

In function and method definitions, a list of generic types, called formal type arguments, can be used in the formal arguments or return type. Formal type arguments have a syntax as indicated by a seventh syntax diagram 1312. Formal type arguments are separated by commas and are enclosed in a pair of angle brackets < >.

Each formal type argument has a syntax as indicated by an eighth syntax graph 1314. Each formal type argument can be an identifier, with an optional free-text (STRING) description of the type argument. In addition, an optional default type can be declared (=Type). If so, the default type is used for the type argument when the caller does not specify the actual type (and PML cannot infer it from the actual argument values). A formal type argument can also specify a super type (extends Type). If so, the actual type used by the caller must be a valid sub-type of this super type.

For example, if the super type is Number, the caller can only use a number, including fixed point integers and floating-point integers.

FIGS. 14-40 illustrate methods of generating executable code based on PML code. In a particular implementation, the methods 14-40 are performed by the computing device 104 (e.g., by the processor 110).

PML is designed for engineers and data scientists to specify parameter manipulation logic at a high level. To execute the defined logic, PML is used to generate existing computer language code so that it can be executed with flight sensor data as an input. In a particular implementation described with reference to FIGS. 14-40, the PML code is implemented in Java code. The Java code leverages a supporting framework, described further herein, so that the code can be deployed into standalone computers or cluster nodes and the logic can be executed on individual flights or large batches of flights. In other implementations, PML is used to generate other executable code, such as Python code, C++ code, or another type of code. In the code described with reference to FIGS. 14-40, text inside << >> is replaced with the value defined by the text enclosed by the << >>.

Figure 14:
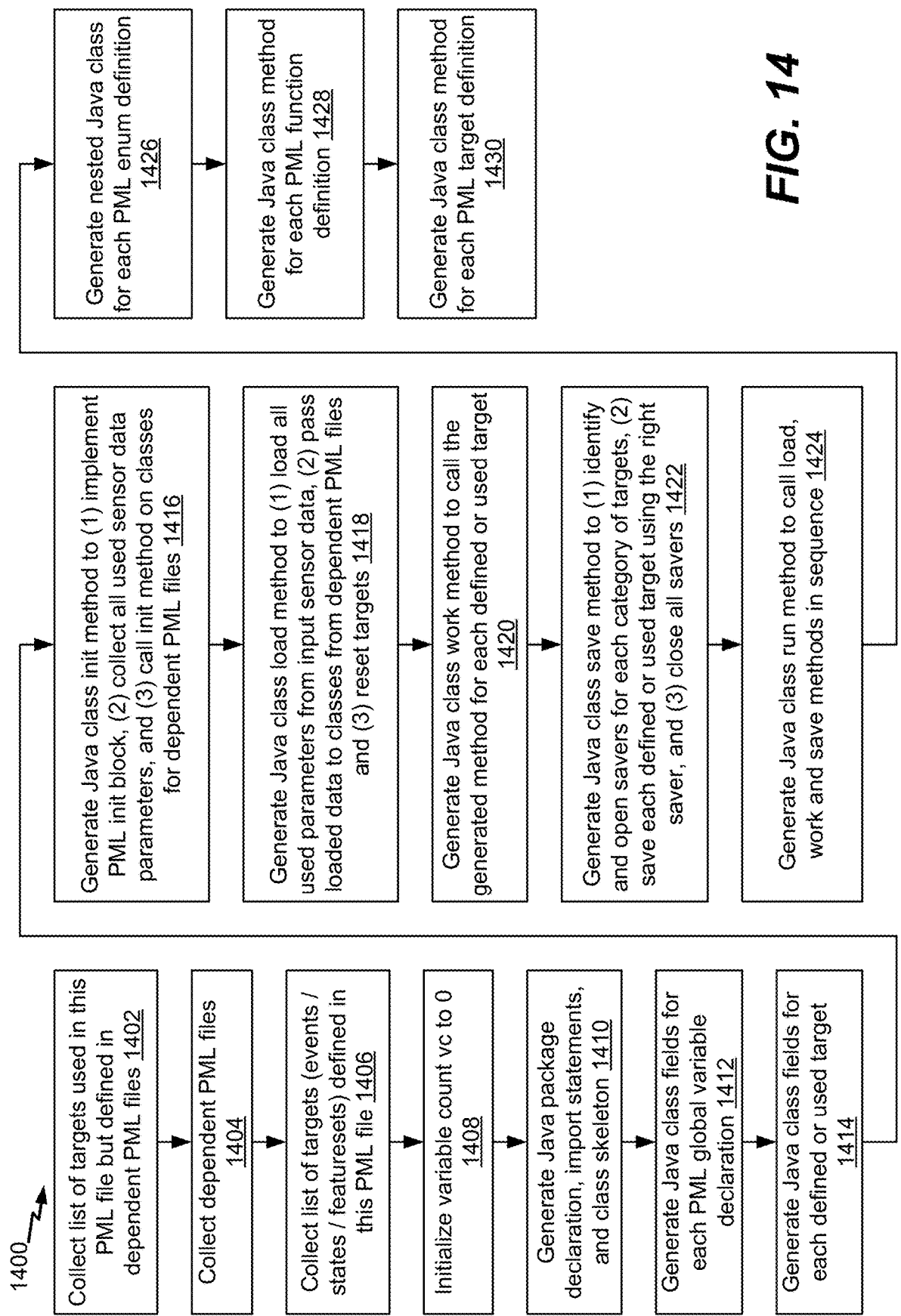
FIG. 14 is a flow chart of an example of a method of generating a Java class for a PML file.

FIG. 14 illustrates a method 1400 of generating a Java class for a PML file. The method 1400 includes collecting a list of targets used in this PML file but defined in dependent PML files, at 1402. The method 1400 includes collecting dependent PML files, at 1404, and collecting a list of targets (events/states/featuresets) defined in this PML file, at 1406.

An example of the above-described steps is given below for a valid input PML file:

Let m.packagePath be the package qualified name in the PML file.

Let m.packageID be m.packagePath with each dot character replaced by an underscore.

Let m.className be the last ID of m.packagePath.

Let targets be the list of concrete (e.g., non-template) events/states/featuresets defined or used (via LITERAL) in the PML file so that any item in the targets list is not used by any previous items in the target lists.

Let m.dependent be the package's qualified names of all imported PML files.

In addition, maintain an integer counter m.vc to generate Java variables with unique names.

The method 1400 includes initializing a variable count vc to 0, at 1408. For example, m.vc is initialized to 0. After each call of create_var( ), m.vc is to be incremented. The method 1400 includes generating Java package declaration, import statements, and class skeleton, at 1410, generating Java class fields for each PML global variable declaration, at 1412, and generating Java class fields for each defined or used target, at 1414.

The following text provides an illustrative example.

Generate the package, import, and start of the class using the following code:

package pml.user.<<m.packageName>>;
import java.util.List;
import java.util.function.Predicate;
import org.apache.commons.logging.*;
import com . . . fdats.common.util.run.*;
import com . . . fdats.fsd.loader.*;
import com . . . fdats.pml.io.*;
import com . . . fdats.pml.lib.*;
import com . . . fdats.pml.api.*;
import pml.lang.*;
public class <<m.className>><T extends IFsdLoader> implements
IPmlPackage<T> { private static Log LOG=LogFactory.getLog(<<m.className>>.class);
java.util.LinkedHashSet<String> parameters=new java.util.LinkedHashSet< >( );

For each global variable declarations statement s, call generate_stmt(s, m.dependent) to generate declaration code.

For each event with name en in targets, if it is defined in m, generate PmlEvent e_<<en>>;

For each state with name sn in targets, if it is defined in m generate PmlState s_<<sn>>;

For each featureset with name fsn in targets, if it is defined in m, generate PmlFeatureset fs_<<fsn>>;

For each dependent PML d in dependent, let d.packagePath and d.packageID be defined on d as those on m, generate field definition <<d.packagePath>><T> dp_<<d.packageID>>;

The method 1400 includes generating a Java class init method to implement PML init block, to collect all used sensor data parameters, and to call the init method on classes for dependent PML files, at 1416. The following text provides an example.

Generate the following code:

public void init(IPmlEngine<T> engine) throws Exception {

For each statement s inside the PML init block, call generate_stmt(s, m.dependent) to generate code inside the init method.

For each PARAMETER literal with name pn, generate the following code:

parameters.add("<<pn>>"); For each dependent PML d in dependent, generate the following code:

dp_<<d.packageID>>=new <<d.packagePath>><T>( );
dp_<<d.packageID>>.init(engine);
parameters.addAll dp_<<d.packageID>>.getParameters( );

Finally, end the method with a }.

The method 1400 includes generating a Java class load method to load all used parameters from input sensor data, pass loaded data to classes from dependent PML files, and reset targets, at 1418. The following text provides an example.

Generate the following code:

public void load(IPmlEngine<T> engine, String input, IProgressMnitor monitor) throws Exception
if (monitor !=null && monitor.isCancelled( )) return;
engine.resolve Loader(input);
uv_input=engine.load(input, parameters, monitor);

For each dependent PML d in dependent, generate the following code:

dp_<<d.packageID>>.setInput(uv_input);

For each event with name en in targets, if it is defined in m, generate the following code: e_<<en>>=null;

For each state with name sn in targets, if it is defined in m, generate the following code: s_<<sn>>=null;

For each featureset with name fsn in targets, if it is defined in m, generate fs_<<fsn>>=null;

Finally, end the load method with a }.

The method 1400 includes generating a Java class work method to call the generated method for each defined or used target, at 1420. The following text provides an example.

Generate the following code:
Public void work(IPmlEngine<T> engine, IProgress-Monitor monitor) throws Exception {
Let workProgress be 0, and workIncrement be 1 divided by the total number of items in targets. For each item t in targets:
Generate start of code block:
if (monitor !=null && monitor.isCancelled( )) return;
If t is an even with name en defined inside m, generate the call to the event declaration: e_<<en>>( );
If t is an even with name en defined in a dependent PML file d, generate the call to the event detection method: dp_<<d.packageID>>.e_<<en>>( );
If t is a state with name sn defined inside m, generate the call to the state determination method: s_<<sn>>( );
If t is a state with name sn defined in a dependent PML file d, generate the call to the state determination method: dp_<<d.packageID>>.s_<<sn>>( );
If t is an event with name en defined inside m, generate the call to the even detection method: fs_<<en>>( );
If t is a featureset with name fsn defined in a dependent PML file d, generate the call to the featureset generation method:
dp_<<d.packageID>>.fs_<<fsn>>( );
Update workProgress to workProgress+workIncrement.
Generate end of code block:
if (monitor !=null) monitor.updateProgress (<<workProgress>>f);
Finally, end the work method with a }.

The method 1400 includes generating a Java class save method to identify and open savers for each category of targets, save each defined or used target using the right saver, and close all savers, at 1422. The following text provides an example.
Generate the following code:
public void save(IPmlEngine<T> engine, String input, IProgressMonitor monitor) throws Exception {
if (monitor !=null && monitor.isCancelled( )) return;
engine.resolve Savers(input);
IEventSaveer eventSaver=engine.getEventSaver( );
eventSaver.open( );
IStateSaver stateSaver=engine.getStateSaver( );
stateSaver.open( );
IFeaturesetSaver featuresetSaver=engine.getFeaturesetSaver( );
featuresetSaver.opern( );
if (monitor !=null) monitor.updateProgress(0.05f);
Let workProgress be 0 and workIncrement be 1 divided by the total number of items in targets.
For each item t in targets, perform the following steps.
Generate code to check monitor status: if monitor !=null && monitor.isCancelled( ) return;
If t is a non-transient event with name en defined inside m, generate the call to the event detection method: eventSaver.save(e_<<en>>( );
If t is a non-transient state with name sn defined inside m, generate the all to the state determination method: stateSaver.save(s_<<sn>>( );
If t is a non-transient state with name sn defined in a dependent PML file d, generate the call to the state determination method: stateSaver.save(dp_<<d.packageID>>.s_<<sn>>( ));
If t is a non-transient featureset with name fsn defined in a dependent PML file d, generate the call to the featureset generation method:
featuresetSaver.save (dp_<<d.packageID>>.fs_<<fsn>>( );
Update workProgress to workProgress+workIncrement.
Generate end of code block: if (monitor !=null) monitor.updateProgress(<<workProgress>>f);
Finally, to end the method, generate the following code:
eventSaver.close( );
stateSaver.close( );
featuresetSaver.close( );
if (monitor !=null) monitor.updateProgress(1f);
}

The method 1400 includes generating a Java class run method to call load, work, and save methods in sequence, at 1424. To illustrate the following code is generated:
Public void run (IPmlEngine<T> engine, String input, IProgressMonitor monitor) throws Exception {
load(engine, input, monitor==null ? null: new ProgressSubMonitor (monitor, 0, 0.4f));
work(engine, monitor==null ? null: new ProgressSubMonitor(monitor, 0.6f, 1f));
}
void setInput (PmlDataset input) throws Exception {
uv_input=input;
}
public java.util.LinkedHashSet<String> getParameters( ){
return parameters;
}

The method 1400 includes generating nested Java classes for each PML enum definition, at 1426, generating Java class methods for each PML function definition, at 1428, and generating Java class methods for each PML target definition, at 1430. The following text provides an example.
For each enum definition with the name en, generate a nested (e.g., inner) static Java class:
Generate the start code for the class: public static class <<en>> extends PmlEnum{
Let codes be the list of enumerated code names concatenated together with commas separating each pair.
For each enumerated code with (0-based) index ci, name cn, and description cd, generate the following code:
private static final <<en>>_<<cn>>=new <<en>> (<<ci>>, "<<cn>>", "<<cd>>");
public static <<en>> get <<cn>>( ) {return <<cn>>;}
After generating the code for each enumerated code, generate support methods and the end of the nested class using the following code:
private static final <<en>>[ ] values={<<codes>>};
private <<en>>(int ordinal, String name, String description) {
super(ordinal, name, description);
}
public static <<en>> valueOf(PmlString name) {
if (name==null) {
return null;
}
for (<<en>>c: values) {
if (c.name.equals(name)) {
return c;
}
}
return null;
}

```
public static <<en>>[ ] values( ) {
    return values;
}
```
}
For each function f definition with name f.name, formal type arguments f.ftargs, return type f type, (formal) arguments f.fargs, generate a method:
   Let modifier by public if the function is public, otherwise let modifier be private.
   Let ftargs be the result of calling generate_targs(f ftargs).
   Let type be the result of calling generate_type(f.type).
   Let fargs be the result of calling genarate_fargs(f.fargs).
   Generate the start of the method using the following code: <<modifier>><<ftargs>><<type>>f_<<f_name>>(<<fargs>>) {
   For each statement s in the function definition block, generate code by calling generate_stmt(s, dependent).
   If the function return type is Void, and the last statement in the function is not a return statement, generate the following code:
   return PmlVoid.VOID.
   End the method with a }
Finally, end the class with a }

Figure 15:
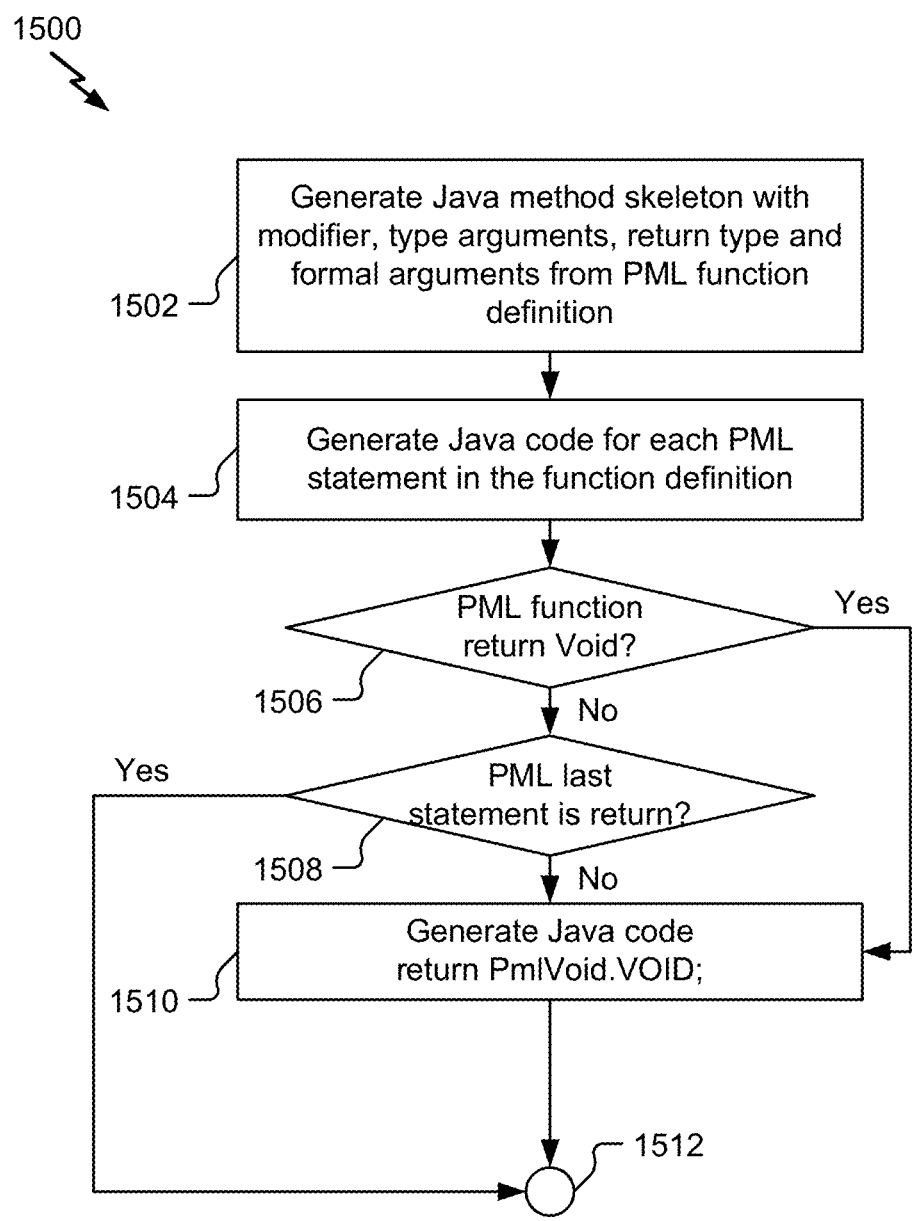
FIG. 15 is a flow chart of an example of a method of generating a Java method for a PML function.

FIG. 15 illustrates a method 1500 of generating a Java method for a PML function. The method 1500 includes generating a Java method skeleton with modifier, type arguments, return type, and formal arguments from the PML function definition, at 1502. The method 1500 includes generating Java code for each PML statement in the function definition, at 1504. Generating Java code for PML statements is further described with reference to FIGS. 16-40.

At 1506, it is determined whether the PML function returns Void. If the PML function returns Void, the method 1500 continues to 1510, and the Java code return PML-Void.VOID; is generated. The method 1500 then terminates at 1512.

Returning to 1506, if the PML function does not return Void, the method 1500 continues to 1508, and it is determined whether the PML last statement is return. If the PML last statement is return, the method terminates at 1512. If the PML last statement is not return, the method 1500 continues to 1510, and the Java code return PmlVoid.VOID is generated. The method 1500 then terminates at 1512.

Figure 16:
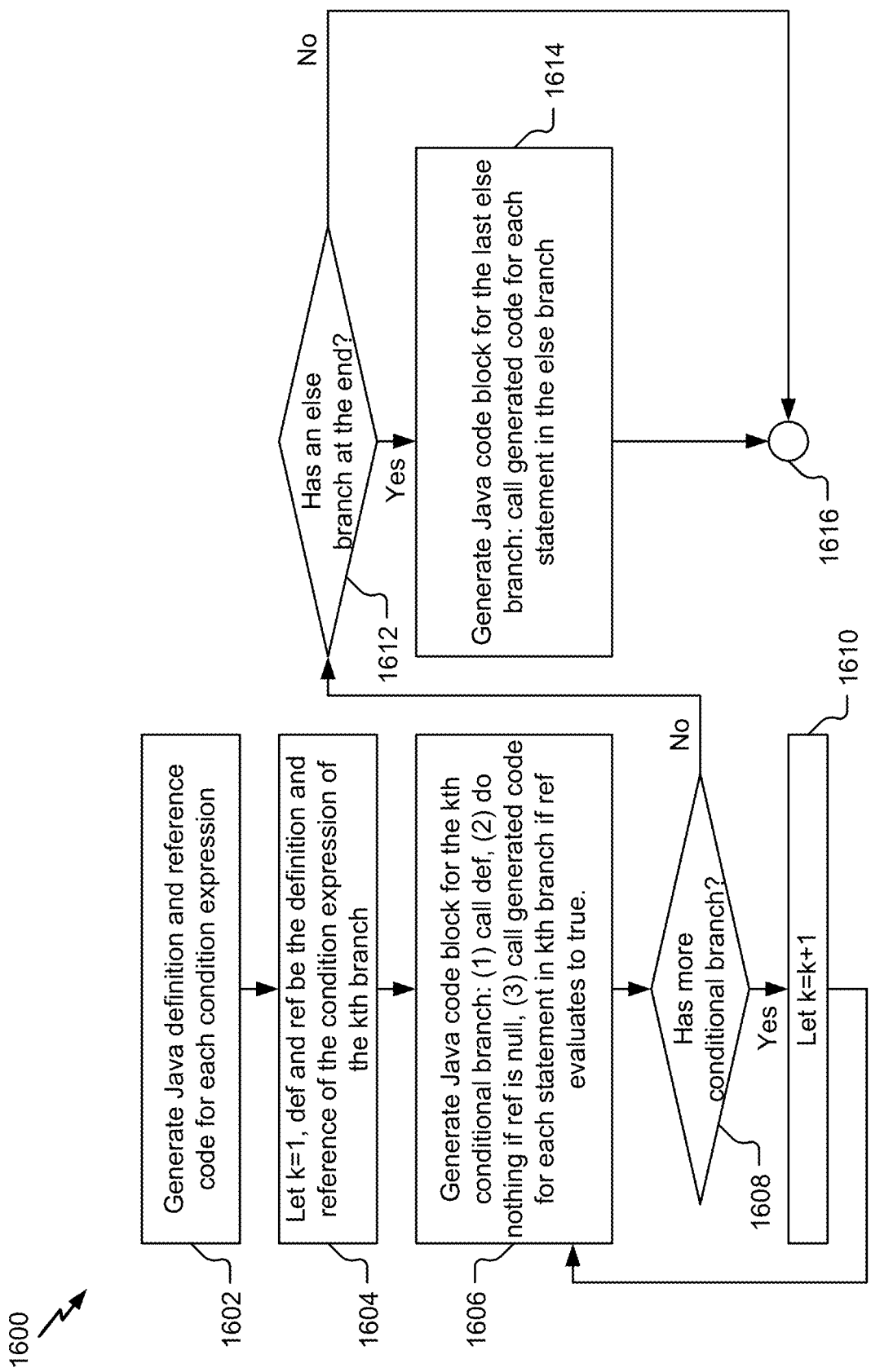
FIG. 16 is a flow chart of an example of a method of generating Java code for a PML If statement.

FIG. 16 illustrates a method 1600 of generating Java code for a PML If statement. The method 1600 includes generating a Java definition and reference code for each condition expression, at 1602. A variable k is set equal to 1 and def and ref are the definition and the reference of the condition expression of the k-th branch, at 1604. The method 1600 includes generating a Java code block for the k-th conditional branch by calling def, doing nothing if ref is null, and calling generated code for each statement in the k-th branch if ref evaluates to true, at 1606. The method 1600 continues to 1608, where it is determined whether there are more conditional branches to generate Java code for. If there are more conditional branches, the method 1600 continues to 1610, and k is incremented by one. After incrementing k, the method 1600 returns to 1606.

The following text provides an example, for each if statement s.
   Let cs be the list of results of calling generate_expr (condition, dependent) for each condition in the list of conditions of all branches in the If statement.
   Generate the following beginning code:
   <<cs[1].def»
   if (<<cs[1].ref>>==null) {
   }
   else if (<<cs[1].ref>>.getValue( )) {
   For each dependent s1 in the first branch, generate the code by calling generate_stmt(s1, dependent).
   Close the branch with a }
   Generate the code for the rest of the branches by calling generate_if_branch(s, dependent, cs, 2).
   The procedure generate_if_branch(s, dependent, cs, index) is called recursively to generate the rest of the branches.
   If the number of items in cs is no less than index, the following code is generated to start the new branch:
   else {
      cs[index].def>>
      if (<<cs[index].ref>>==null) {
      }
      else if (<<cs[index].ref>>.getValue( ) {
   For each statement s1 in the new branch, generate the code by calling generate_stmt(s1, dependent).
   Finally, the branch is closed with two}

Returning to 1608, if there are no more conditional branches, the method 1600 continues to 1612, and it is determined whether there is an else branch at the end. If there is no else branch, the method 1600 terminates at 1616. If there is an else branch, the method 1600 continues to 1614, and a Java code block for the last else branch is generated by calling generated code for each statement in the else branch. The method 1600 then terminated at 1616.

The following text provides an example.
   Generate code to start the else block: else {
   For each statement s1 in the else block, code is generated by calling generate_stmt(s1, dependent).
   Finally, the else block is closed with a }

Figure 17:
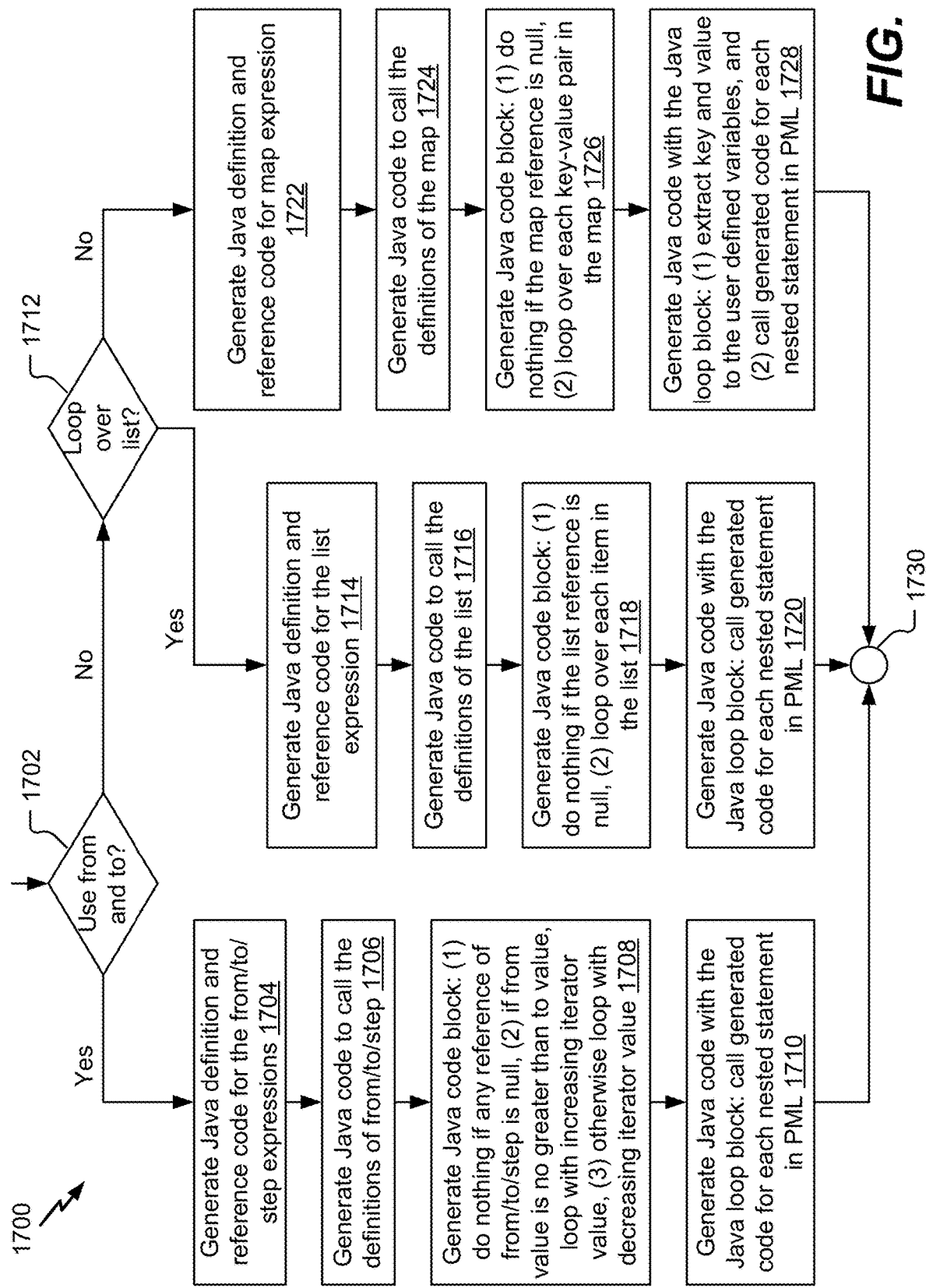
FIG. 17 is a flow chart of an example of a method of generating Java code for a PML For statement.

FIG. 17 illustrates a method 1700 of generating Java code for a PML For statement. The method 1700 includes determining whether the keywords "from" and "to" are used, at 1702. If the keywords "from" and "to" are used, the method 1700 continues to 1704, and Java definition and reference code for the from/to/step expressions are generated, at 1704. The method 1700 includes generating Java code to call the definitions of the from/to/step expressions, at 1706. The method 1700 includes generating a Java code block by: doing nothing if any reference of the from/to/step expressions is null; if the from value is no greater than the to value, looping with increasing iterator value; or (if the from value is greater than the to value) looping with decreasing iterator value, at 1708. The method 1700 includes generating Java code with the Java loop block by calling generated code for each nested statement in PML, at 1710. The method 1700 then terminates at 1730.

The following text provides an example. In the example, the For statement has the keywords "for" and "to".
   Let s.iterator be the iterator ID.
   Let s.from, s.to, and s.step be the expression following the keyword from, to, and step (if it exists), respectively.
   Let s.type be the common promotable type of s.from, s.to, and s.step (if it exists).
   Let from, to, and step be the result of calling generate_expr(s.from, s.type, dependent), generate_expr(s.to, s.type, dependent), and generate_expr(s.step, s.type, dependent), respectively.
   Let type be the result of generate_type(s.type).
   Let vf, vt, and vs be the results, respectively, of three different calls of create_var( ).

Generate the following code:

<<from.def>>
<<to.def>>
<<type>>< <vf>>=<<from.ref>>;
<<type>> <<vt>>=<<to.ref>>;

If the For statement contains the keyword "step", generate the following code:

<<step.def>>
<<type>> <<vs>>=<<step.ref>>;

If the For statement does not contain the keyword "step", generate the following code: <<type>> <<vs>>=<<type>>.ONE;

Let statements be the concatenation of the result of calling generate_stmt(s1, dependent) on each statement s1 inside the For loop block.

Generate the following code:

```
if (<<vf>> !=null && <<vt>> !=null && <<vs>> !=null
    && <<vs>>.gt(<<type>>.ZERO).getValue( ) {
  if (<<from.ref>>.value( )<=<<to.ref>>.value( ) {
    for (<<type>>>>uv_<<s.iterator>>=<<vf>>;
        uv_<<s.iterator>>.le(<<vt>>).getValue(     );
        uv_<<s.iterator>>=(<<type>>)   PmlOp.merge
        (uv_<<s.iterator>>,    PmlOp.Operator.ADD,
        <<vs>>)) {
      <<statements>>
    }
  }
  else {
    for (<<type>>uv_<<s.iterator>>=<<vf>>;
        uv_<<s.iterator>>.ge(<<vt>>).getValue(     );
        uv_<<s.iterator>>=(<<typle.compile>>) PmlOp-
        .merge(uv_<<s.iterator>>, PmlOp.Operator.SUB-
        TRACT, <<vs>>)) {
      <<statements>>
    }
  }
}
```

Returning to 1702, if the keywords "for" and "to" are not used, the method 1700 continues to 1712, and it is determined if the For statement loops over a list of items. If the For statement loops over a list of items (denoted s.list), the method 1700 continues to 1714, and Java definition and reference code for the list expression is generated. The method 1700 includes generating Java code to call the definitions of the list, at 1716. The method 1700 includes generating a Java code block by doing nothing if the list reference is null, or by looping over each item in the list, at 1718. The method 1700 includes generating Java code with the Java loop block by calling generated code for each nested statement in PML, at 1720. The method 1700 then terminates at 1730.

The following text provides an example. In the example, the For statement loops over a list of items (s.list).

Let s.iterator be the iterator ID.

Let s.type be the item type of the list and let type be the result of calling generate_type(s.type).

Let list be the result of calling generat_expr(s.list, null, dependent). Let i be the result of calling create_var( ).

Let statements be the concatenation of the result of calling generate_s(s1, dependent) on each statement s1 inside the For loop block.

Generate the following code:

```
<<list.def>>
if (<<list.ref>> !=null) {
  for (Object <<i>>: <<list.ref>>) {
    <<type>>     uv_<<s.iterator>>=<<type>>.cast
      (<<i>>);
    <<statements>>
  }
}
```

Returning to 1712, if the For statement does not loop over a list (e.g., the For statement loops over a map), the method 1700 continues to 1722, and Java definition and reference code for the map expression is generated. The method 1700 includes generating Java code to call the definitions of the map, at 1724. The method 1700 includes generating a Java code block by doing nothing if the map reference is null or by looping over each key-value pair in the map, at 1726. The method 1700 includes generating Java code with the Java loop block by extracting key and value to the user defined variables and calling the generated code for each nested statement in PML, at 1728. The method 1700 then terminates at 1730.

The following text provides an example. In the example, the For statement loops over a map of key-value pairs (denoted as s.map).

Let s.kiterator and s.viterator be the key iterator ID and the value iterator ID, respectively.

Let s.ktype and s.vtype be the key type and value type, respectively, of the map, and let ktype and vtype be the result of calling generate_type(s.ktype) and generate_type(s.vtype) respectively.

Let map be the result of calling generate_expre(s.map, null, dependent).

Let i be the result of calling create_var( ).

Let statements be the concatenation of the result of calling generate_s(s1, dependent) on each statement s1 inside the For loop block.

Generate the following code:

```
<<map.def>>
if (<<map.ref>> !=null) {
  for  (java.util.Map.Entry<PmlMappable,  PmlAny>
      <<i>>;
      <<map.ref>>) {
    <<ktype>>uv_<<s.kiterator>>=
    <<ktype>>.cast(<<i>>.getKey( ));
    <<vtype>>uv_<<s.viterator>>=
    <<vtype>>.cast(<<i>>.getValue( ));
    <<statements>>
  }
}
```

Figure 18:
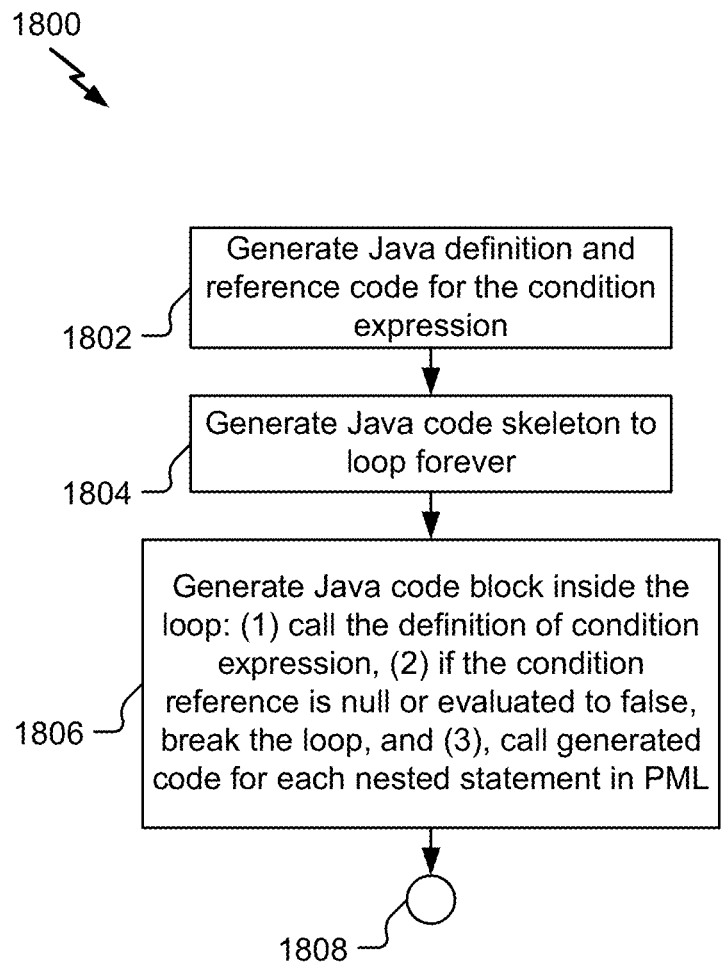
FIG. 18 is a flow chart of an example of a method of generating Java code for a PML While statement.

FIG. 18 illustrates a method 1800 of generating Java code for a PML While statement. The method includes generating Java definition and reference code for the condition expression, at 1802. The method 1800 includes generating a Java code skeleton to loop forever, at 1804. The method 1800 includes generating a Java code block inside the loop by: calling the definition of the condition expression; if the condition reference is null or evaluated to false, breaking the loop; and calling generated code for each nested statement in PML, at 1806. The method 1800 then terminates at 1808.

The following text provides an example.

Let s.condition be the condition expression and let condition be the result of calling generate_expr(s.condition, null, dependent).

Let statements be the concatenation of the result of calling generate_s(s1, dependent) on each statement s1 inside the while block.

Generate the following code:
```
while (true) {
    <<condition.def>>
    if (<<condition.ref>> !<<condition.ref>>.getValue( )){
        Break;
    }
    <<statements>>
}
```

Figure 19:
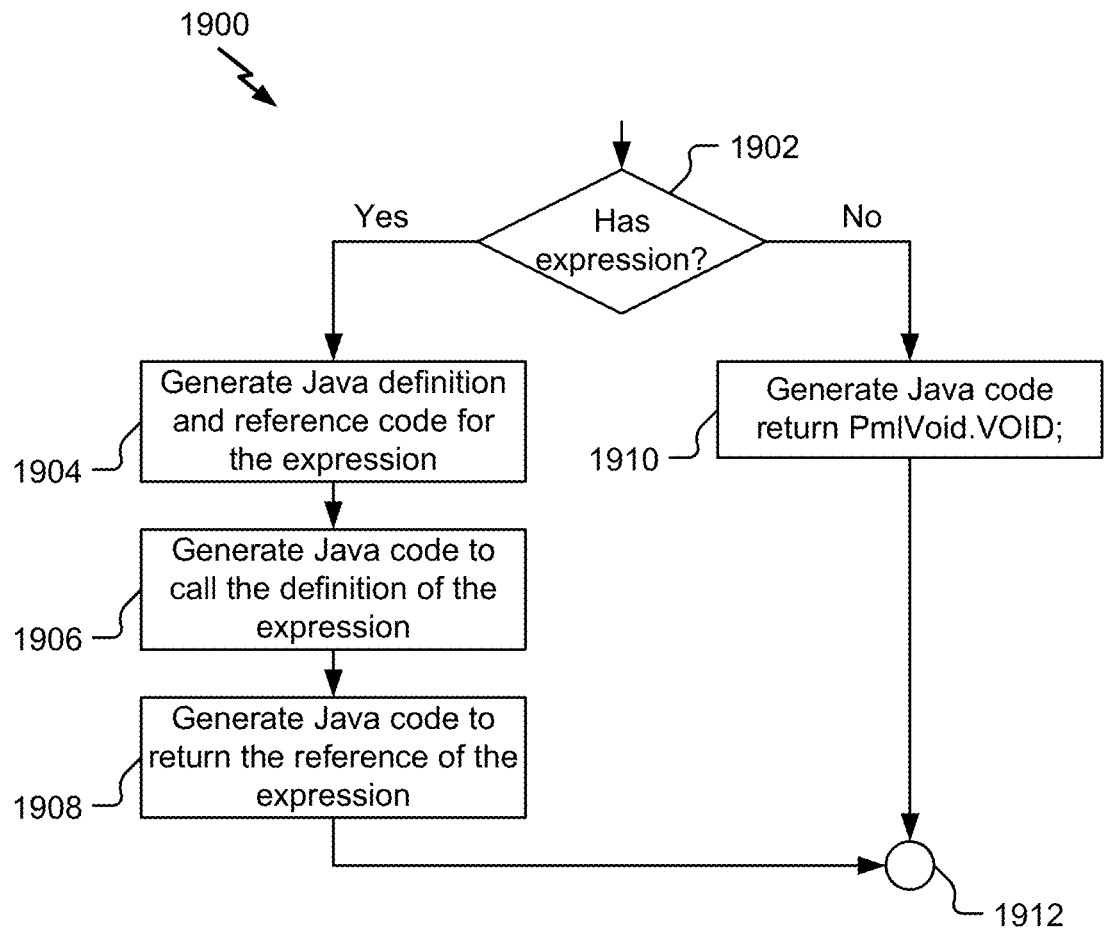
FIG. 19 is a flow chart of an example of a method of generating Java code for a PML Return statement.

FIG. 19 illustrates a method 1900 of generating Java code for a PML Return statement. The method 1900 includes determining whether the Return statement has an expression, at 1902. If the Return statement has an expression, the method 1900 continues to 1904, and Java definition and reference code for the expression is generated. The method 1900 includes generating Java code to call the definition of the expression, at 1906. The method 1900 includes generating Java code to return the reference of the expression, at 1908. The method 1900 then terminates, at 1912. Returning to 1902, if the Return statement does not have an expression, the method 1900 continues to 1910, and the Java code return PmlVoid.Void is generated. The method 1900 then terminates at 1912.

Figure 20:
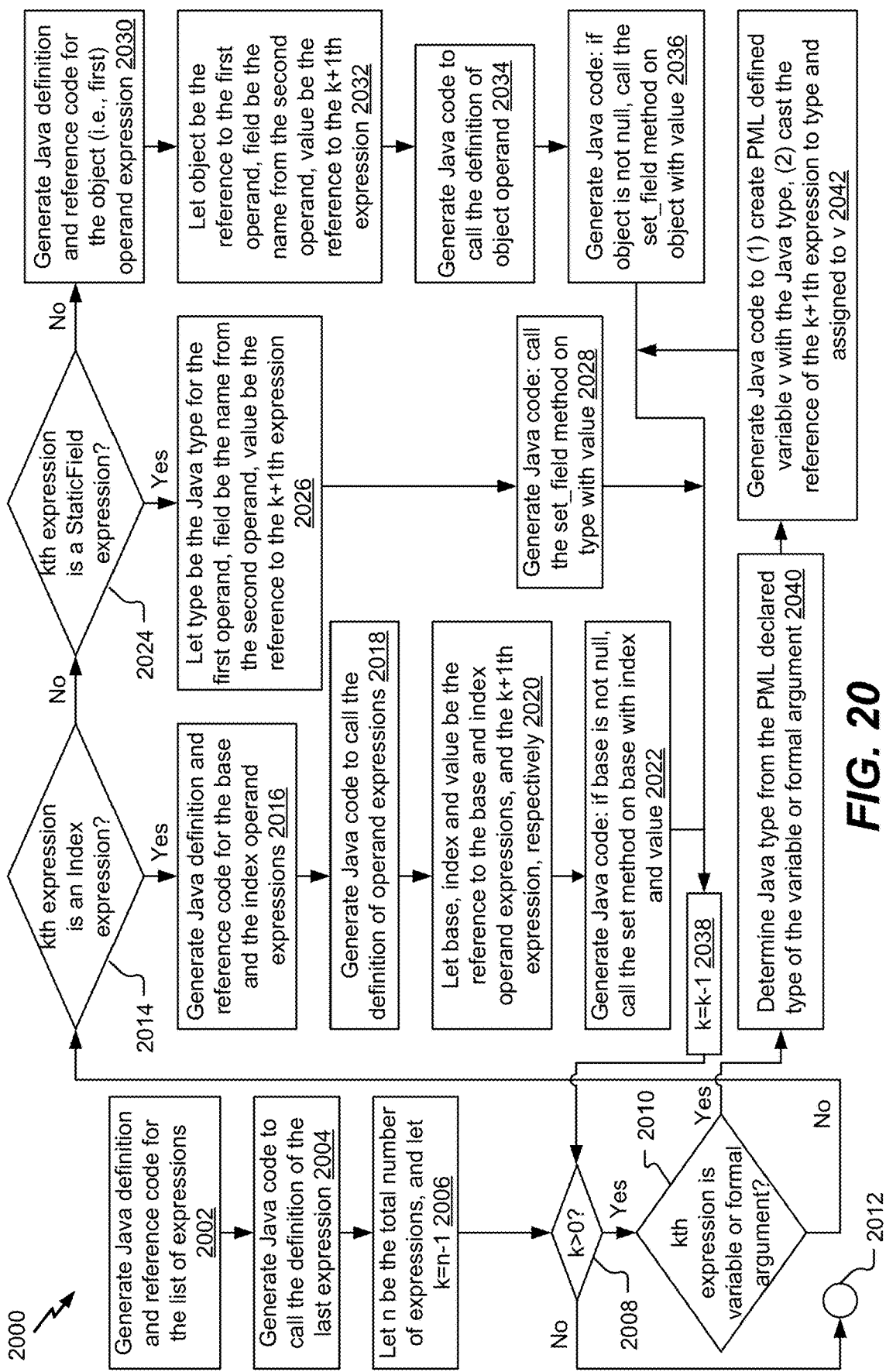
FIG. 20 is a flow chart of an example of a method of generating Java code for a PML Evaluation statement.

The following text provides an example.
If there is no expression to be returned (and the containing function returns Void), generate return PmlVoid.VOID;
Otherwise, let s.expr be the expression to be returned, f.type be the return type of the containing function, and expr be the result of calling generate_expr(s.expr, f type, dependent).
Generate the following code:
<<expr.def>>
return <<expr.ref>>;

FIG. 20 illustrates a method 2000 of generating Java code for a PML Evaluation statement. The method 2000 includes generating Java definition and reference code for the list of expressions, at 2002. The method 2000 includes generating Java code to call the definition of the last expression, at 2004. The method 2000 includes letting n be the total number of expressions and setting k equal to n−1, at 2006. The following text provides an example.
Let s.exprs be the list of expressions in the Evaluation statement, and let exprs be the list of the results of calling generate_expr(se, null, dependent).
Generate the Java code <<exprs[n−1].def>>.
Set k equal to n−1.

The method 2000 includes determining whether k is greater than zero, at 2008. If k is not greater than zero (e.g., k is less than or equal to zero), the method 2000 terminates at 2012. If k is greater than zero, the method 2000 continues to 2010, and it is determined whether the k-th expression is a variable or a formal argument reference. If the k-th expression is a variable or a formal argument reference, the method 2000 continues to 2040, and a Java type from the PML declared type of the variable or formal argument is determined. The method 2000 includes generating Java code to create PML defined variable v with the Java type and to cast the reference of the k+1th expression to type and assigned to v, at 2042. The method 2000 then continues to 2038, and k is decremented by one. After decrementing k, the method 2000 returns to 2008, where it is determined whether k is greater than zero.

The following text provides an example.
If s.exprs[k] is a variable or a formal argument reference, let name and ttype be the name and data type, respectively, of the referenced variable or formal argument.
Let type be the result of calling generate_type(ttype).
Generate the Java code <<type>>uv_<<name>>=<<type>>.cast(<<exprs[k+1].ref>>);
Update v to be uv_<<name>> and decrement k by one.

Returning to 2010, if the k-th expression is not a variable or a formal argument reference, the method 2000 continues to 2014, and it is determined whether the k-th expression is an Index expression. If the k-th expression is an Index expression, the method 2000 continues to 2016, and Java definition and reference code for the base and the index operand expressions are generated. The method 2000 includes generating Java code to call the definition of the operand expressions, at 2018. The method 2000 includes letting base, index, and value be the reference to the base operand expression, the reference to the index operand, and the k+1th expression, respectively, at 2020. The method 2000 includes generating Java code to, if base is not null, call the set method on base with index and value, at 2022. The method 2000 then proceeds to 2038, and k is decremented by one. After decrementing k, the method 2000 returns to 2008, where it is determined whether k is greater than zero.

The following text provides an example.
If s.exprs[k] is an Index expression, let e.base be the first operand in s.exprs[k], and let base be the result of calling generate_expr(e.base, null, dependent).
Let e.index be the second operand in s.exprs[k], and let index be the result of calling generate_expr(e.index, null, dependent).
Let vtype be the result of calling generate_type(type).
Generate the following Java code, then decrement k by one:
<<base.def>>
<<index.def>>
if (<<base.ref>> !=null)<<base.ref>>.set(<<index.ref>>, <<exprs[k+1].ref>>);

Returning to 2014, if the kt-h expression is not an Index expression, the method 2000 continues to 2024, and it is determined whether the k-th expression is a StaticField expression. If the k-th expression is a StaticField expression, the method 2000 continues to 2026, and type is the Java type for the first operand, field is the name from the second operand, and value is the reference to the k+1th expression. The method 2000 includes generating Java code by calling the set_field method on type with value, at 2028. The method 2000 then proceeds to 2038, and k is decremented by one. After decrementing k, the method 2000 returns to 2008, where it is determined whether k is greater than zero.

The following text provides an example.
If s.exprs[k] is a StaticField, let e.otype be the first operand in the expression, and let otype be the result of calling generate_type(e.otype).
Let field be the name (ID) of the field in the expression.
Generate the Java code <<otype>>.set_<<field>>(<<exprs[k].ref>>); Decrement k by one.

Returning to 2024, if the k-th expression is not a StaticField expression (e.g., the k-th expression is an ObjectField expression), the method 2000 continues to 2030, and Java definition and reference code for the object (i.e., first) operand expression is generated. The method 2000 includes letting object be the reference to the first operand, field be the name from the second operand, and value be the reference to the k+1th expression, at 2032. The method 2000 includes generating Java code to call the definition of the object operand, at 2034. The method 2000 includes generating Java code by, if the object is not null, calling the set_field method on object with value, at 2036. The method 2000 then continues 2038, and k is decremented by one. After decrementing k, the method 2000 returns to 2008, where it is determined whether k is greater than zero.

The following text provides an example.

If s.exprs[k] is an ObjectField expression, let e.object be the first operand in the expression, and let object be the result of calling generate_expr(e.object, type, dependent).

Let field be the name (ID) of the field in the expression.

Generate the following Java code:

if (<<object.ref>> !=null)<<object.ref>>.set <<field>> (<<exprs[k+1].ref>>);

Decrement k by one.

Figure 21:
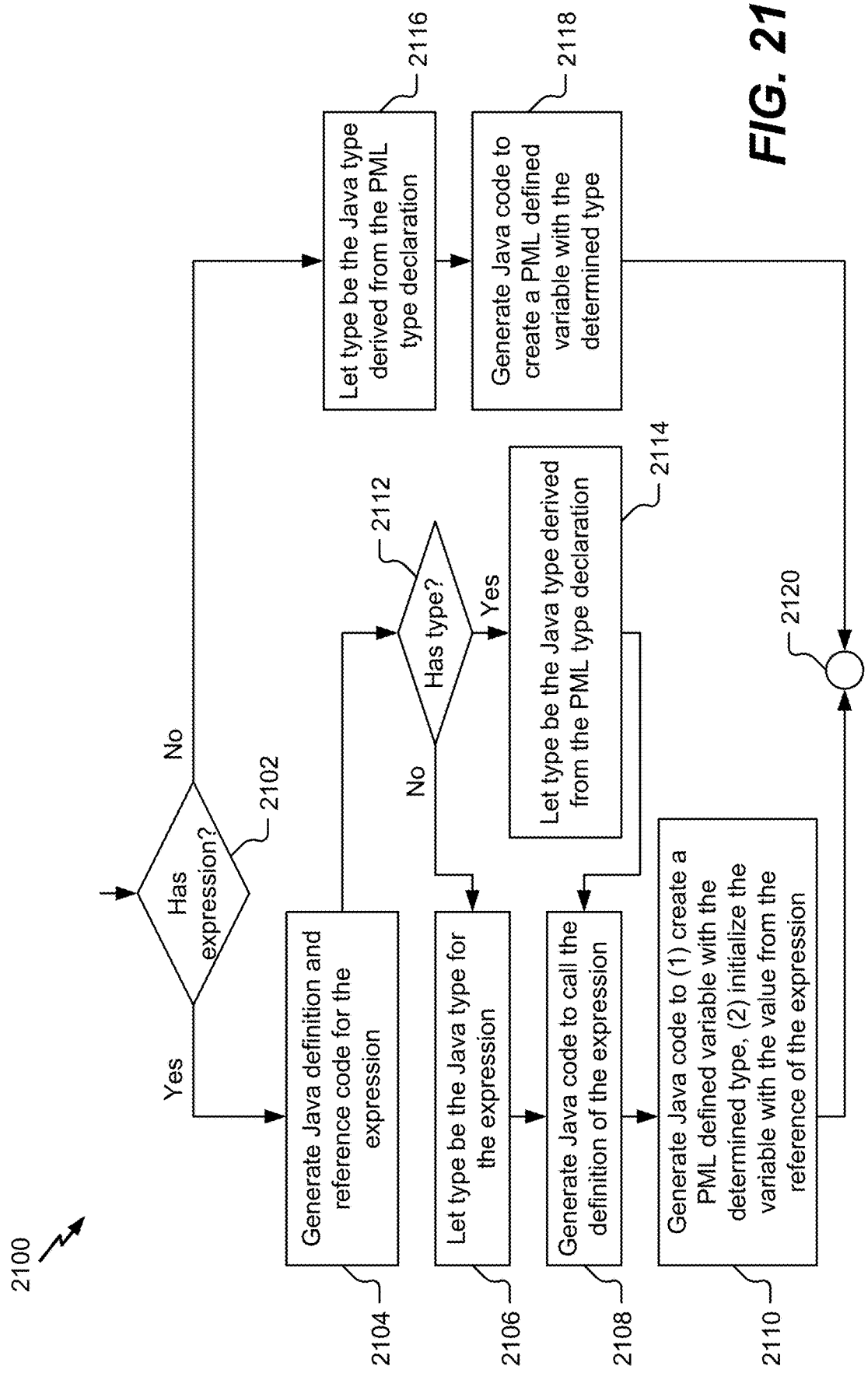
FIG. 21 is a flow chart of an example of a method of generating Java code for a PML Declaration statement.

FIG. 21 illustrates a method 2100 of generating Java code for a PML Declaration statement. The method 2100 includes determining whether an expression is provided in the Declaration statement, at 2102. If an expression is provided, the method 2100 continues to 2104, and Java definition and reference code for the expression is generated. The method 2100 includes determining whether a type is declared in the Declaration statement, at 2112. If no type is declared, the type is set to the Java type for the expression, at 2106, and Java code to call the definition of the expression is generated, at 2108. If a type is declared, the type is set to the Java type derived from the PML type declaration, at 2114, and Java code to call the definition of the expression is generated, at 2108. The method 2100 proceeds from 2108 to 2110, where Java code to create a PML defined variable with the determined type and to initialize the variable with the value from the reference of the expression is generated. The method 2100 then terminates at 2120.

The following text provides an example.

Let s.name be the variable name in the Declaration statement, let s.type by the type declared in the statement (null if not declared), and let s.value be the expression in the statement.

Let value be the result of calling generate_expr(e, s.type, dependent).

Let type be the result of calling generate_type(s.type) if the type is declared in the Declaration statement, otherwise let type be value.type.

Generate the following Java code:

<<value.def>>

<<type>>uv_<<s.name>>=<<value.ref>>;

Returning to 2102, if no expression is provided, the method 2100 continues to 2116, and the type is set to the Java type derived from the PML expression. The method 2100 includes generating Java code to create a PML defined variable with the determined type, at 2118. The method 2100 then terminates at 2120. The following text provides an example.

Let type be value.type.

Generate the Java code <<type>>uv_<<s.name>>=null;

FIGS. 22-40 illustrate methods of generating Java code for PML expressions. In Java, the call to the procedure generate_expr(e, ttype, dependent) supplies two arguments in addition to the expression e: a target data type ttype (which can be null if there is no requirement about the target type) and all dependent PML packages. For each expression, three pieces of information are generated in the result of the procedure: the value type (type) of the whole expression, the definition text (def), and the reference text (ref). The definition only needs to be executed (in Java) once to evaluate the expression. The reference can be used many times to access (without modification) the evaluation result.

For any expression e, the result value type is generated as follows.

Let e.type be the data type of the expression evaluation result regardless of the target type (ttype).

If ttype is null, generate the result data ttype type as e.type.

Otherwise, generate the result data type as the least common super type of ttype and e.type.

Figure 22:
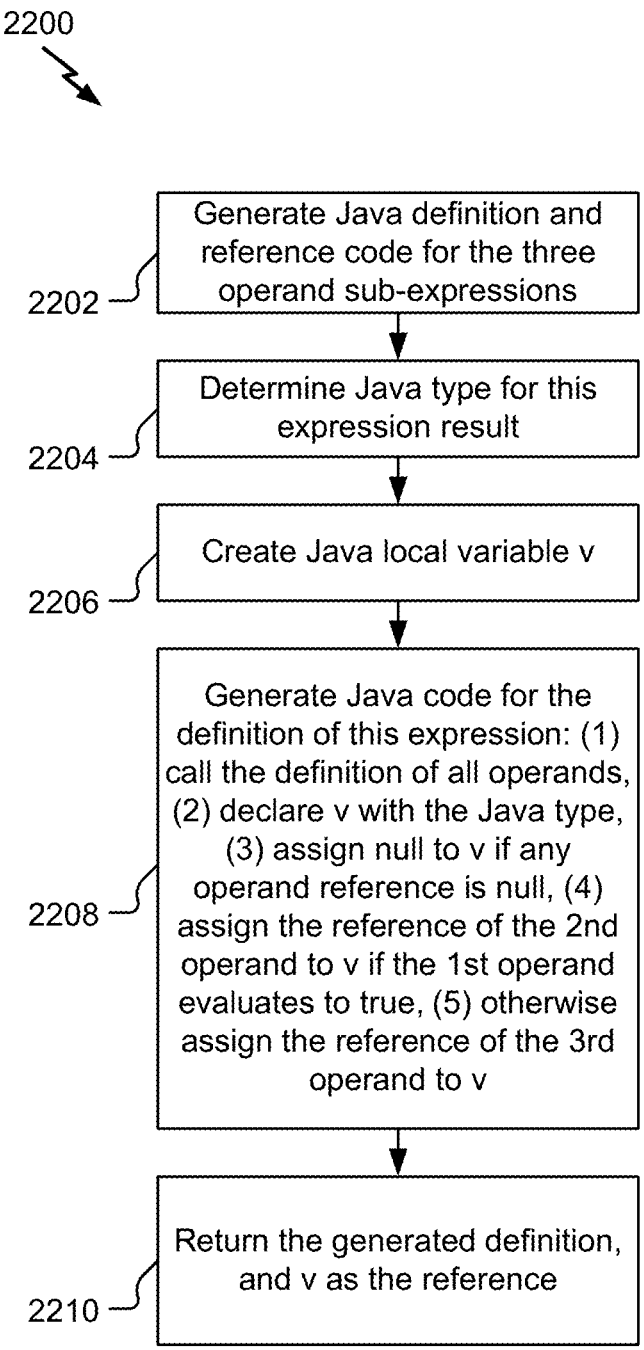
FIG. 22 is a flow chart of an example of a method of generating Java code for a PML Condition expression.

FIG. 22 illustrates a method 2200 of generating Java code for a PML Condition expression. The method 2200 includes generating Java definition and reference code for the three operand sub-expressions, at 2202. The method 2200 includes determining a Java type for this expression result, at 2204. The method 2200 includes creating a Java local variable v, at 2206. The method 2200 includes generating Java code for the definition of this expression, at 2208. The Java code is generated by calling the definition of all the operands, declaring v with the Java type, assigning null to v if any operand reference is null, assigning the reference of the second operand to v if the first operand evaluates to true, and otherwise assigning the reference of the third operand to v. The method 2200 includes returning the generated definition and v as the reference, at 2210.

The following text provides an example.

Let e.cond be the first operand (condition) in the Condition expression, and let cond be the results of calling generate_expr(e.cond, null, dependent).

Let e.t be the second operand (truth branch) in the expression, and let t be the results of calling generate_expr (e.f, ttype, dependent).

Let v be the result of calling create_var( ).

Let vtype be the result of calling generate_type(type).

Generate the result type type as the least common super type of t.type and f.type.

Let vtype be the result of calling generate_type(type).

Generate the result definition (def) using the following Java code, then generate the result reference (ref) as <<v>>:

<<cond.def>>

<<t.def>>

<<f.def>>

<<vtype>>

<<v>>=<<cond.ref>>==null||<<t.ref>>==null||

Figure 23:
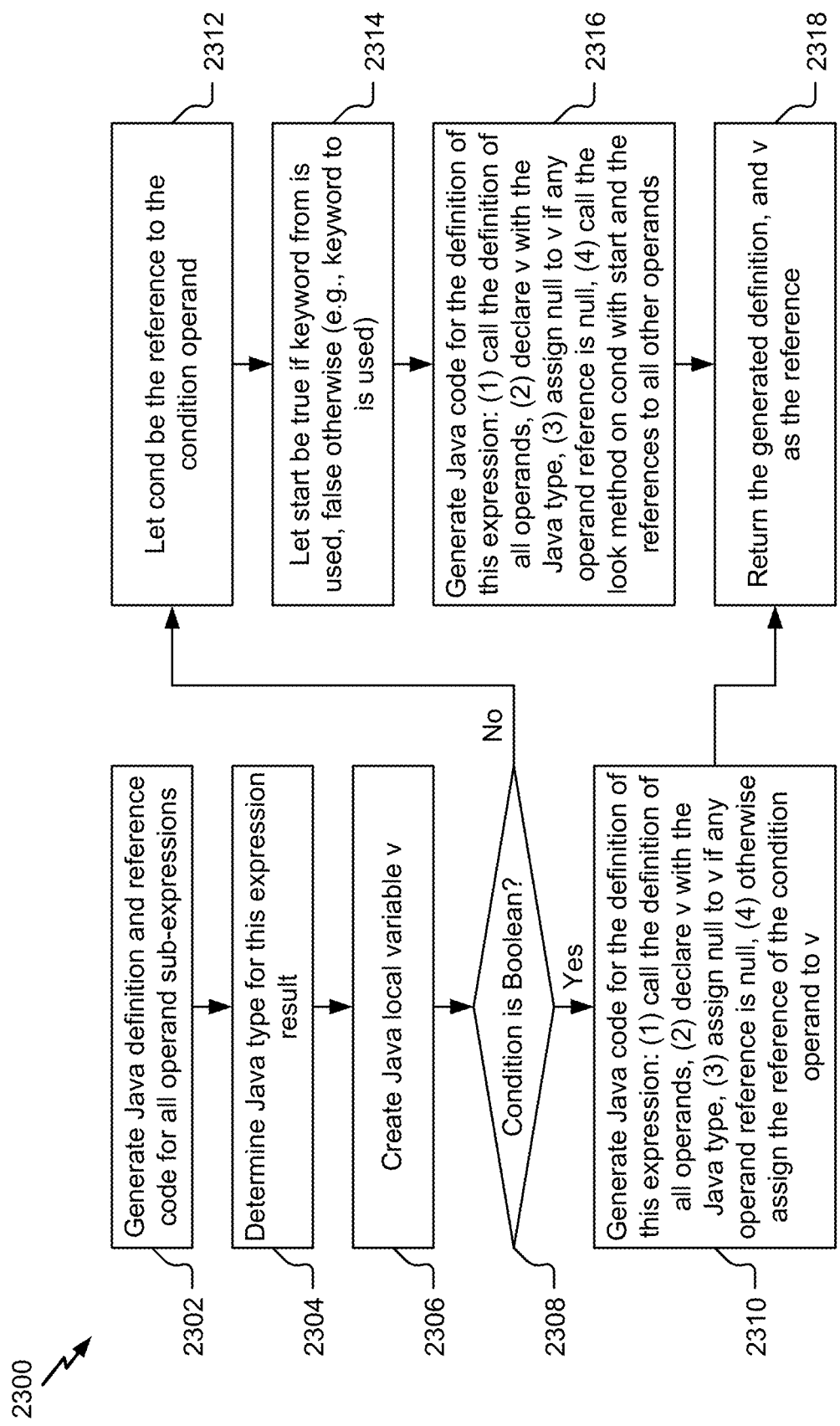
FIG. 23 is a flow chart of an example of a method of generating Java code for a PML Look expression.

<<cond.ref>>==null ? null : <<cond.ref>>. getValue( )?<<vtype>>.cast(<<t.def>>):

<<vtype>>.cast(<<t.def>>);

FIG. 23 illustrates a method 2300 of generating Java code for a PML Look expression. The method 2300 includes generating Java definition and reference code for all operand sub-expressions, at 2302. The method 2300 includes determining a Java type for this expression result, at 2304. The method 2300 includes creating Java local variable v, at 2306. The method 2300 includes determining whether the condition is Boolean, at 2308. If the condition is Boolean, the method 2300 continues to 2310, and Java code for the definition of this expression is generated. The Java code is generated by calling the definition of all operands, declaring v with the Java type, assigning null to v if any operand reference is null, and otherwise assigning the reference of the condition operand to v. The method 2300 further includes returning the generated definition and v as the reference, at 2318.

The following text provides an example.

Let e.period be the first operand (look period) in the Look expression, and let period be the results of calling generate_expr(e.period, null, dependent).

Let e.min be the second operand (minimum bound of the anchoring time) in the Look expression, and let min be the results of calling generate_expr(e.min, null, dependent).

Let e.max be the operand, if it exists, after the optional .. operator (maximum bound of the anchoring time) in the Look expression, and let max be the results of calling generate_expr(e.max, null, dependent).

Let e.cond be the last operand (condition) in the Look expression, let ctype be the data type of e.cond, and let cond be the results of calling generate_expr(e.cond, null, dependent).

In an error-free PML file, e.cond has type Boolean.

Let v be the result of calling create_var( ).

Let start be true if the Look expression has the keyword "from", false if the Look expression has the keyword "to".

If ctype is Boolean and e.max exists (e.g., floating look period), generate the result definition (def) using to the following Java code:

<<period.def>>
<<min.def>>
<<max.def>>
<<cond.def>>
PmlBoolean<<v>>
    <<period.ref>>==null||<<min.ref>>==null||<<max.ref>>==null ? null : <<cond.ref>>;

If ctype is Boolean and e.max does not exist (e.g., fixed look period), generate the result definition (def) using the following Java code:

<<period.def>>
<<min.def>>
<<cond.def>>
PmlBoolean    <<v>>=<<period.ref>>==null ||
    <<min.ref>>==null ? null: <<cond.ref>>;

After generating the result definition code, generate the result reference (ref) as <<cond.ref>> and generate the result type as Boolean.

Returning to 2308, if the condition is not Boolean (e.g., the condition is TimePredicate), the method 2300 continues to 2312, and cond is set to be the reference to the condition operand. The method 2300 includes letting start be true if the keyword "from" is used, letting start be false otherwise (e.g., if the keyword "to" is used), at 2314. The method 2300 includes generating Java code for the definition of this expression, at 2316. The Java code is generated by calling the definition of all operands, declaring v with the Java type, assigning null to v if any operand reference is null, and calling the look method on cond with start and the references to all other operands. The method 2300 further includes returning the generated definition and v as the reference, at 2318.

The following text provides an example.

Figure 24:
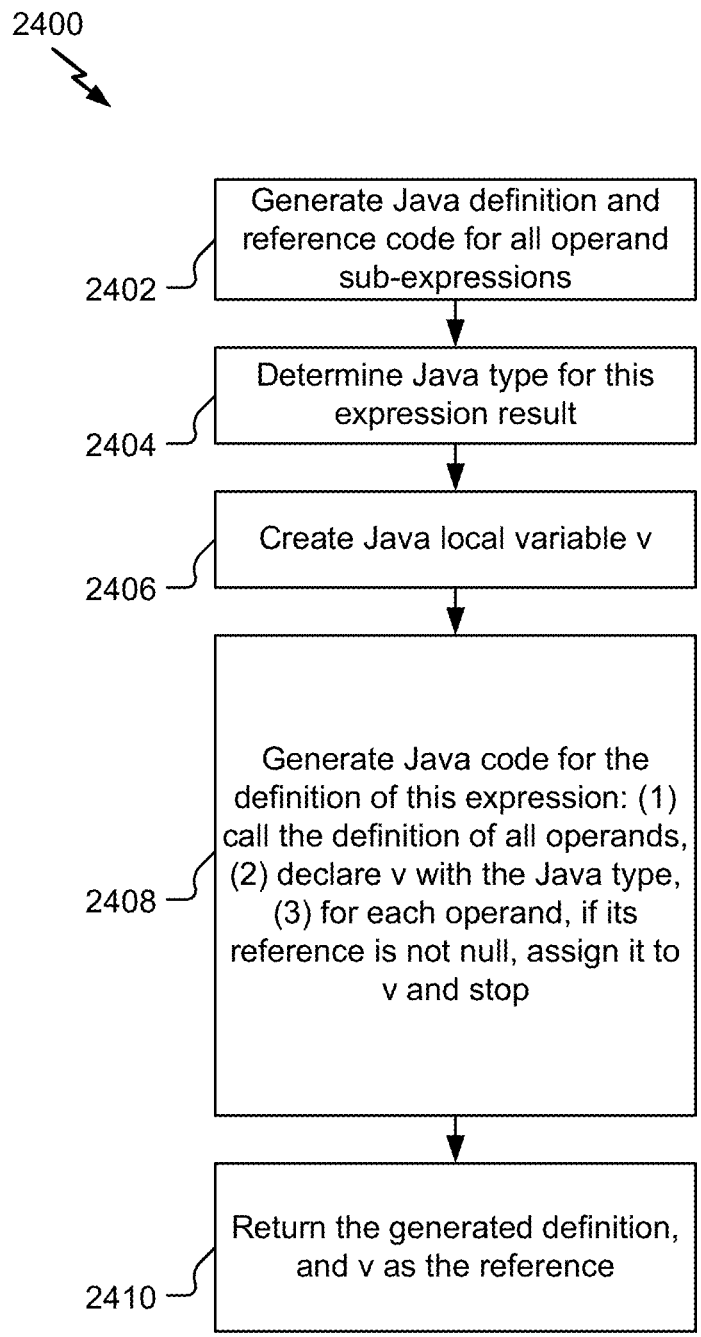
FIG. 24 is a flow chart of an example of a method of generating Java code for a PML Trace expression.

If ctype is TimePredicate, e.max exists (e.g., floating look period), and look.start or look.end are used in e.cond, generate the result definition using the following Java code:

<<period.def>>
<<min.def>>
<<max.def>>
<<cond.def>>
PmlBoolean    <<v>>=<<period.ref>>==null
    ||<<min.ref>>==null
    ||<<max.ref>>==null||<<cond.ref>>==null ? null :
    <<cond.ref>>.evaluate( );

If ctype is TimePredicate, e.max exists (e.g., floating look period), and neither look.start nor look.end are used in the e.cond, generate the result definition (def) using the following Java code:

<<period.def>>
<<min.def>>
<<max.def>>
<<cond.def>>
PmlBoolean    <<v>>=<<period.ref>>==null
    ||<<min.ref>>==null ||
    <<max.ref>>==null ||<<cond.ref>>==null ? null:
    <<cond.ref>>.look(<<period.ref>>, <<start>>, <<min.ref>>, <<max.ref>>);

If ctype is TimePredicate and e.max does not exist (e.g., fixed look period), generate the result definition (def) using the following Java code:

<<period.def>>
<<min.def>>
<<cond.def>>
PmlBoolean    <<v>>=<<period.ref>>==null
    ||<<min.ref>>==null ||
    <<cond.ref>>==null ? null : <<cond.ref>>.look(<<period.ref>>, <<start>>,
    <<min.ref>>, null);

FIG. 24 illustrates a method 2400 of generating Java code for a PML Trace expression. The method 2400 includes generating Java definition and reference code for all operand sub-expressions, at 2402. The method 2400 includes determining a Java type for this expression result, at 2404. The method 2400 includes creating a Java local variable v, at 2406. The method 2400 includes generating Java code for the definition of this expression, at 2408. The Java code is generated by calling the definition of all operands, declaring v with the Java type, and for each operand, if its reference is not null, assigning the operand to v and then stopping. The method 2400 further includes returning the generated definition and v as the reference, at 2410.

The following text provides an example.

Let e.operands be the list of operands in the expression, let n be the number of operands, and let operands be the list of results of calling generate_expr(eeo, ttype, dependent) for each eo in e.operands.

Let v be the result of calling create_var( ).

Let vtype be the result of calling generate_type(type).

To generate the result definition (def):
  For each item o in operands, generate the Java code
    <<o.def>>
  Prepare the variable definition using the Java code
    <<vtype>> <<v>>=
  For i from 1 to n−1, generate <<operands[i].ref>> !=null ? <<vtype>>.cast(<<operands[i].ref>>):.
  Generate the end of the variable definition using the Java code <<vtype>>.cast(<<operands[n].ref>>);.

Generate the result reference (ref) as <<v>>.

Figure 25:
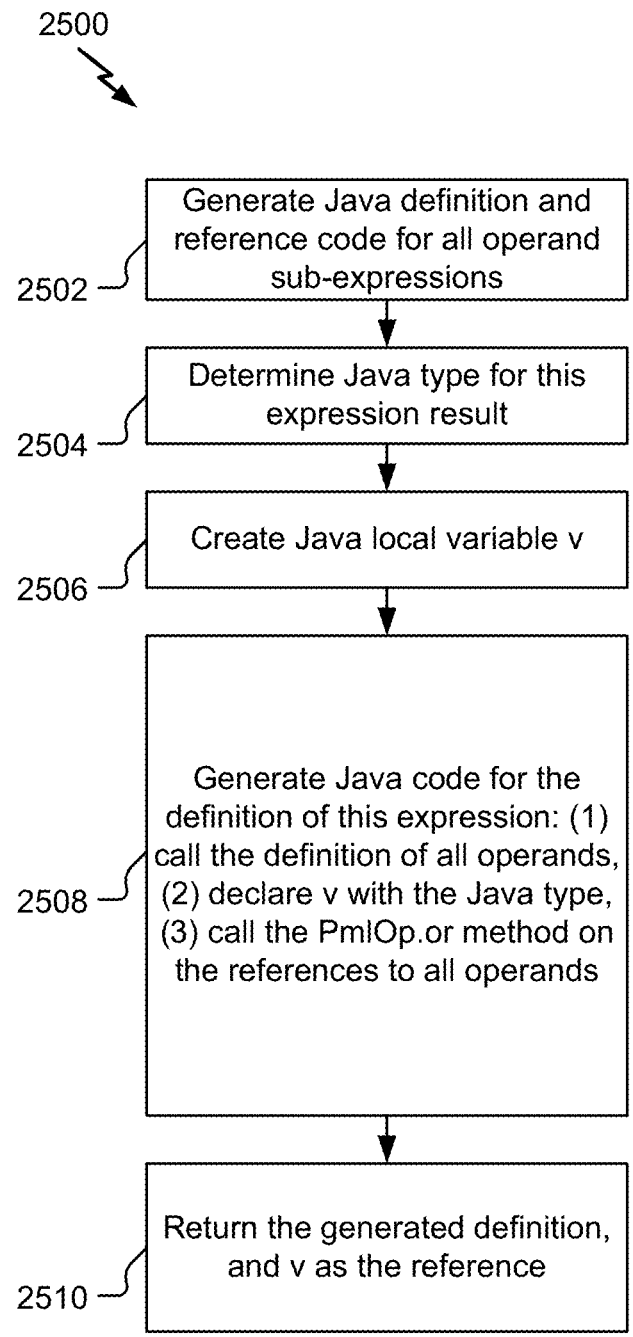
FIG. 25 is a flow chart of an example of a method of generating Java code for a PML Or expression.

FIG. 25 illustrates a method 2500 of generating Java code for a PML Or expression. The method 2500 includes generating Java definition and reference code for all operand sub-expressions, at 2502. The method 2500 includes determining a Java type for this expression result, at 2504. The method 2500 includes creating a Java local variable v, at 2506. The method 2500 includes generating Java code for the definition of this expression, at 2508. The Java code is generated by calling the definition of all the operands, declaring v with the Java type, and calling the PmlOp.or method on the references to all the operands. The method 2500 further includes returning the generated definition and v as the reference, at 2510.

The following text provides an example.

Let e.operands be the list of operands in the Or expression, let n be the number of operands, and let operands be the list of the results of calling generate_expr(eo, null, dependent) for each eo in e.operands.

Let v be the result of calling create_var( ).

Let vtype be the result of calling generate_type(type).

To generate the result definition (def):

For each item o in operands, generate the Java code <<o.def>>

Prepare the variable declaration using the Java code <<vtype>> <<v>>=PmlOp.or(<<vtype>>.class, new PmlAny[ ]{

For i from 1 to 1 to n–1, generate the Java code <<operands[i].ref>>;

Generate the end of the variable definition using the Java code <<operands[n].ref>>});

Generate the result reference (ref) as <<v>>.

Generating Java code for a PML And expression is performed the same as generating the Java code for the PML Or expression, except the PmlOp.and method is called on the references to all the operands. The following text provides an example.

Let e.operands be the list of operands in the And expression, let n be the number of operands, and let operands be the list of the results of calling generate_expr(o, null, dependent) for each o in e.operands.

Let v be the result of calling create_var( ).

Let vtype be the result of calling generate_type(type).

Generate the result definition (def):

For each item o in operands, generate the Java code <<o.def>>.

Prepare the variable declaration using the Java code <<vtype>> <<v>>=PmlOp.and(<<vtype>>.class, new PmlAny[ ]{

For i from 1 to 1 to n–1, generate the Java code <<operands[i].ref>>;

Generate the end of the variable definition using the Java code <<operands[n].ref>>});

Generate the result reference (ref) as <<v>>.

Figure 26:
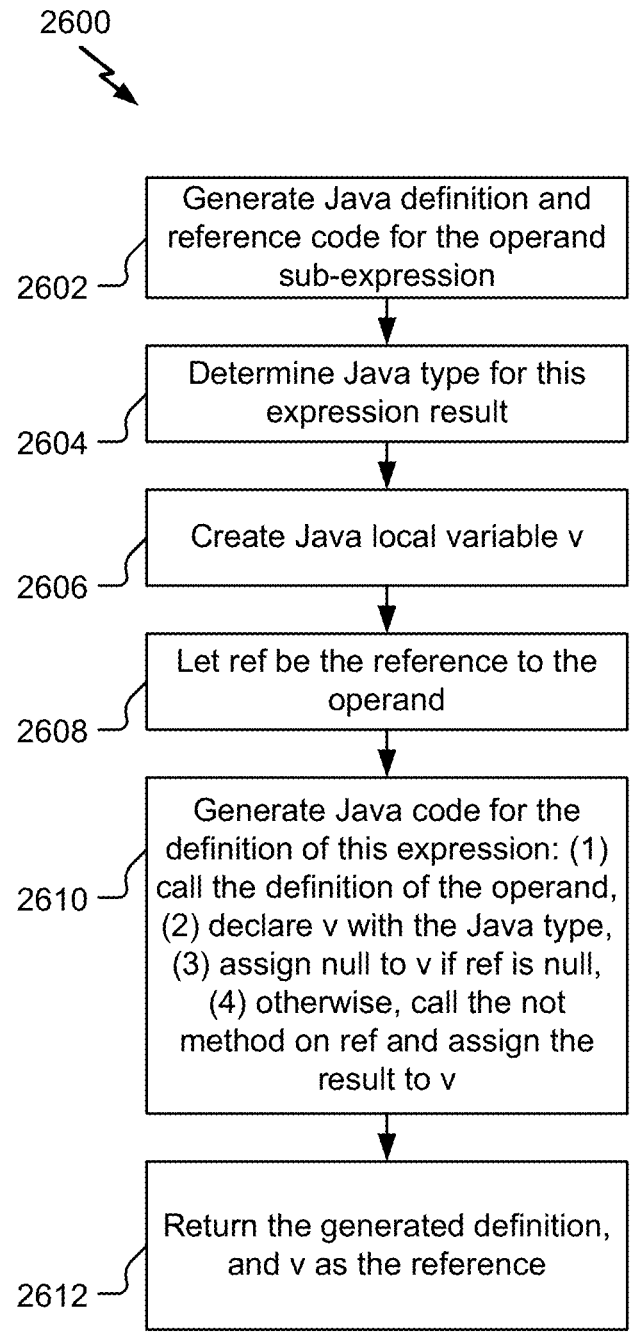
FIG. 26 is a flow chart of an example of a method of generating Java code for a PML Not expression.

FIG. 26 illustrates a method 2600 of generating Java code for a PML Not expression. The method 2600 includes generating Java definition and reference code for the operand sub-expression, at 2602. The method 2600 includes determining a Java type for this expression result, at 2604. The method 2600 includes creating a Java local variable v, at 2606. The method 2600 includes letting ref be the reference to the operand, at 2608. The method 2600 includes generating Java code for the definition of this expression, at 2610. The Java code is generated by calling the definition of the operand, declaring v with the Java type, assigning null to v if ref is null, and otherwise, calling the not method on ref and assigning the result to v. The method 2600 further includes returning the generated definition and v as the reference, at 2612.

The following text provides an example.

Let e.operand be the operand in the expression, and let operand be the result of calling generate_expr(eo, null, dependent) for each eo in e.operands.

Let v be the result of calling create_var( ).

Let vtype be the result of calling generate_type(type).

Generate the result definition (def) by generating the Java code <<operand.def>>.

If the type is Boolean, generate the following Java code:
PmlBoolean <<v>>=<<operands[i].ref>>==null ? null: <<operands[i].ref>>.not( );

If the type is TimePredicate, generate the following Java code:
PmlTimePredicate <<v>>=<<operands[i].ref>>==null ? null: <<operands[i].ref>>.not( );

After generating the Java code, generate the result reference (ref) as <<v>>.

Figure 27:
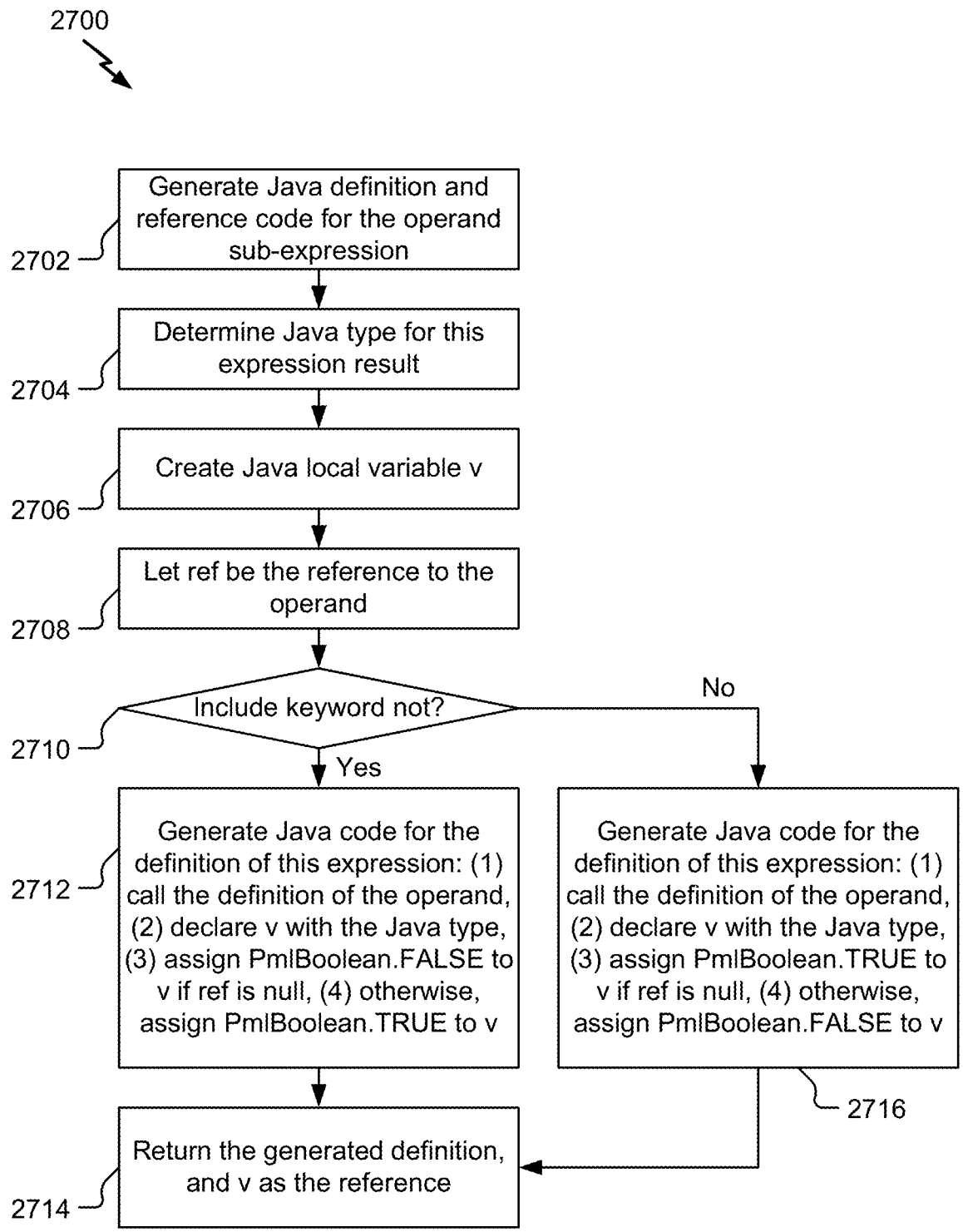
FIG. 27 is a flow chart of an example of a method of generating Java code for a PML TestNull expression.

FIG. 27 illustrates a method 2700 of generating Java code for a PML TestNull expression. The method 2700 includes generating Java definition and reference code for the operand sub-expression, at 2702. The method 2700 includes determining a Java type for this expression result, at 2704. The method 2700 includes creating a Java local variable v, at 2706. The method 2700 includes letting ref be the reference to the operand, at 2708. The method 2700 includes determining whether the keyword "not" is used, at 2710. If the keyword "not" is used, the method 2700 continues to 2712, and Java code for the definition of this expression is generated. The Java code is generated by calling the definition of the operand, declaring v with the Java type, and assigning PmlBoolean.FALSE to v if ref is null, otherwise, assigning PmlBoolean.TRUE to v. If the keyword "not" is not used, the method 2700 continues to 2716, and Java code for the definition of this expression is generated. The Java code is generated by calling the definition of the operand, declaring v with the Java type, assigning PmlBoolean.TRUE to v if ref is null, otherwise assigning PmlBoolean.FALSE to v. After generating the Java code for the definition of this expression (either at 2712 or 2716), the method 2700 continues to 2714, and the generated definition is returned and v is returned as the reference.

The following text provides an example.

Let e.operand be the operand in the TestNull expression, and let operand be the result of calling generate_expr (e.operand, null, dependent).

Let v be the result of calling create_var( ).

If there is the keyword "not", generate the result definition (def) using the following Java code and return the result reference as <<v>>:

<<operand.def>>

PmlBoolean <<v>>=<<operands[i].ref>>==null ? PmlBoolean.FALSE:

PmlBoolean.TRUE;

If there is not the keyword "not", generate the result definition (def) using the following Java code and return the result reference as <<v>>:

<<operand.def>>

Figure 28:
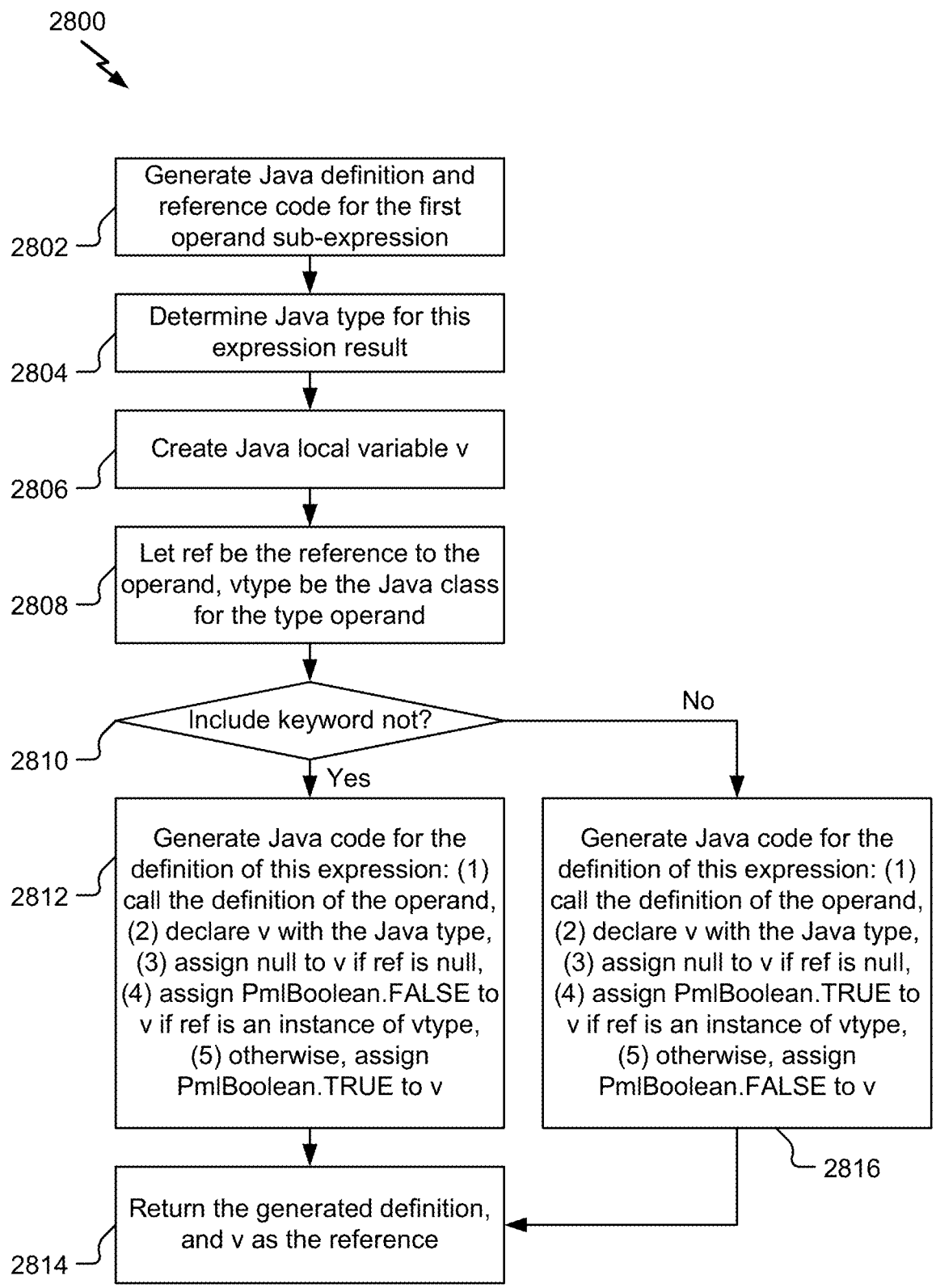
FIG. 28 is a flow chart of an example of a method of generating Java code for a PML TestType expression.

PmlBoolean <<v>>=<<operands[i].ref>>==null ? PmlBoolean.TRUE:

PmlBoolean.FALSE;

FIG. 28 illustrates a method 2800 of generating Java code for a PML TestType expression. The method 2800 includes generating Java definition and reference code for the first operand sub-expression, at 2802. The method 2800 includes determining a Java type for this expression result, at 2804. The method 2800 includes creating a Java local variable v, at 2806. The method 2800 includes letting ref be the reference to the operand and letting vtype be the Java class for the type operand, at 2808. The method 2800 includes determining whether the keyword "not" is used, at 2810. If the keyword "not" is used, the method 2800 continues to 2812, and Java code for the definition of this expression is generated. The Java code is generated by calling the definition of the operand, declaring v with the Java type, assigning null to v if ref is null, assigning PmlBoolean.FALSE to v if ref is an instance of vtype, otherwise, assigning PmlBoolean.TRUE to v. If the keyword "not" is not used, the method 2800 continues to 2816, and Java code for the definition of this expression is generated. The Java code is generated by calling the definition of the operand, declaring v with the Java type, assigning null to v if ref is null, assigning PmlBoolean.TRUE to v if ref is an instance of vtype, otherwise, assigning PmlBoolean.FALSE to v. After generating the Java code for the definition of this expression (either at 2812 or 2816), the method 2800 continues to 2814, and the generated definition is returned and v is returned as the reference.

The following text provides an example.

Let e.operand be the operand in the TestType expression, and let operand be the result of calling generate_expr (e.operand, null, dependent).

Let e.type be the type in the expression, vtype be the result of calling generate_type(e.type).

Let v be the result of calling create_var( ).

Figure 29:
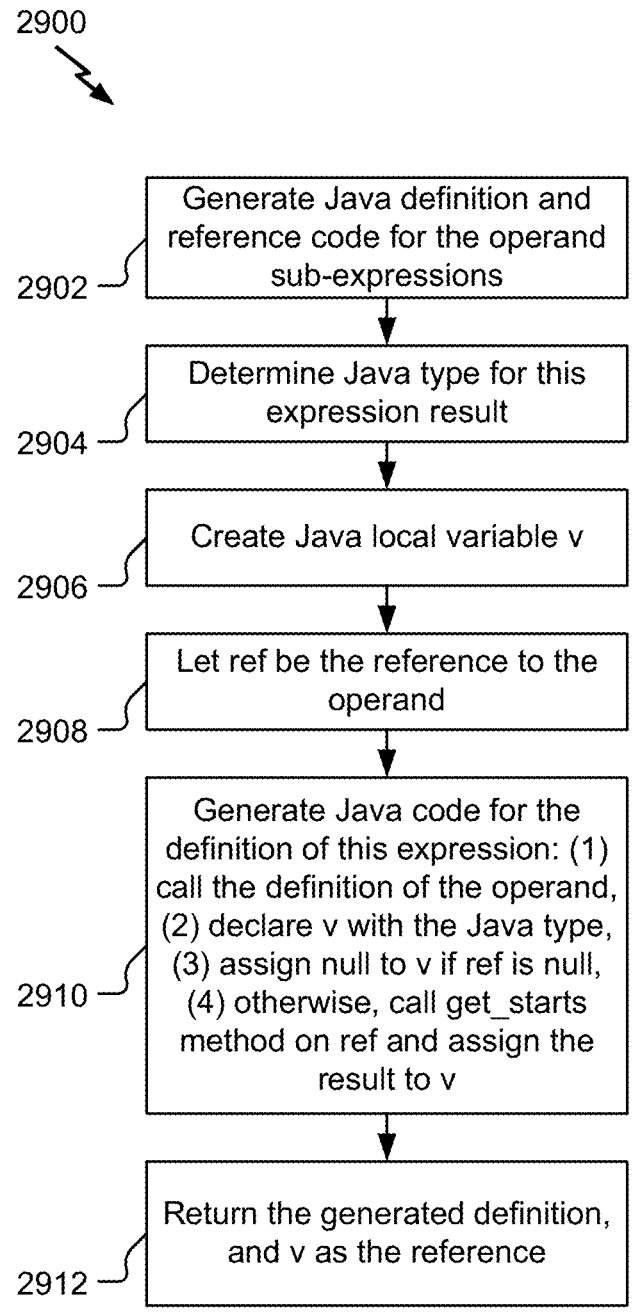
FIG. 29 is a flow chart of an example of a method of generating Java code for a PML BecomesTrue expression.

If there is the keyword "not", generate the result definition (def) using the following Java code and generate the result reference ref as <<v>>:
<<operand.def>>
PmlBoolean <<v>>=<<operands[i].ref>>==null ?<<operand.ref>> instanceof <<vtype>> ? PmlBoolean.FALSE: PmlBoolean.TRUE;

If there is not the keyword "not", generate the result definition (def) using the following Java code and generate the result reference as <<v>>:
<<operand.def>>
PmlBoolean <<v>>=<<operands[i].ref>>==null ?<<operand.ref>> instanceof <<vtype>> ? PmlBoolean.TRUE: PmlBoolean.FALSE;

FIG. 29 illustrates a method 2900 of generating Java code for a PML BecomesTrue expression. The method 2900 includes generating Java definition and reference code for the operand sub-expressions, at 2902. The method 2900 includes determining a Java type for this expression result, at 2904. The method 2900 includes creating a Java local variable v, at 2906. The method 2900 includes letting ref be the reference to the operand, at 2908. The method 2900 includes generating Java code for the definition of this expression, at 2910. The Java code is generated by calling the definition of the operand, declaring v with the Java type, assigning null to v if ref is null, otherwise, calling get_starts method on ref and assigning the result to v. The method 2900 further includes returning the generated definition and v as the reference, at 2912.

The following text provides an example.

Let e.operand be the operand in the BecomesTrue expression, and let operand be the result of calling generate_expr(e.operand, null, dependent).

Let v be the result of calling create_var( ).

Generate the result definition (def) using the following Java code and generate the result reference (ref) as <<v>>:
<<operand.def>>
PmlList <<v>>=<<operands[i].ref>>==null ? null: <<operand.ref>>.get_starts( );

Generating Java code for a PML BecomesFalse expression is the same as generating code for the PML BecomesTrue expression, except the get_ends method is called on ref instead of the get_starts method. The following text provides an example.

Let e.operand be the operand in the BecomesTrue expression, and let operand be the result of calling generate_expr(e.operand, null, dependent).

Let v be the result of calling create_var( ).

Figure 30:
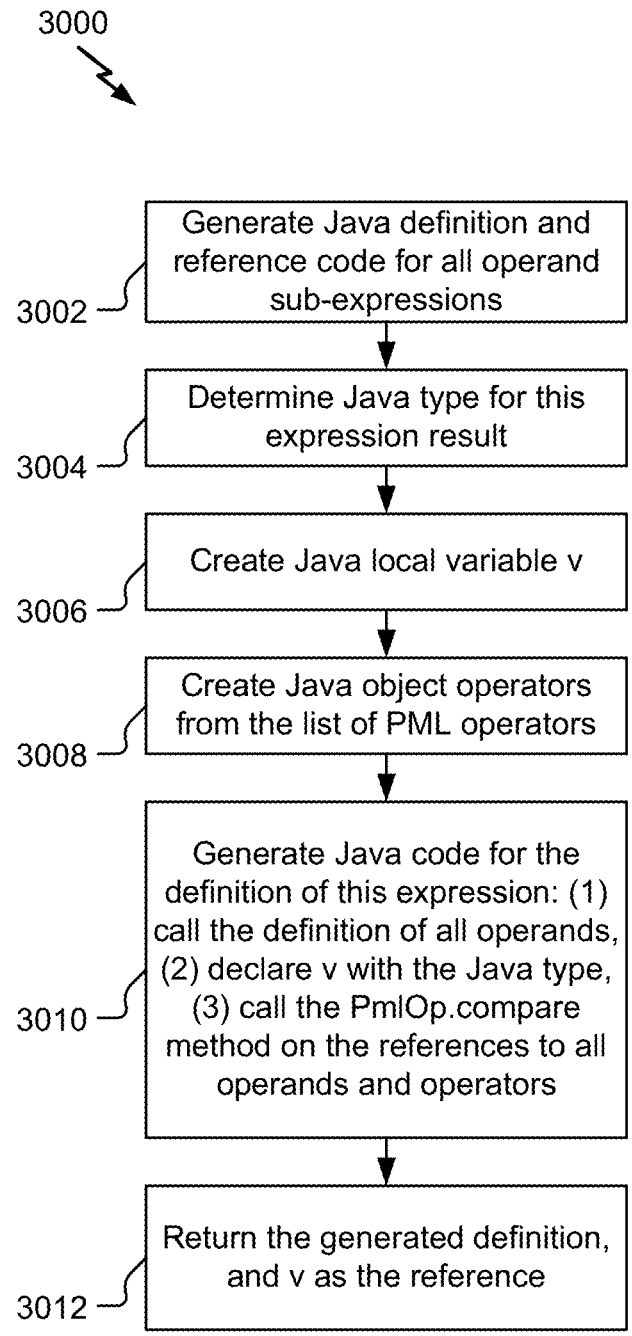
FIG. 30 is a flow chart of an example of a method of generating Java code for a PML Compare expression.

Generate the result definition (def) using the following Java code and generate the result reference (ref) as <<v>>:
<<operand.def>>
PmlList <<v>>=<<operands[i].ref>>==null ? null: <<operand.ref>>.get_ends( );

FIG. 30 illustrates a method 3000 of generating Java code for a PML Compare expression. The method 3000 includes generating Java definition and reference code for all operand sub-expressions, at 3002. The method 3000 includes determining a Java type for this expression result, at 3004. The method 3000 includes creating a Java local variable v, at 3006. The method 3000 includes creating Java object operators from the list of PML operators, at 3008. The method 3000 includes generating Java code for the definition of this expression, at 3010. The Java code is generated by calling the definition of all operands, declaring v with the Java type, and calling the PmlOp.compare method on the references to all operands and operators. The method 3000 further includes returning the generated definition and v as the reference, at 3012.

The following text provides an example.

Let e.operands be the list of operands in the Compare expression, let n be the number of operands, and let operands be the list of results of calling generate_expr (eo, null, dependent) for each eo in e.operands.

Let e.operators be the list of operators in the Compare expression and let operators be the list of results of calling generate_op(eo) for each eo in e.operators.

Let v be the result of calling create_var( ).

Let vtype be the result of calling generate_type(type).

Generate the result definition (def):
For each item o in operands, generate the Java code <<o.def>>.
Prepare the variable definition using the Java code <<vtype>> <<v>>=PmlOp.compare (<<vtype>>.class, new PmlAny[ ]{
For i from 1 to n−1, generate the Java code <<operands[i].ref>>,
Generate the end of the variable definition with the Java code <<operands [n].ref>>}, new PmlOp.Operator[ ]{
From i from 1 to n−2, generate the Java code <<operators[i]>>,
Generate the end of the variable definition using the Java code <<operators[n−1]>>};
Generate the result reference (ref) as <<v>>.

Generating Java code for the AddSubtract expression and the MulDivMod expression is the same as generating Java code for the Compare expression, except PmlOp.merge is called on the references to all operands and operators instead of PmlOp.compare. The following text provides an example.

Let e.operands be the list of operands in the AddSubtract or the MulDivMod expression, let n be the number of operands, and let operands be the list of results of calling generate_expr(eo, null, dependent) for each eo in e.operands.

Let e.operators be the list of operators in the Compare expression and let operators be the list of results of calling generate_op(eo) for each eo in e.operators.

Let v be the result of calling create_var( ).

Let vtype be the result of calling generate_type(type).

Generate the result definition (def):
For each item o in operands, generate the Java code <<o.def>>

Prepare the variable definition using the Java code
    <<vtype>> <<v>>=PmlOp.merge(<<vtype>>.class,
    new PmlAny[ ]{
For i from 1 to n−1, generate the Java code <<operands
    [i].ref>>,
Generate the end of the variable definition with the Java
    code <<operands[n].ref>>>}, new PmlOp.
    Operator[ ]{
From i from 1 to n−2, generate the Java code <<operators[i]>>,
Generate the end of the variable definition using the
    Java code <<operators[n−1]>>};
Generate the result reference (ref) as <<v>>.

Generation of Java code for the Power expression is the same as generation of Java code for the AddSubtract or MulDivMod expression. Even though the Power expression takes only two operands, the code generation logic is the same as that for AddSubtract or MulDivMod (which can handle two or more operands).

Figure 31:
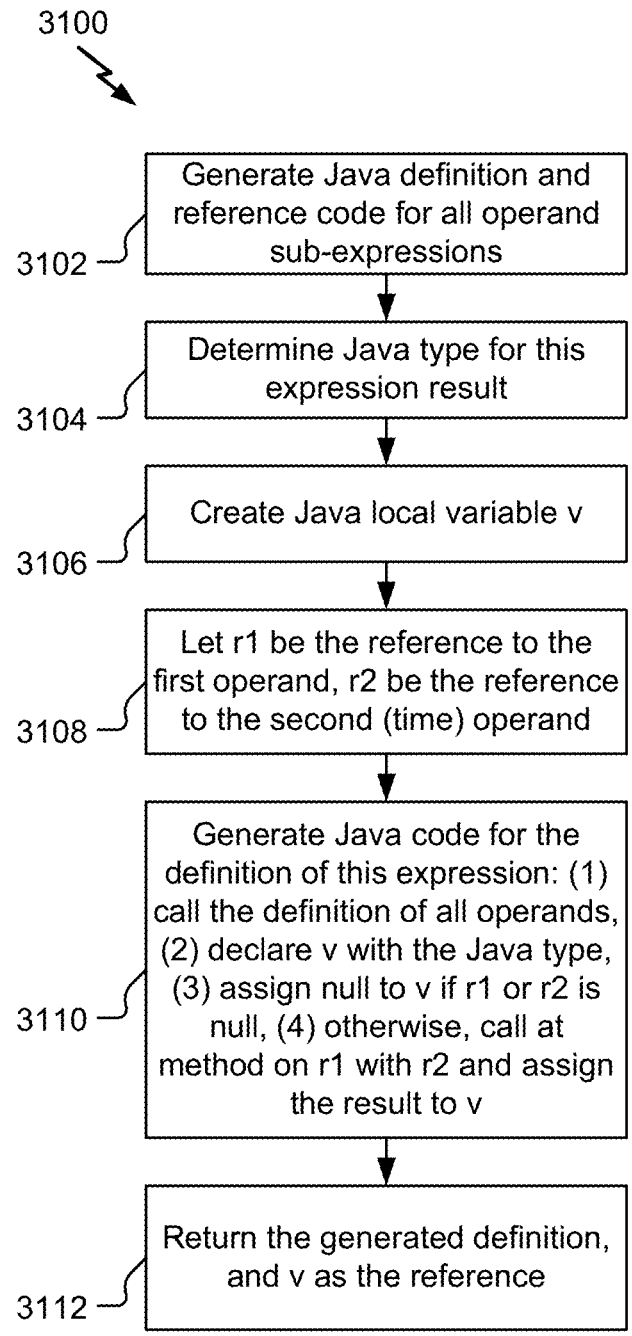
FIG. 31 is a flow chart of an example of a method of generating Java code for a PML Extract expression.

FIG. 31 illustrates a method 3100 of generating Java code for a PML Extract expression. The method 3100 includes generating Java definition and reference code for all operand sub-expressions, at 3102. The method 3100 includes determining a Java type for this expression result, at 3104. The method 3400 includes creating a Java local variable v, at 3106. The method 3100 includes letting r1 be the reference to the first operand and letting r2 be the reference to the second (time) operand, at 3108. The method 3100 includes generating Java code for the definition of this expression, at 3110. The Java code is generated by calling the definition of all operands, declaring v with the Java type, assigning null to v if r1 or r2 is null, otherwise, calling the at method on r1 with r2 and assigning the result to v. The method 3100 further includes returning the generated definition and v as the reference, at 3112.

The following text provides an example.
Let e.p be the first operand (parameter) in the Extract
    expression, and let p be the result of calling
    generate_expr(e.p, null, dependent).
Let e.t be the second operand (time) in the Extract
    expression, and let t be the result of calling
    generate_expr(e.t., null, dependent).
Let v be the result of calling create_var( ).
Let vtype be the result of calling generate_type(type).
Generate the result definition (def) using the following
    Java code and generate the result reference (ref) as
    <<v>>:
<<p.def>>
<<t.def>>
<<vtype>> <<v>>=<<p.ref>>==null ||<<t.ref>>==null ?
    null: <<vtype>>.cast(<<p.ref>>.at(<<t.ref>>));

Generating Java code for the ShiftRight expression is the same as generating Java code for the Extract expression, except the shift method is called on r1 with r2 instead of the at method. The following text provides an example.

Let e.p be the first operand (parameter) in the ShiftRight
    expression, and let p be the result of calling
    generate_expr(e.p, null, dependent).
Let e.t be the second operand (time) in the ShiftRight
    expression, and let t be the result of calling
    generate_expr(e.t, null, dependent).
Let v be the result of calling create_var( ).
Let vtype be the result of calling generate_type(type).
Generate the result definition (def) using the following
    Java code and generate the result reference (ref) as
    <<v>>:
<<p.def>>
<<t.def>>
<<vtype>> <<v>>=<<p.ref>>==null ||<<t.ref>>==null ?
    null:
<<p.ref>>.shift(<<t.ref>>);

Generating Java code for the Index expression is the same as generating Java code for the Extract expression, except the get method is called on r1 with r2 instead of the at method. The following text provides an example.

Let e.base be the first operand in the Index expression, and
    let base be the result of calling generate_expr(e.base,
    null, dependent).
Let e.index be the second operand in the Index expression, and let index be the result of calling generate_expr
    (e.index, null, dependent).
Let v be the result of calling create_var( ).
Let vtype be the result of calling generate_type(type).
Generate the result definition (def) using the following
    Java code and generate the result reference (ref) as
    <<v>>:
<<base.def>>
<<index.def>>
<<vtype>> <<v>>=<<base.ref>>==null
    ||<<index.ref>>==null ? null :
<<base.ref>>.get(<<index.ref>>);

Generating Java code for the Negate expression is the similar to generating Java code for the Extract expression, except the negate method is called instead of the at method. The following text provides an example.

Figure 32:
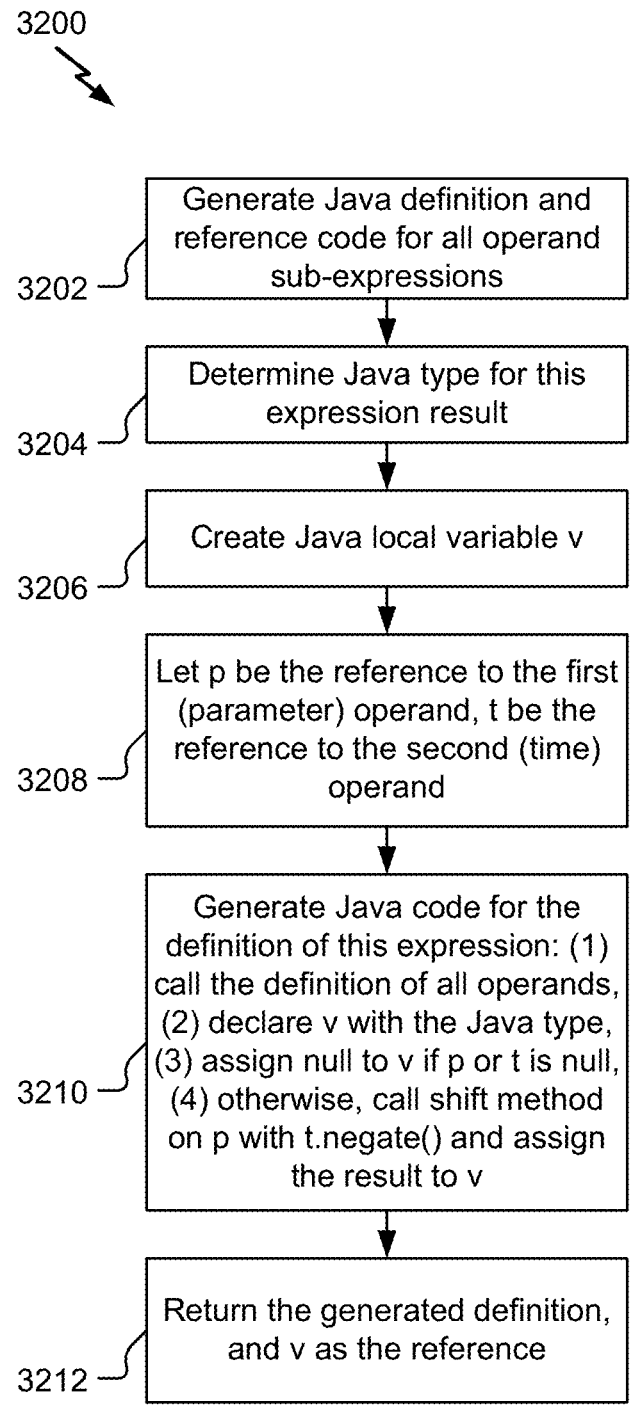
FIG. 32 is a flow chart of an example of a method of generating Java code for a PML ShiftLeft expression.

Let e.o be the operand in the Negate expression, and let
    o be the result of calling generate_expr(e.o, type,
    dependent).
Let v be the result of calling create_var( ).
Let vtype be the result of calling generate_type(type).
Generate the result definition (def) using the following
    Java code and generate the result reference (ref) as
    <<v>>:
<<o.def>>
<<vtype>> <<v>>=<<o.ref>>==null ? null :
    <<o.ref>>.negate( );

FIG. 32 illustrates a method 3200 of generating Java code for a PML ShiftLeft expression. The method 3200 includes generating Java definition and reference code for all operand sub-expressions, at 3202. The method 3200 includes determining a Java type for this expression result, at 3204. The method 3200 includes creating a Java local variable v, at 3206. The method 3200 includes letting p be the reference to the first (parameter) operand and letting t be the reference to the second (time) operand, at 3208. The method 3200 includes generating Java code for the definition of this expression, at 3210. The Java code is generated by calling the definition of all operands, declaring v with the Java type, assigning null to v if p or t is null, otherwise, calling shift method on p with t.negate( ) and assigning the result to v. The method 3200 further includes returning the generated definition and v as the reference, at 3212.

Figure 33:
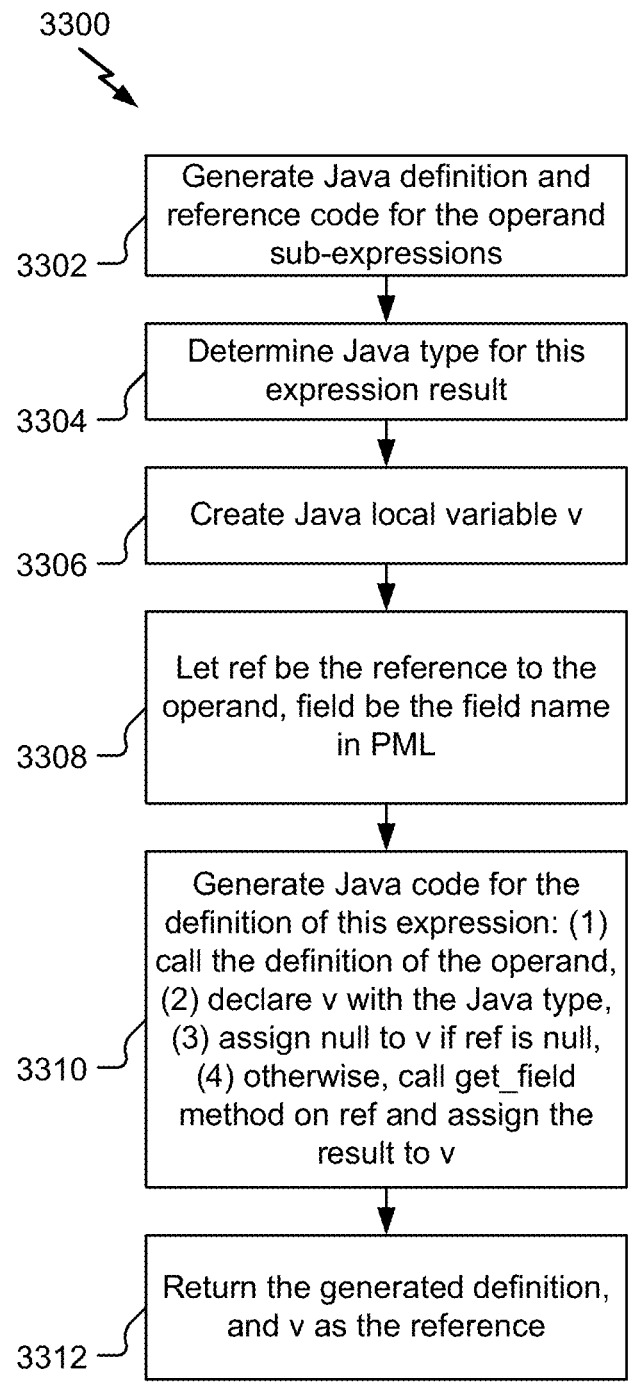
FIG. 33 is a flow chart of an example of a method of generating Java code for a PML ObjectField expression.

The following text provides an example.
Let e.p be the first operand (parameter) of the ShiftLeft
    expression, and let p be the result of calling
    generate_expr(e.p, null, dependent).
Let e.t be the second operand (time) in the ShiftLeft
    expression, and let t be the result of calling
    generate_expr(e.t., null, dependent).
Let v be the result of calling create_var( ).
Let vtype be the result of calling generate_type(type).
Generate the result definition (def) using the following
    Java code, and generate the result reference (ref) as
    <<v>>:

<<p.def>>
<<t.def>>
<<vtype>> <<v>>=<<p.ref>>==null || <<tref>>==null ?
    null :
<<p.ref>>.shift(<<tref>>.negate( ));

FIG. 33 illustrates a method 3300 of generating Java code for a PML ObjectField expression. The method 3300 includes generating Java definition and reference code for the operand sub-expression, at 3302. The method 3300 includes determining a Java type for this expression result, at 3304. The method 3300 includes creating a Java local variable v, at 3306. The method 3300 includes letting ref be the reference to the operand, and letting field be the field name in PML, at 3308. The method 3300 includes generating Java code for the definition of this expression, at 3310. Generating the Java code includes calling the definition of the operand, declaring v with the Java type, assigning null to v if ref is null, otherwise, calling the get_field method on ref and assigning the result to v. The method 3300 further includes returning the generated definition and v as the reference, at 3312.

The following text provides an example.

Let e.object be the first operand in the ObjectField expression, and let object be the result of calling generate_expr(e.object, type, dependent).

Let field be the name (ID) of the field in the ObjectField expression.

Let v be the result of calling create_var( ).

Let vtype be the result of calling generate_type(type).

Figure 34:
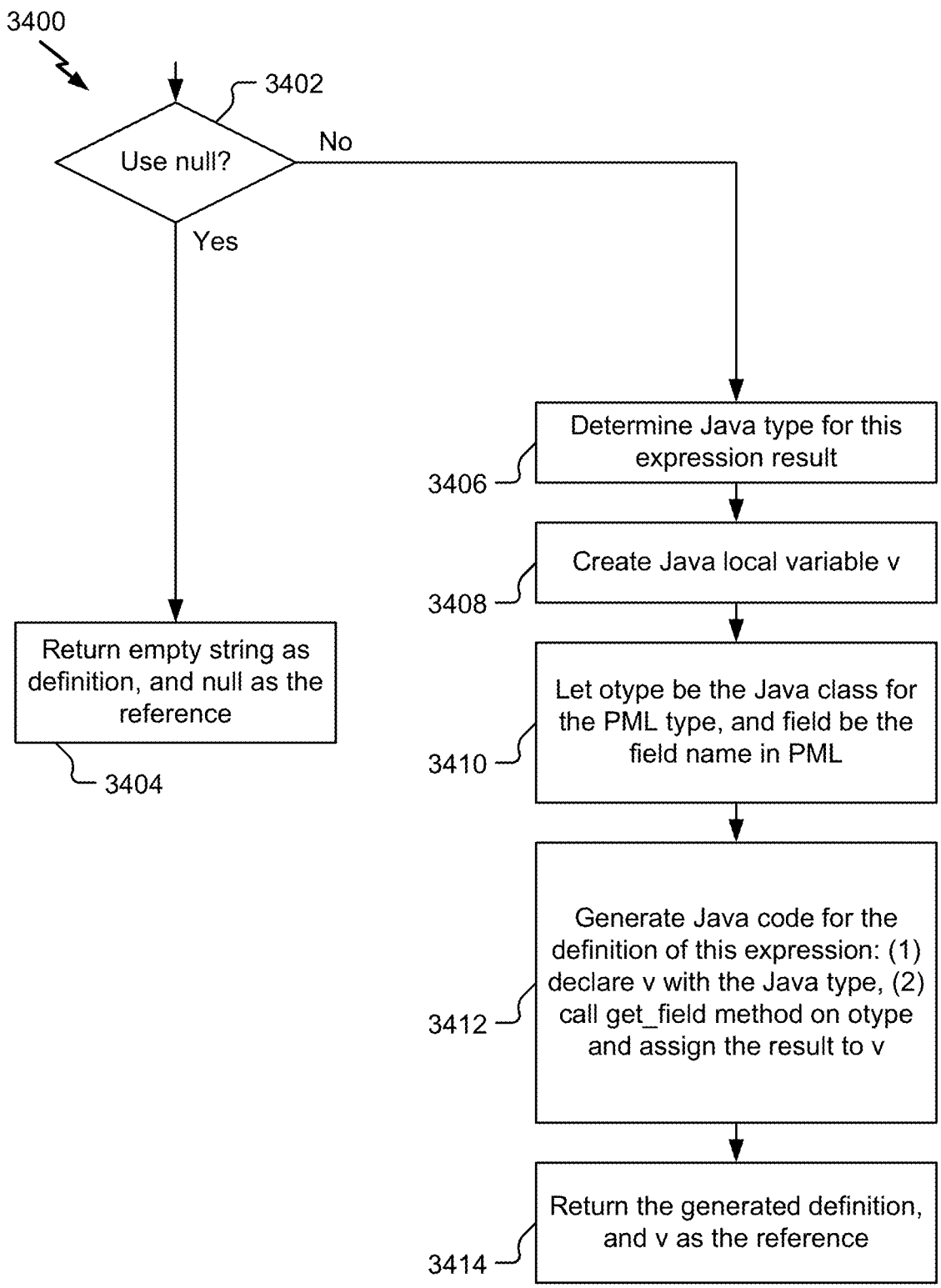
FIG. 34 is a flow chart of an example of a method of generating Java code for a PML StaticField expression.

Generate the result definition (def) using the following Java code and generate the result reference (ref) as <<v>>;

<<o.def>>
<<vtype>> <<v>>=<<object.ref>>==null ? null :
<<object.ref>>.get_<<field>>( );

FIG. 34 illustrates a method 3400 of generating Java code for a PML StaticField expression. The method 3400 includes determining whether the keyword "null" is used, at 3402. If the keyword "null" is used, the method 3400 proceeds to 3404, and an empty string is returned as the definition and null is returned as the reference. For example, the result definition (def) is generated as an empty string, and the result reference (ref) is generated as null.

If the keyword "null" is not used, the method 3400 proceeds to 3406, and a Java type for this expression result is determined. The method 3400 includes creating a Java local variable v, at 3408. The method 3400 includes letting otype be the Java class for the PML type, and letting field be the field name in PML, at 3410. The method 3400 includes generating Java code for the definition of this expression, at 3412. The Java code is generated by declaring v with the Java type and calling the get_field method on otype and assigning the result to v. The method 3400 further includes returning the generated definition and v as the reference, at 3414.

The following text provides an example.

Let e.otype be the first operand in the StatField expression, and let otype be the result of calling generate_type (e.otype).

Let field be the name (ID) of the field in the StaticField expression.

Let v be the result of calling create_var( ).

Let vtype be the result of calling generate_type(type).

Generate the result definition (def) using the Java code
<<vtype>> <<v>>=<<otype>>.get_<<field>>( ); and
generate the result reference as <<v>>.

Figure 35:
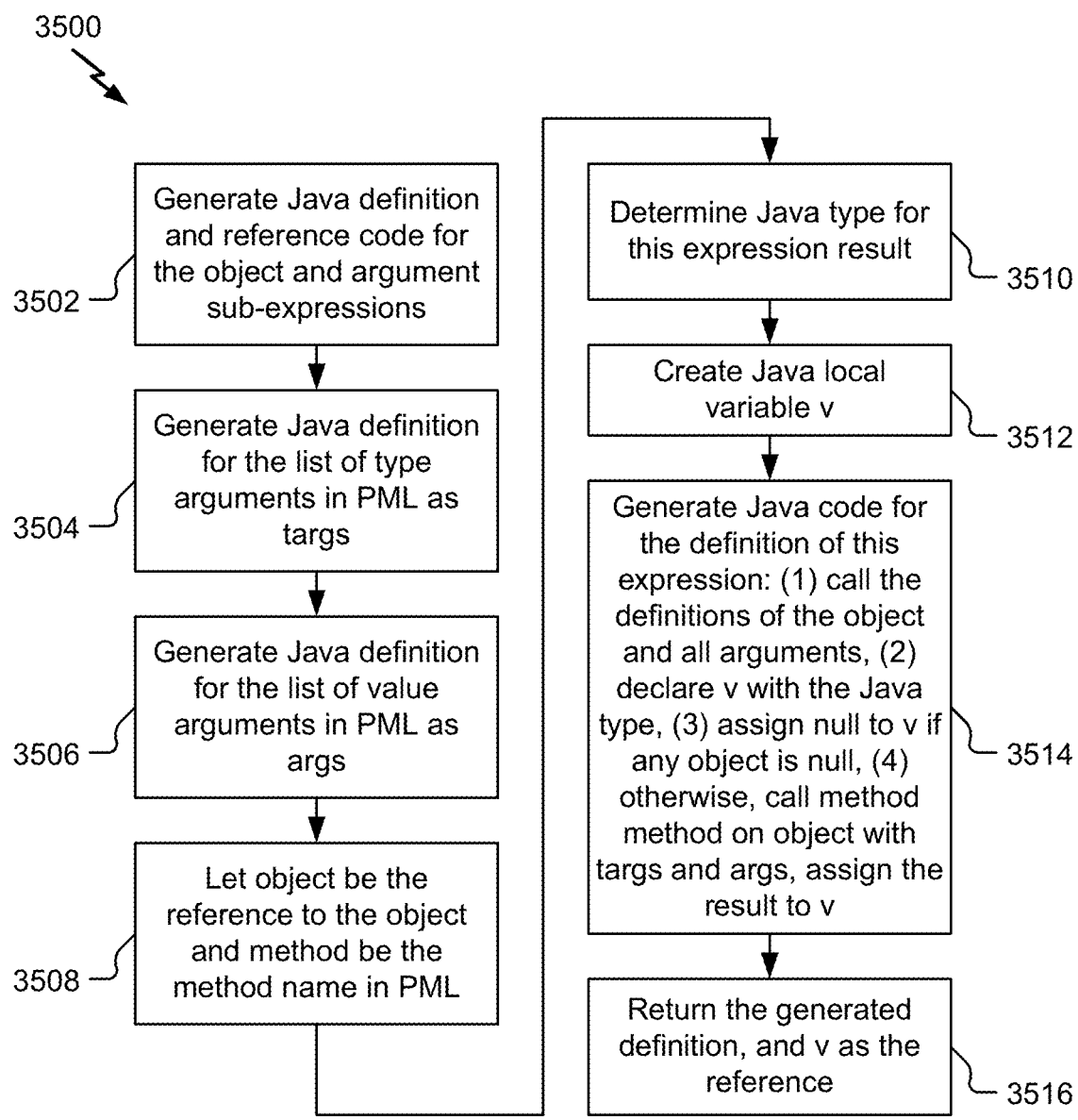
FIG. 35 is a flow chart of an example of a method of generating Java code for a PML ObjectMethod expression.

FIG. 35 illustrates a method 3500 of generating Java code for a PML ObjectMethod expression. The method 3500 includes generating Java definition and reference code for the object and argument sub-expressions, at 3502. The method 3500 includes generating a Java definition for the list of type arguments in PML as targs, at 3504. The method 3500 includes generating a Java definition for the list of value arguments in PML as args, at 3506. The method 3500 includes letting object be the reference to the object and method be the method name in PML, at 3508. The method 3500 includes determining a Java type for this expression result, at 3510. The method 3500 includes creating a Java local variable v, at 3512. The method 3500 includes generating Java code for the definition of this expression, at 3514. The Java code is generated by calling the definitions of the object and all arguments, declaring v with the Java type, assigning null to v if any object is null, otherwise, calling the method "method" on object with targs and args and assigning the result to v. The method 3500 further includes returning the generated definition and v as the reference, at 3516.

The following text provides an example.

Let e.object be the first operand in the ObjectMethod expression, and let object be the result of calling generate_expr(e.object, null, dependent).

Let e.targs be the list of actual type arguments in the ObjectMethod expression, and let targs be the result of calling generate_atargs(e.targs, dependent).

Let e.args be the list of actual arguments in the ObjectMethod expression, and let args be the result of calling generate_aargs(e.args, dependent).

Let separator be a comma if there is at least one type argument and at least one argument in the ObjectMethod expression.

Let method be the name (ID) of the method in the ObjectMethod expression.

Let v be the result of calling create_var( ).

Let vtype be the result of calling generate_type(type).

Figure 36:
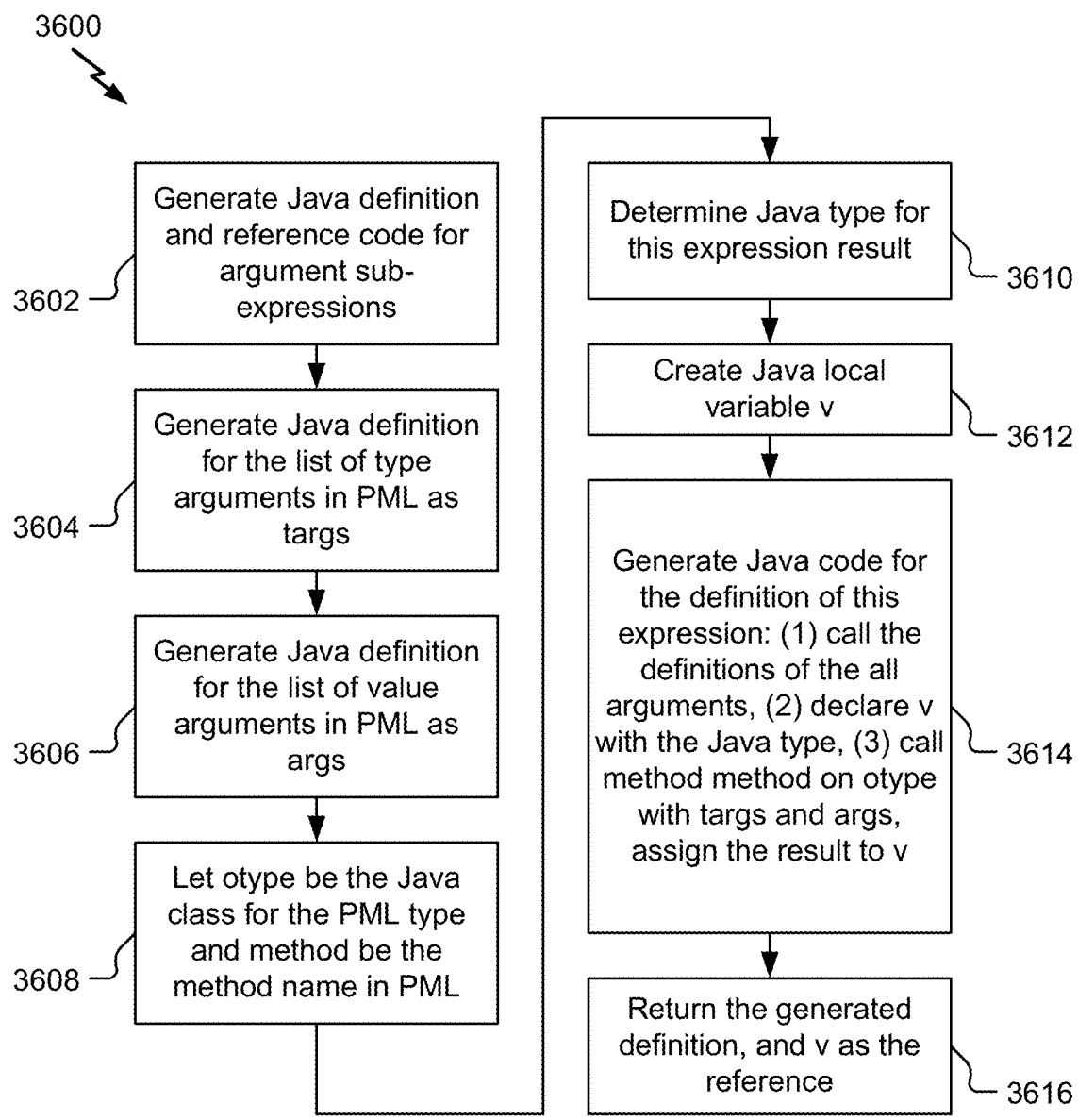
FIG. 36 is a flow chart of an example of a method of generating Java code for a PML StaticMethod expression.

If there is at least one argument in the ObjectMethod expression, generate the result definition (def) using the following Java code, and generate the result reference (ref) as <<v>>:

<<object.def>>
<<args.def>>
<<vtype>> <<v>>=<<o.ref>>==null ? null :
<<o.ref>>.<<method>>
    (<<targs>><<separator>><<args.ref>>);

If there is no argument in the ObjectMethod expression, generate the result definition (def) using the following Java code, and generate the result reference (ref) as <<v>>:

<<object.def>>
<<vtype>> <<v>>=<<o.ref>>==null ? null
<<o.ref>>.<<method>>(<<targs>>);

FIG. 36 illustrates a method 3600 of generating Java code for a PML StaticMethod expression. The method 3600 includes generating Java definition and reference code for argument sub-expressions, at 3602. The method 3600 includes generating Java definition for the list of type arguments in PML as targs, at 3604. The method 3600 includes generating Java definition for the list of value arguments in PML as args, at 3606. The method 3600 includes letting otype be the Java class for the PML type and method be the method name in PML, at 3608. The method 3600 includes determining a Java type for this expression result, at 3610. The method 3600 includes creating a Java local variable v, at 3612. The method 3600 includes generating Java code for the definition of this expression, at 3614. The Java code is generated by calling the definitions of all the arguments, declaring v with the Java type, and calling the method method on otype with targs and args and assigning the result to v. The method 3600 further includes returning the generated definition and v as the reference, at 3616.

The following text provides an example.

Let e.otype be the first operand in the StaticMethod expression, and let otype be the result of calling generate_type(e.otype).

Let e.targs be the list of actual type arguments in the StaticMethod expression.

For each type argument targ in e.targs:
If this is not the first type argument in targs, generate a comma as a separator.
Let gtype be the result of calling generate_type(targ).
Generate the Java code <<otype>>.class.

Let e.args be the list of actual arguments in the StaticMethod expression, and let args be the result of calling generate_type(aargs(e.args, dependent).

Let separator be comma if there is at least one type argument and at least one argument in the StaticMethod expression.

Let method be the name(ID) of the method in the expression.

Let v be the result of calling create_var( ).

Let vtype be the result of calling generate_type(type).

If there is at least one argument in the StaticMethod expression, generate the result definition def using the following Java code and generate the result reference as <<v>>:

<<args.def >>
<<vtype>> <<v>>=<<otype>>.<<method>>(<<targs>> <<separator>>
<<args.ref >>);

If there is no argument in the StaticMethod expression, generate the result definition (def) using the Java code <<vtype>> <<v>>=
<<otype>>.<<method>>(<<targs>>); and generate the result reference (ref) as <<v>>.

Figure 37:
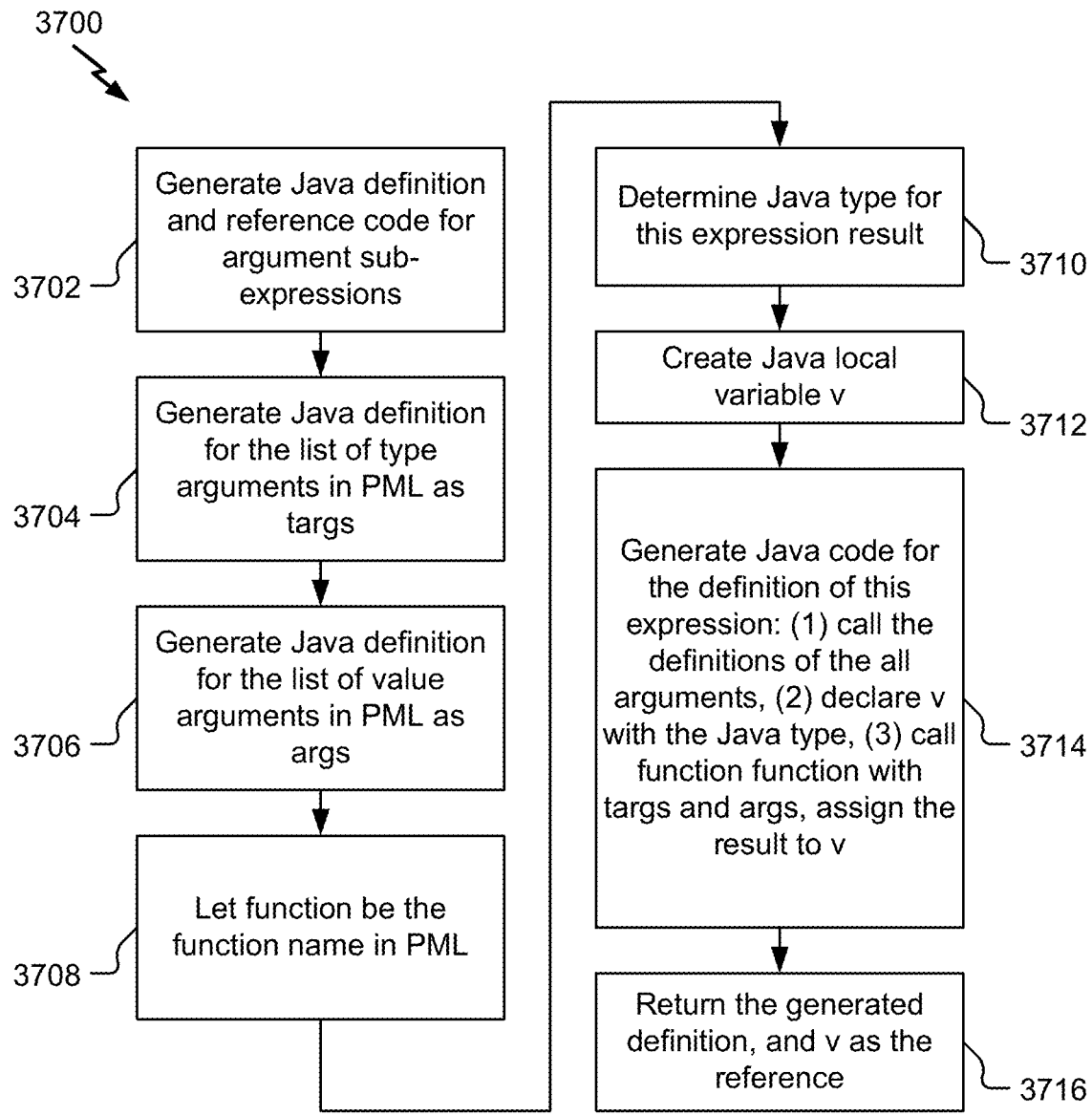
FIG. 37 is a flow chart of an example of a method of generating Java code for a PML Call expression.

FIG. 37 illustrates a method 3700 of generating Java code for a PML Call expression. The method 3700 includes generating Java definition and reference code for argument sub-expressions, at 3702. The method 3700 includes generating Java definition for the list of type arguments in PML as targs, at 3704. The method 3700 includes generating Java definition for the list of value arguments in PML as args, at 3706. The method 3700 includes letting function be the function name in PML, at 3708. The method 3700 includes determining a Java type for this expression result, at 3710. The method 3700 includes creating a Java local variable v, at 3712. The method 3700 includes generating Java code for the definition of this expression, at 3714. The Java code is generated by calling the definitions of all the arguments, declaring v with the Java type, and calling the function function with targs and args and assigning the result to v. The method 3700 further includes returning the generated definition and v as the reference, at 3716.

The following text provides an example.

Let e.targs be the list of actual type arguments in the Call expression, and let targs be the result of calling generate_atargs(e.targs, dependent).

Let e.args be the list of actual arguments in the expression, and let args be the result of calling generate_aargs (e.args, dependent).

Let separator be comma if there is at least one type argument and at least one argument in the expression.

Let function be the name(ID) of the function in the expression.

Let v be the result of calling create_var( ).

Let vtype be the result of calling generate_type(type).

If there is at least one argument in the Call expression, generate the result definition (def) using the Java code <<vtype>> <<v>>=<<function>> (<<targs>><<separator>> <<args.ref>>); and generate the result reference (ref) as <<v>>.

If there is no argument in the Call expression, generate the result definition (def) using the Java code <<vtype>> <<v>>=<<function>>(<<targs>>); and generate the result reference (ref) as <<v>>.

Figure 38:
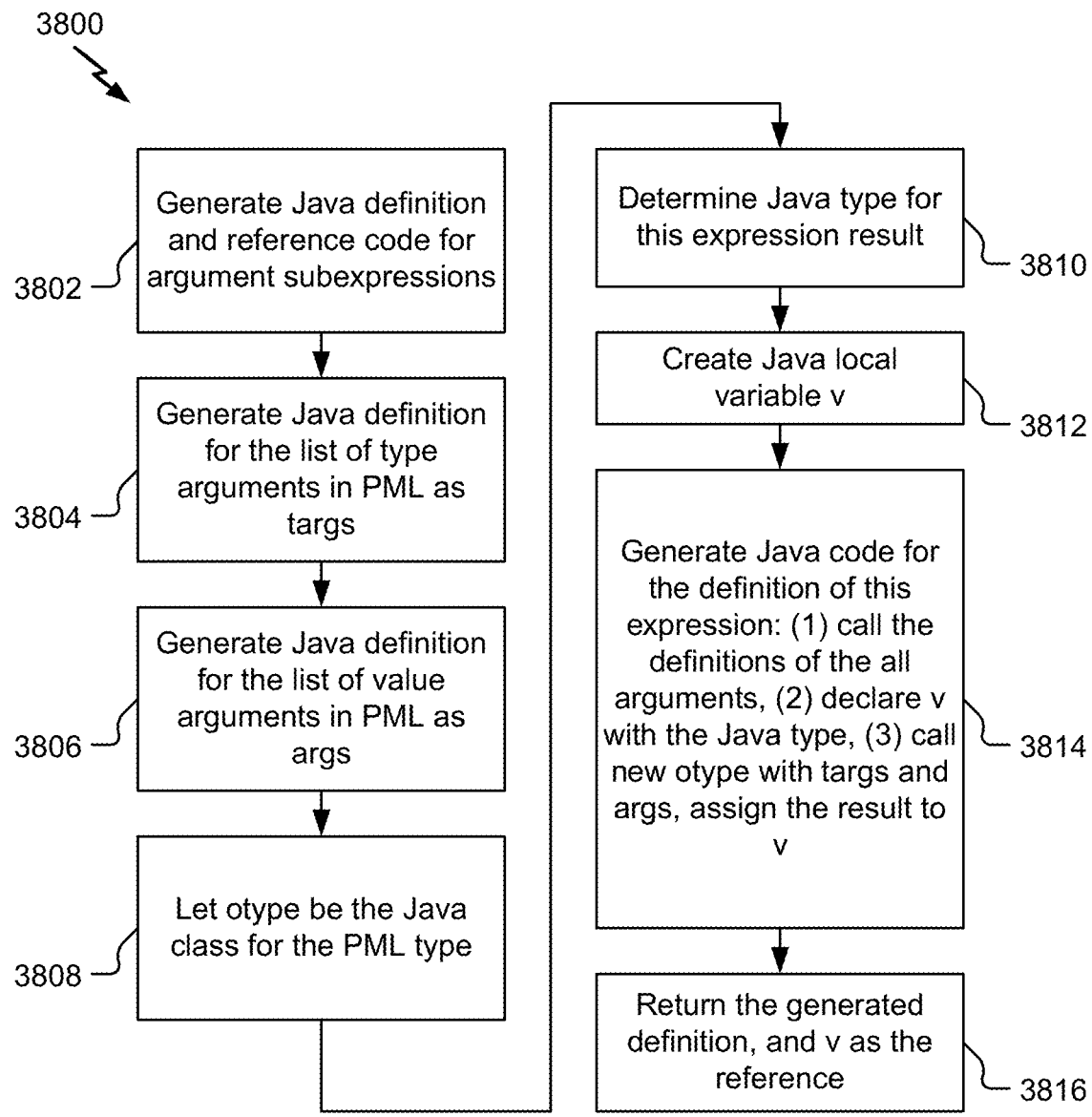
FIG. 38 is a flow chart of an example of a method of generating Java code for a PML New expression.

FIG. 38 illustrates a method 3800 of generating Java code a PLM New expression. The method 3800 includes generating Java definition and reference code for argument sub-expressions, at 3802. The method 3800 includes generating Java definition for the list of type arguments in PML as targs, at 3804. The method 3800 includes generating Java definition for the list of value arguments in PML as args, at 3806. The method 3800 includes letting otype be the Java class for the PML type, at 3808. The method 3800 includes determining a Java type for this expression result, at 3810. The method 3800 includes creating a Java local variable v, at 3812. The method 3800 includes generating Java code for the definition of this expression, at 3814. The Java code is generated by calling the definitions of all the arguments, declaring v with the Java type, and calling new otype with targs and args and assigning the result to v. The method 3800 further includes returning the generated definition and v as the reference, at 3816.

The following text provides an example.

Let e.otype be the type operand in the New expression, and let otype be the result of calling generate_type (e.otype).

Let e.args be the list of actual arguments in the New expression, and let args be the result of calling generate_aargs(e.args, type, dependent).

Let v be the result of calling create_var( ).

Let vtype be the result of calling generate_type(type).

If there is at least one argument in the New expression, generate the result definition (def) using the following Java code and generate the result reference (ref) as <<v>>:

<<args.def>>
<<vtype>> <<v>>=new <<type>> (<<targs>><<separator>><<args.ref>>);

If there is no argument in the New expression, generate the result definition (def) using the Java code <<vtype>> <<v>>=new <<type>>(<<targs>>); and generate the result reference (ref) as <<v>>.

Figure 39:
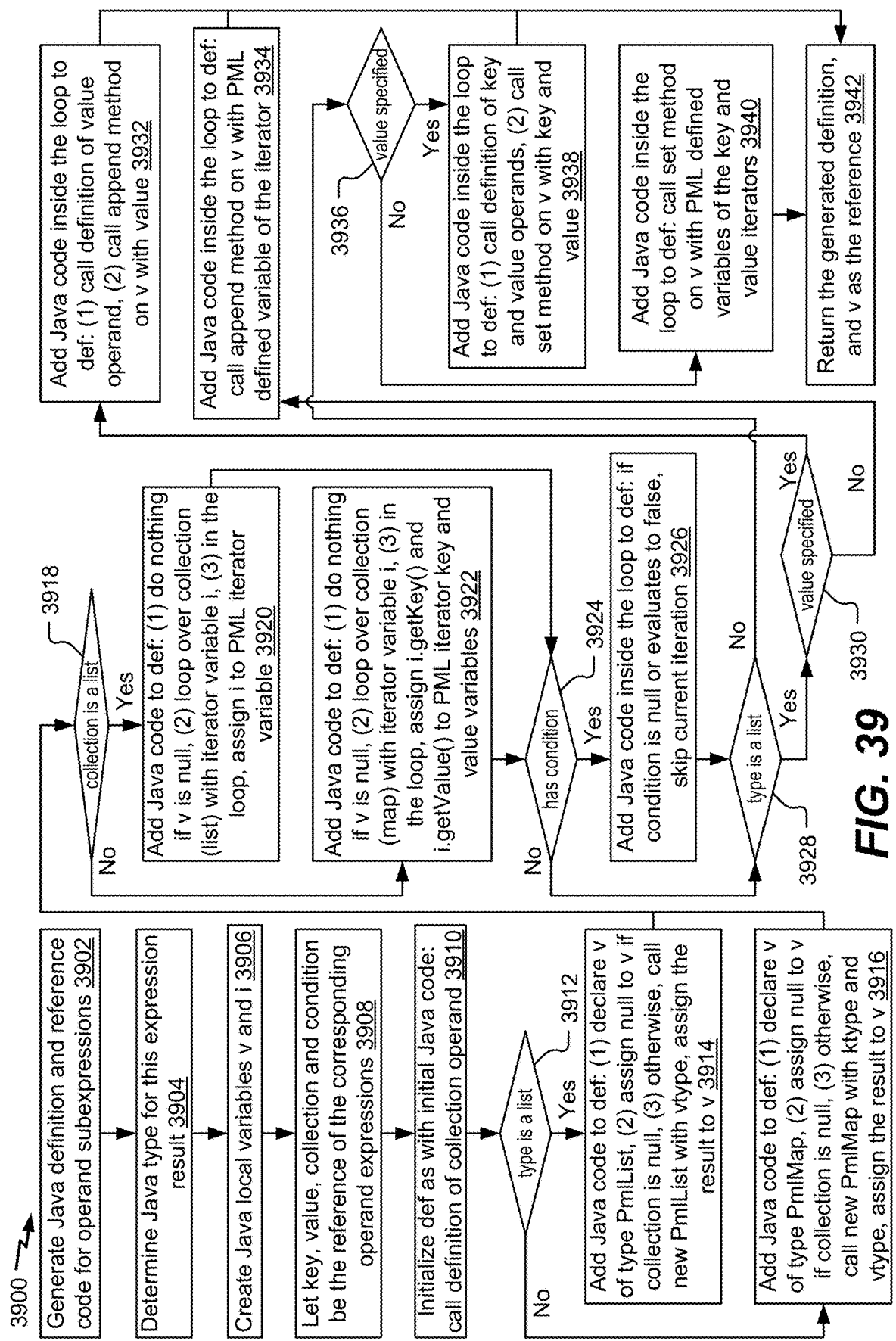
FIG. 39 is a flow chart of an example of a method of generating Java code for a PML Filter expression.

FIG. 39 illustrates a method 3900 of generating Java code for a PLM Filter expression. The method 3900 includes generating Java definition and reference code for operand sub-expressions, at 3902. The method 3900 includes determining a Java type for this expression result, at 3904. The method 3900 includes creating Java local variables v and i, at 3906. The method 3900 includes letting key, value, collection, and condition be the reference of the corresponding operand expressions, at 3908. The method 3900 includes initializing def with initial Java code by calling the definition of the collection operand, at 3910.

The following text provides an example.

Let e.cond be the condition operand (after the operator, if it exists) in the Filter expression, and let cond be the result of calling generate_expr(e.cond, null, dependent).

Let e.collection be the collection operand (after the keyword "in") in the Filter expression, and let collection be the result of calling generate_expr(e.collection, null, dependent).

Let e.ivalue be the ID operand before the keyword "in", and let e.ikey be the ID operand before the : operator, if it exists.

Let e.value be the expression operand before the "for" keyword, let value be the result of calling generate_expr(e.value, null, dependent), let e.key be the expression operand before the : operator (if it exists), and let key be the result of calling generate_expr(e.key, null, dependent).

Let e.vtype be the type of values in the result list or map, let vtype be the result of calling generate_type(e.type), let e.ktype be the type of keys in the result map (if the result is a map), and let ktype be the result of calling generate_type(e.ktype).

Let v, i be the results of two separate calls of create_var( ), respectively.

Begin generating the result definition (def) by generating the collection definition with the Java code <<collection.def>>.

After initializing def with initial Java code, at 3910, the method 3900 continues to 3912, and it is determined whether the type is a list. If the type is a list, the method continues to 3914, and Java code is added to def by declaring v of type PmlList, and assigning null to v if collection is null, otherwise calling new PmlList with vtype and assigning the result to v. For example, the Java code PmlList <<v>>=<<collection.def>>==null ? null: new PmlList (<<vtype>>.class); is generated. If the type is not a list (e.g., the type is a map), the method 3900 proceeds to 3916, and Java code is added to def by declaring v of the type PmlMap and assigning null to v if the collection is null, otherwise calling new PmlMap with ktype and vtype and assigning the result to v. For example, the Java code PmlMap <<v>>=<<collection.def>>==null ? null : new PmlMap (<<ktype>>).class, <<vtype>>.class; is generated.

The method 3900 proceeds (either from 3914 or 3916) to 3918, and it is determined whether the collection operand is a list. If the collection operand is a list, the method 3900 continues to 3920, and Java code is added to def by doing nothing if v is null, looping over the collection operand (list) with iterator variable i, and in the loop, assigning i to the PML iterator variable. For example, a start of the block to add items to the result collection is generated by generating the following Java code:

if (<<v>> !=null> {
   for (PmlAny <<i>>:<<collection.ref>>) {
      <<vtype>>uv_<<e.ivalue>>=<<vtype>>.cast(<<i>>);

If the collection operand is not a list (e.g., the collection operand is a map), the method 3900 proceeds to 3922, and Java code is added to def by doing nothing if v is null, looping over the collection operand (map) with the iterator variable i, and in the loop, assigning i.getKey( ) and i.getValue( ) to PML iterator key and value variables. For example, a start of the block to add items to the result collection is generated by generating the following Java code:

if (<<v>> !=null) {
   for (java.util.Map.Entry<PmlMappable,PmlAny> <<i>>: <<collection.ref>>) {
      <<ktype>>uv_<<e.ikey>>=<<ktype>>.cast (<<i>>getKey( ));
      <<vtype>>uv <<e.ivalue>>=<<vtype>>.cast (<<i>>getValue( ));

The method 3900 proceeds (from either 3920 or 3922) to 3924, and it is determined whether the Filter expression contains the condition operand. If the Filter expression contains the condition operand, the method 3900 continues to 3926, and Java code is added inside the loop to def by adding if condition is null or evaluates to false, skip current iteration. For example, the following Java code is generated:

if        (<<condition.ref>>==null        ||
  !<<condition.ref>>getValue( )) {continue;
}

After 3926, the method 3900 continues to 3928. If the filter expression does not contain the condition operand, at 3924, the method 3900 proceeds to 3928.

At 3928, it is determined whether the type is a list. If the type is a list, the method 3900 continues to 3930, and it is determined whether a value is specified (e.g., whether the Filter expression contains e.value). If the value is specified, the method 3900 continues to 3932, and Java code is added inside the loop to def by calling the definition of the value operand and calling the append method on v with the value operand. For example, if the result of the Filter expression is a list and the Filter expression contains e.value, generate the following Java code:

<<value.def>>
<<v>>.append(uv_<<value.ref>>);

If the value is not specified, at 3930, the method 3900 proceeds to 3934, and Java code is added inside the loop to def by calling the append method on v with PML defined variable of the iterator. For example, if the result of the Filter expression is a list and the Filter expression does not contain e.value, generate the Java code:

<<v>>.append(uv_<<ivalue>>);

Returning to 3928, if the type is not a list (e.g., the type is a map), the method 3900 proceeds to 3936, and it is determined whether a value is specified (e.g., whether the Filter expression contains e.value). If the value is specified, the method 3900 continues to 3938, and Java code is added inside the loop to def by calling the definitions of the key and value operands and calling the set method on v with the key and value operands. For example, if the result of the Filter expression is a map and the expression contains e.value, generate the following Java code:

<<key.def>>
<<value.def>>
<<v>>.set(uv_<<key.ref>>, uv_<<value.ref>>);

If the value is not specified, at 3936, the method 3900 proceeds to 3940, and Java code is added inside the loop to def by calling the set method on v with PML defined variables of the key and value iterators. For example, if the result of the Filter expression is a map and the expression contains e.value, generate the Java code <<v>>.set (uv_<<ikey>>, uv_<<ivalue>>);.

The method 3900 proceeds (from 3932, 3934, 3938, or 3940) to 3942, and the generated definition is returned and v is returned as the reference. For example, the following Java code is generated to end the item-adding block:

}
}

And the result reference (ref) is returned as <<v>>.

Figure 40:
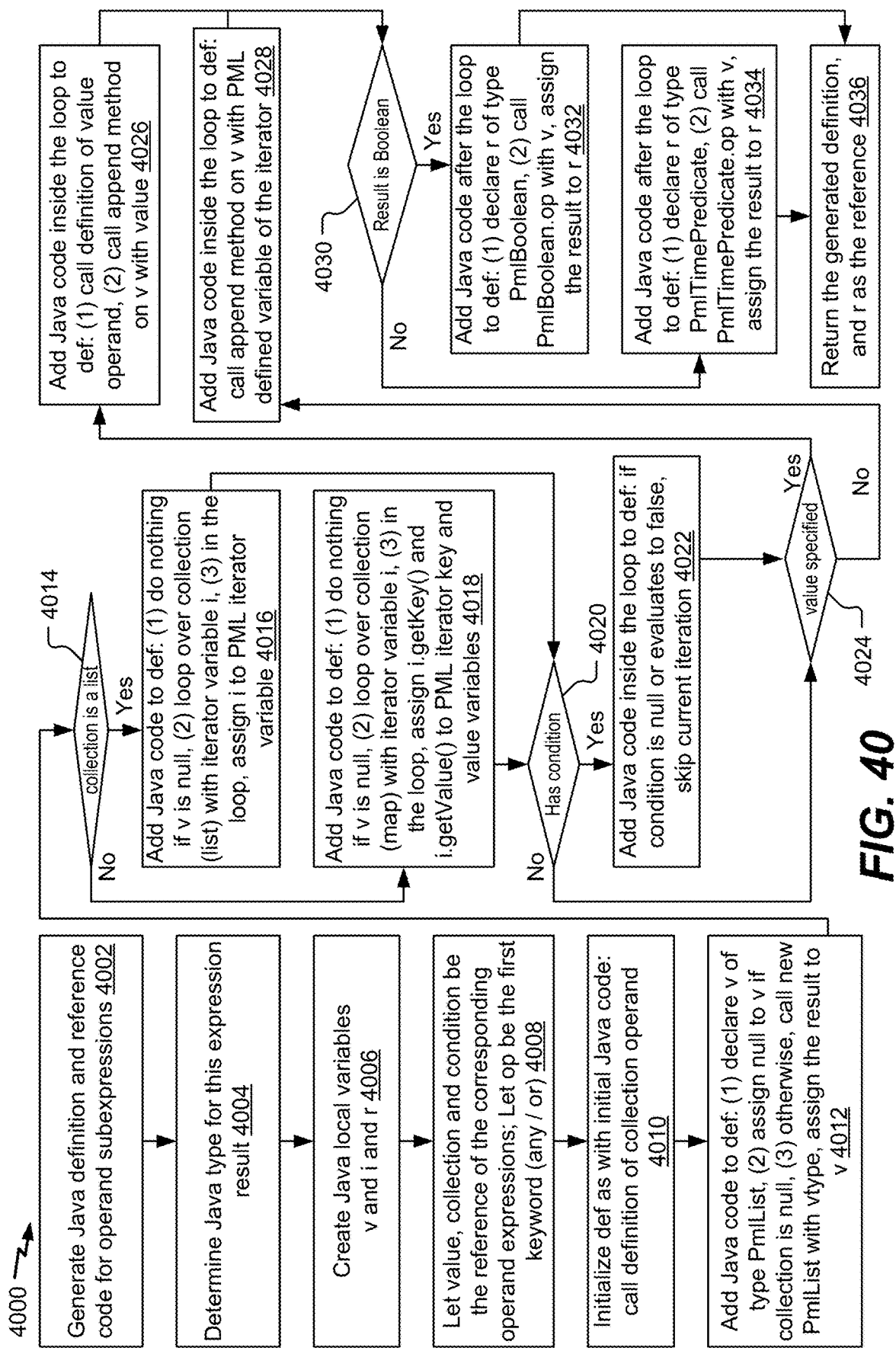
FIG. 40 is a flow chart of an example of a method of generating Java code for a PML Aggregation expression.

FIG. 40 illustrates a method 4000 of generating Java code for a PLM Aggregate expression. The method 4000 includes generating Java definition and reference code for operand sub-expressions, at 4002. The method 4000 includes determining a Java type for this expression result, at 4004. The method 4000 includes creating local Java variables v, i, and r, at 4006. The method 4000 includes letting value, collection, and condition be the references of the corresponding operand expressions and letting op be the first keyword (e.g., "any" or "or"), at 4008. The method 4000 includes initializing def as with initial Java code by calling the definition of the collection operand, at 4010. The method 4000 includes adding Java code to def to declare v of type PmlList and to assign null to v if the collection operand is null, otherwise, to call new PmlList with vtype and assign the result to v, at 4012.

The following text provides an example.

Let e.cond be the condition operand (after the operator, if it exists) in the Aggregate expression, and let cond be the result of calling generate_expr(e.cond, null, dependent).

Let e.collection be the collection operand (after the keyword "in") in the Aggregate expression, and let collection be the result of calling generate_expr(e.collection, null, dependent).

Let e.ivalue be the ID operand before the keyword "in", and let e.ikey be the ID operand before the " operator, if it exists.

Let e.value be the expression operand before the keyword "for", and let value be the result of calling generate_expr(e.value, null, dependent).

Let vtype be the result of calling generate_type(type).

Let v, i, r be the results of three separate calls of create_var( ), respectively.

Generate the result definition (def) by first generating the following Java code to generate the collection definition and intermediate holder:

<<collection.def>>
PmlList <<v>>=<<collection.def>>==null ? null : new PmlList(<<type>>.class);

After 4012, the method 4000 continues to 4014, and it is determined in the collection operand is a list. If the collection operand is a list, the method 4000 continues to 4016, and Java code is added to add to def by doing nothing if v is null, looping over the collection operand (list) with iterator variable i, and in the loop, assigning i to PML iterator variable. For example, if the collection operand is a list, generate a start of the block to add items to the result collection by generating the following Java code:

if (<<v>> !=null) {
    for (PmlAny <<i>>: <<collection.ref>>) {
        <<vtype>>uv_<<eivalue>>=<<vtype>>.cast(<<i>>);

If the collection operand is not a list (e.g., the collection operand is a map), at 4014, the method 4000 proceeds to 4018, and Java code is added to add to def by doing nothing if v is null, looping over the collection operand (map) with iterator variable i, and assigning i.getKey( ) and i.getValue( ) to PML iterator key and value variables. For example, if the collection operand is a map, generate a start of the block to add items to the result collection by generating the following Java code:

if (<<v>> !=null) {
    for (java.util.Map.Entry<PmlMappable,PmlAny> <<i>>: <<collection.ref>>) {
        <<ktype>>uv_<<e.ikey>>=<<ktype>>.cast (<<i>>.getKey( ));
        <<vtype>>uv_<<eivalue>>=<<vtype>>.cast (<<i>>.getValue( ));

The method 4000 proceeds (from either 4016 or 4018) to 4020, and it is determined whether the Aggregation expression contains the condition operand. If the Aggregation expression contains the condition operand, the method 4000 continues to 4022, and Java code is added inside the loop to add to def by, if the condition operand is null or evaluates to false, skipping the current operation. For example, if the Aggregation expression contains the condition operand, generate condition testing using the following Java code:

if (<<condition.ref>>==!<<condition.ref>>.getValue( ))
    {continue;
}

After 4022, the method continues to 4024. If the Aggregation expression does not contain the condition operand, at 4020, the method 4000 proceeds to 4024.

At 4024, it is determined whether a value is specified (e.g., whether the Aggregation expression contains e.value). If the value is specified, the method 4000 continues to 4026, and Java code is added inside the loop to add to def by calling the definition of the value operand and calling the append method on v with the value operand. For example, if the Aggregation expression contains e.value, generate the following Java code:

<<value.def>>
<<v>>.append(uv_<<value.ref>>);

If the value is not specified, at 4024, the method 4000 proceeds to 4028, and Java code is added inside the loop to add to def by calling the append method on v with PML defined variable of the iterator. For example, if the Aggregation expression does not contain e.value, generate the following Java code:

<<v>>.append(uv_<<value.ref>>);

The method 4000 proceeds (from either 4026 or 4028) to generate the end of the item-adding block by generating the following Java code:

}
}

After generating the Java code, the method 4000 proceeds to 4030, and it is determined whether the result is Boolean. If the result is Boolean, Java code is added after the loop to add to def by declaring r of type PmlBoolean and calling PmlBoolean.op with v and assign the result to r, at 4032. For example, if the result is Boolean and the Aggregation expression uses the keyword "any", generate the Java code PmlBoolean <<r>>=PmlBoolean.any(<<v>>);. If the result is Boolean and the Aggregation expression uses the keyword "all", generate the Java code PmlBoolean <<r>>=PmlBoolean.all(<<v>>);. If the result is not Boolean (e.g., the result is TimePredicate), at 4030, the method 4000 continues to 4034, and Java code is added after the loop to add to def by declaring r of type PmlTimePredicate and calling PmlTimePredicate.op with v and assigning the results to r. For example, if the result is TimePredicate and the Aggregation expression uses the keyword "any", generate the Java code PmlTimePredicate <<r>>=PmlTimePredicate.any(<<v>>);. If the result is TimePredicate and the Aggregation expression uses the keyword "all", generate the Java code PmlTimePredicate <<r>>=PmlTimePredicate.all(<<v>>);.

The method 4000 then proceeds (either from 4032 or 4034) to 4036, and the generated definition is returned and r is returned as the reference. For example, the above-described code generates the definition (def), and the result reference (ref) is generated as <<r>>.

In addition to the expressions described with reference to FIGS. 22-40, Java code for a Group expression can be generated. The Group expression contains a single operand that is another expression. The type (type), definition (def), and reference (ref) of the operand are returned as the generation result for the Group expression.

Additionally, Java code is generated for variable and formal argument references in PML. Variables and formal arguments are referenced by their names in expressions. The following text provides an example.

Let name be the name (ID) of the variable or formal argument.
Generate the result definition (def) as an empty string.
Generate the result reference (ref) as uv_<<name>>.
Additionally, Java code is generated for Literals in PML. Literals are atomic expressions. The following text provides an example.
 Let value be the string representation (either true or false) of the literal.
 Generate the result definition (def) as an empty string.
 Generate the result reference (ref) as new pml.lang.PmlBoolean(<<value>>).
Additionally, Java code is generated for a character literal. The following text provides an example.
 Let value be the string representation (including the pair of enclosing single quotes) of the literal.
 Generate the result definition (def) as an empty string.
 Generate the result reference (ref) as new pml.lang.PmlCharacter(<<value>>).
Additionally, Java code is generated for a String literal. The following text provides an example.
 Let value be the string representation (including the pair of enclosing double quotes) of the literal.
 Generate the result definition (def) as an empty string.
 Generate the result reference (ref) as new pml.lang.PmlString(<<value>>).
Additionally, Java code is generated for a Numeric literal. The following text provides an example.
 Let value be the numerical portion (excluding the mark, i.e., character suffix such as B or ms) of the literal.
 Generate the result definition (def) as an empty string.
 Generate the result reference (ref) per the suffix in the literal.
 If the literal ends with B, generate new pml.lang.PmlByte(<<value>>).
 If the literal ends with S, generate new pml.lang.PmlShort(<<value>>).
 If the literal ends with I, generate new pml.lang.PmlInt(<<value>>).
 If the literal ends with L, generate new pml.lang.PmlLong(<<value>>).
 If the literal ends with F, generate new pml.lang.PmlFloat(<<value>>).
 If the literal ends with D, generate new pml.lang.PmlDouble(<<value>>).
 If the literal ends with ms, generate new pml.lang.PmlfromMs(<<value>>).
 If the literal ends with us, generate new pml.lang.PmlfromUs(<<value>>).
 If the literal ends with ns, generate new pml.lang.PmlfromNs(<<value>>).
 If the literal ends with s, generate new pml.lang.PmlfromS(<<value>>).
 If the literal ends with m, generate new pml.lang.PmlfromS(<<60*value>>).
 If the literal ends with h, generate new pml.lang.PmlfromS(<<3600*value>>).
 If the literal ends with d, generate new pml.lang.PmlfromS(<<86400*value>>).
 If the literal has no suffix and does not include the fraction or exponential portion, generate new pml.lang.PmlInt(<<value>>).
 Otherwise (e.g., the literal has not suffix but includes the fraction portion, the exponential portion, or both), generate new pml.lang.PmlDouble(<<value>>).
Additionally, Java code is generated for a List literal. The following text provides an example.
 Let e.items be the list of child expressions in the literal, let n be the number of child expressions, and let items be the list of results of calling generate_expr(eitem, null, dependent) for each eitem in e.items.
 The result type type is a List, and let itype be the item type of type.
 Let v be the result of calling create_var( ).
 Generate the result definition (def) by first, for each item in items, generate <<item.def>>.
 Generate the Java code PmlList <<v>>=new PmlList(<<itype>>.class);.
 For each item in items, generate the Java code <<v>>.append(<<item.ref>>);.
 Generate the result reference (ref) as <<v>>.
Additionally, Java code is generated for a Map literal. The following text provides an example.
 Let e.pairs be the list of key-value pairs of expressions in the literal, and let n be the number of pairs, let pairs be the list of results of calling
 generate_expr(pair.key, null, dependent) and generate_expr(pair.value, null, dependent) for each pair in e.pairs.
 The result type type is a List, let ktype be the key type of type, and let vtype be the value type of type.
 Let v be the result of calling create_var( ).
 Generate the result definition (def) by performing the following operations.
 First, for each pair in pairs, generate the following Java code:
 <<pair.key.def>>
 <<pair.value.def>>
 Next, generate the Java code PmlMap <<v>>=new PmlMap(<<ktype>>, <<vtype>>);
 For each pair in pairs, generate the following Java code:
 if (<<pair.key.ref>> !=null) {
   <<v>>.set(<<pair.key.ref>>, <<pair.value.ref>>);
 }
 Finally, generate the result reference (ref) as <<v>>.
Additionally, Java code is generated for a Parameter literal.
 Let e.name be the parameter name (String) in the literal.
 Let e.type be the parameter value type in the literal. If the value type is not specified, a default type is used.
 Let type be the result of calling generate_type(e.type).
 Let e.estimator be the estimator expression in the literal. If the estimator expression is not specified, a default estimator value is used.
 Let estimator be the result of calling generate_expr(e.estimator, null, dependent).
 Let e.variable be the data source variable (ID) in the literal. If the data source variable is not specified, the default input is used.
 Let v be the result of calling create_var( ).
 Generate the result definition (def) using the following Java code, and generate the result reference (ref) as <<v>>:
 PmlParameter <<v>>=uv_<<e.variable>>.parameter(<<e.name>>, <<type>>, <<estimator>>);
Look literals are only used inside the Look expression, and code generation for a Look literal using the information in the containing Look expression. The following text provides an example.
 Let e.period be the first operand (look period) in the containing Look expression, and let period be the results of calling generate_expr(e.period, null, dependent).

Let e.min be the second operand (minimum bound of the anchoring time) in the containing Look expression, and let min be the results of calling generate_expr(e.min, null, dependent).

Let e.max be the operand, if it exists, after the option .. operator (maximum bound of the anchoring time) in the containing Look expression, and let max be the results of calling generate_expr(e.min, null, dependent).

Let e.cond be the last operand (condition) in the containing Look expression, let type be the data type of e.cond, and let cond be the results of calling generate_expr (e.con, null, dependent).

Let v be the result of calling create_var( ).

If the literal is look.duration, the result is period.

If the literal is look.start, and the containing Look expression has the optional e.max, generate the definition (def) using the following Java code:
PmlLookTime <<v>>=PmlLookTime.fromMs (<<period.ref>>.getMs( ), <<min.ref>>. getMs( )<<max.ref>>.getMs( );

If the literal is look.end and the containing Look expression has the optional e.max, generate the definition (def) using the following Java code:
PmlLookTime <<v>>=PmlLookTime.fromMs (<<period.ref>>.getMs( ), <<period.ref>>.getMs( )<<min.ref>>.getMs( )<<period.ref>>.getMs( ), <<max.ref>>.getMs( )<<period.ref>>.getMs( );

If the literal is look.start and the containing Look expression does not have the optional e.max, generate the definition (def) using the following Java code:
PmlTime <<v>>=PmlLookTime.fromMs (<<min.ref>>.getMs( ));

If the literal is look.end and the containing Look expression does not have the optional e.max, generate the definition (def) using the following Java code:
PmlTime <<v>>= PmlTime.fromMs(<<min.ref>>.getMs( )<<period.ref>>.getMs( ));

Generate the result reference (ref) as <<v>>.

Additional procedures are also used to generate Java code. For example, the procedure create_var( ) returns a String by performing the following operations: increase m.vc by 1 and return gv_<<m.vc>>. The procedure generate_op(operator) convers the String representation of an operator (e.g., +, as a non-limiting example) to the enumeration code in the Java PmlOp.Operator enum code (e.g., PmlOp.Operator.PLUS).

The procedure generate_type(type) returns a string. The following text provides an example.

Let name be the name of the type.

If type is an enum, let packagePath be the package qualified name in the PML file containing the enum definition.

Generate the Java code pml.user.<<packagePath>>.<<name>>.

If type is not an enum type, generate the Java code Pml<<name>>.

The procedure generate_aargs(args, dependent) returns a pair of strings: definition (def) and reference (ref). The following text provides an example.

Let gargs be the list of the result of calling generate_expr (arg, null, dependent) for each arg in args.

Generate the definition (def) as the concatenation of <<garg.def>>> for each garg in gargs.

Generate the reference (ref) as the concatenation of <<gargs.ref>> for all gargs separated by comma.

The procedure generate_atargs(atargs, dependent) returns a string. For each type argument targ in e.targs, if this is not the first type argument in targs, generate a comma as a separator, let gtype be the result of calling generate_type (targ), and generate the Java code <<otype>>.class.

In a particular implementation, a supporting framework is used to support the PML language. The supporting framework includes Java classes for implementing built-in PML data types. For example, for each built-in PML data type with name name, a Java class pml.lang.<<name>> is provided. In a particular implementation, the Java class supports parsing a value from text representation, formatting a value to text representation, casting a value of a compatible value to this type, comparing two values for all Scalar types, supporting all fields and methods exposed to PML users, and supporting additional fields and methods used by the generated code. Additionally, or alternatively, the supporting framework includes a Java class implementing common built-in PML functions, such as mathematical functions, using static Java methods.

In a particular implementation, the supporting framework includes a Java class implementing PML operations using static Java methods. The operations include arithmetic operands on a list of PML objects with a list of specific operators separating them, using the Java code PmlAny merge(Class target, PmlAny[ ] operands, PmlOp.Operator[ ] operators). The operations include comparisons of a list of PML objects with a list of specific operators separating them using the Java code PmlAny compare(Class target, PmlAny[ ] operands, PmlOp.Operator[ ], operators). The operations include Boolean disjunctions or TimePredicate unions using the Java code PmlAny or(Class target, PmlAny[ ], operands). The operations further include Boolean conjunctions or TimePredicate intersections using the Java code PmlAny and(Class target, PmlAny[ ] operands).

In a particular implementation, the supporting framework includes a set of Java classes for loading different formats of flight sensor data. In this implementation, all loaders are configurable via an external XML file. Additionally, in this implementation, all loaders are managed by a ConfigManager Java class, and each loader can be accessed by name.

In a particular implementation, the supporting framework includes a set of Java classes implementing the PML runtime-engine core logic. The set of Java classes include a single file runtime-engine, which invokes the init and the run methods of the generated class from any PML file on a single local file. The set of Java classes include a single remote platform file runtime-engine, which invokes the init and the run methods for the generated class from any PML file on a single remote platform file in the local machine. In a particular implementation, the remote platform is a Hadoop Distributed File System (HDFS). The set of Java classes include a batch file runtime-engine, which invokes the init method of the generated class from any PML file before loading any data, and then invokes the run method for each file in a list of local files under a given directory. The set of Java classes include a batch file remote platform runtime-engine, which invokes the init method of the generated class from any PML file before loading any data, and then invokes the run method for each file in a list of remote platform files in the local machine. The above-described engines support command line arguments to specify the loader by name, as well as methods to extract airline operator, aircraft identifier, and flight leg number from the flight sensor data. The above described batch engines support command line arguments to specify root directory, recursion flag, minimum and maximum index, file path/name inclusion/exclusion pattern/ string, and time-based filtering. For each engine, a corresponding GUI based application can be provided to enable the PML user to specify the command line arguments in a user-friendly way, such as via display of explanations and selectable options, as compared to entering each command line argument into a command line. In a particular implementation, the set of Java classes further include a remote Map-Reduce batch runtime-engine configured to package PML generated code with all supporting libraries, to upload them to a remote platform system (and incrementally update the package when PML logic changes), to submit a Map-Reduce job to run the PML logic on a list of remote platform files in the remote machine, and to download execution results and logs back to the local system. In this implementation, the engine supports command line arguments to specify the remote platform system and user account, as well as extra options and libraries to be passed to the remote system. In this implementation, in this engine, a FileInputFormat is used to loop through remote platform files from a root director, filtering out remote platform files per command line arguments. Further, in this implementation, in this engine, the Mapper setup invokes the init method of the generated code for the given PML file.

Figure 41:
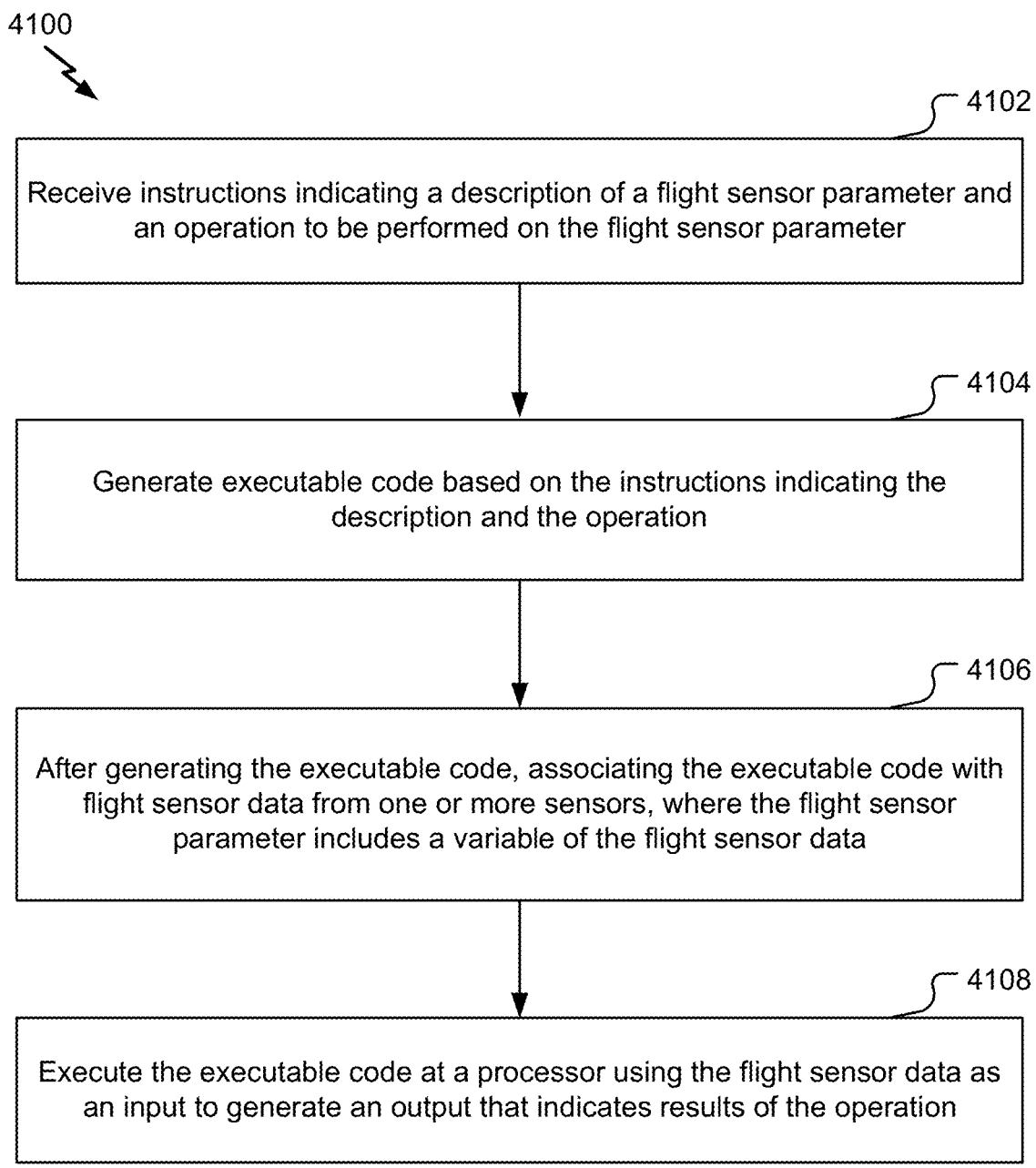
FIG. 41 is a flow chart of an example of a method of generating and executing executable code for analyzing flight sensor data.

FIG. 41 illustrates a method 4100 of generating and executing executable code for analyzing flight sensor data. In a particular implementation, the method 4100 is performed by the computing device 104 (e.g., by the processor 110).

The method 4100 includes receiving instructions indicating a description of a flight sensor parameter and an operation to be performed on the flight sensor parameter, at 4102. For example, the processor 110 receives the PML instructions 126 that include the description 128 and the operation 130 to be performed on the sensor parameter 122.

The method 4100 includes generating executable code based on the instructions indicating the description and the operation, at 4104. For example, the processor 110 generates the executable code 132 based on the PML instructions 126.

The method 4100 includes, after generating the executable code, associating the executable code with flight sensor data from one or more sensors, at 4106. The flight sensor parameter includes a variable of the flight sensor data. For example, the processor 110 associates the executable code 132 with the flight sensor data 120 (including the sensor parameter 122). The executable code 132 can be associated with the flight sensor data 120 by a user specifying loaders to be used to load the flight sensor data 120.

The method 4100 further includes executing the executable code at a processor using the flight sensor data as an input to generate an output that indicates results of the operation, at 4108. For example, the processor 110 executes the executable code 132 using the flight sensor data 120 as an input to perform the operation 130 on the sensor parameter 122. The output 138 includes results of performing the operation 130 (via execution of the executable code 132).

In a particular implementation, the flight sensor parameter is formatted as time-value pairs. For example, the sensor parameter 122 is sampled at a sampling rate, and values of the sensor parameter 122 and sample times can be stored as time-value pairs.

In a particular implementation, the operation includes a comparison of the flight sensor parameter to a threshold. For example, the operation 130 includes a comparison of the sensor parameter 122 to the threshold 140. The comparison generates a TimePredicate that indicates time periods when the threshold 140 is satisfied, as described with reference to FIG. 2. Using a single operation to compare the sensor parameter 122 to the threshold 140 enables faster and easier comparisons, as compared to generating complex logic to perform the comparison. In another particular implementation, the operation includes a comparison of the flight sensor parameter to another flight sensor parameter of the flight sensor data. For example, the processor 110 compares the sensor parameter 122 to the second sensor parameter 124. The comparison generates a TimePredicate that indicates when the comparison is satisfied, such as when the value of the sensor parameter 122 is greater than the value of the second sensor parameter 124. Using a single operation to compare the sensor parameter 122 to the second sensor parameter 124 enables faster and easier comparisons, as compared to generating complex logic to perform the comparison.

In a particular implementation, executing the executable code generates a time predicate associated with the flight sensor parameter and the operation. In this implementation, the operation includes a comparison, and the time predicate indicates one or more time periods during which the comparison is true or a particular value indicating the comparison is always true or never true. For example, if the operation 130 includes a comparison, such as to the threshold 140, generating the executable code 132 generates a TimePredicate that indicates time periods that the comparison is satisfied, as further described with reference to FIG. 2. If the comparison is always satisfied, the TimePredicate has a particular value "ALWAYS", and if the comparison is never satisfied, the TimePredicate has a particular value "NEVER". Use of TimePredicates enables straightforward comparisons of sensor parameters to thresholds or to other sensor comparisons, and the resulting output (e.g., the TimePredicate) can be easily displayable, such as via the GUI 150.

In a particular implementation, the instructions indicating the description and the operation are in a first programming language, and the executable code is in a second programming language that is different than the first programming language. For example, the PML instructions 126 are in PML, and the executable code is a second programming language that is different than PML. In a particular implementation, the second programming language is Java. In other implementations, the executable code is in a different programming language, such as Python. Because PML is designed to enable high level sensor manipulations without the need to specify low level senor data loading and management operations, PML can be used by engineers or data scientists that do not have a background in computer programming.

In a particular implementation, the method 4100 further includes generating training data based on the output and the flight sensor data and training a machine learning classifier using the training data to configure the machine learning classifier to predict a fault state associated with an aircraft. For example, the output 138 can indicate times when a fault occurs (based on results of operations included in the PML instructions 126). Thus, the output 138 can be used to label the flight sensor data 120, or a portion thereof (e.g., as corresponding to a fault state or corresponding to a normal state), and the labeled training data can be used as supervised training data to train the machine learning classifier 144 to detect a fault state associated with an aircraft, as described with reference to FIG. 1. Using the machine learning classifier 144 to predict a fault of the aircraft can cause repairs to be initiated before a fault occurs, which can reduce downtime of the aircraft due to occurrence of a fault.

In a particular implementation, the operation includes a look expression, and the output further indicates whether the flight sensor parameter has a particular value during a particular time period indicated as an input to the look expression. For example, the operation 130 includes a look expression, and the output 138 indicates whether the sensor parameter 122 has a particular value (indicated by an input of the look expression) during a particular time period (indicated by another input to the look expression), as further described with reference to FIG. 10. By using the look expression, a user can perform a comparison on a particular time period of a sensor parameter using a single operation instead of having to code more complex logic to perform the comparison.

In a particular implementation, the operation includes a filter expression, and the output further indicates a list of time periods during which the flight sensor parameter has one or more particular values allowed by the filter expression. For example, the operation 130 can include a filter operation that filters out values that do not have allowed values (as indicated by an input to the filter expression), as further described with reference to FIG. 12. By using the filter expression, a user can perform a complex filtering operation using a single operation, instead of having to code more complex logic to perform the filtering operation.

In a particular implementation, the operation includes an aggregation expression, and the output further indicates an aggregation of multiple flight sensor parameters indicated as inputs to the aggregation expression. For example, the operation 130 can include an aggregation operation that aggregates Boolean values or TimePredicate values together into a single value, as further described with reference to FIG. 13. By using the aggregation expression, a user can perform a complex aggregation operation using a single operation, instead of having to code more complex logic to perform the aggregation operation.

In a particular implementation, the operation includes a Boolean expression, and the output further indicates a Boolean combination of inputs to the Boolean expression. For example, the operation 130 can include a Boolean expression that performs a Boolean combination (e.g., an AND expression or an OR expression) on multiple inputs, as described with reference to FIG. 10. By using the Boolean expression, a user can perform a Boolean operation using a single operation.

In a particular implementation, the operation includes an arithmetic expression, and the output further indicates an arithmetic operation result of an arithmetic operation performed on inputs of the arithmetic expression. For example, the operation 130 can include an arithmetic operation (e.g., an AddSubtract operation or a MulDivMod operation) performed on multiple inputs, as described with reference to FIG. 11.

In a particular implementation, the operation includes an invocation expression, and the output further indicates an invocation result of a function indicated as an input to the invocation expression. For example, the operation 130 can include an invocation expression (e.g., a call expression) that invokes or calls another function, as described with reference to FIG. 12. By using the invocation expression, a user can perform a function using a single expression.

In a particular implementation, the method 4100 further includes executing the executable code with second flight sensor data as input to generate a second output that indicates the results of the operation. The second flight sensor data is included in a file that has a different file type than a file that includes the flight sensor data. For example, the executable code 132 can be generated on the second sensor data 142. In a particular implementation, the second sensor data 142 is included in a file that has a different type than the flight sensor data 120. Because the executable code 132 is agnostic to the file type, the executable code 132 can be executed on both files, which improves the utility of the executable code 132 as compared to executable code that can only be executed on a particular file type.

The method 4100 enables description and manipulation of flight sensor parameters using fewer instructions (e.g., using single instructions to perform operations instead of multiple instructions to perform the same operations). Thus, the amount of debugging time and resources are reduced and the development speed of the code is improved.

In some implementations, the method 300 of FIG. 3, the method 4100 of FIG. 41, or both, are embodied as instructions stored on a computer-readable storage device. In a particular implementation, a computer-readable storage device stores instructions that, when executed by a processor, cause the processor to perform operations including receiving instructions indicating a description of a flight sensor parameter and an operation to be performed on the flight sensor parameter. The operations include generating executable code based on the instructions indicating the description and the operation. The operations include, after generating the executable code, associating the executable code with flight sensor data from one or more sensors. The flight sensor parameter includes a variable of the flight sensor data. The operations further include executing the executable code using the flight sensor data as input to generate an output that indicates results of the operation.

In a particular implementation, the operation includes a comparison of the flight sensor parameter to a threshold or to another flight sensor parameter of the flight sensor data. For example, the sensor parameter 122 can be compared to threshold 140 or the second sensor parameter 124 using the operation 130.

Figure 42:
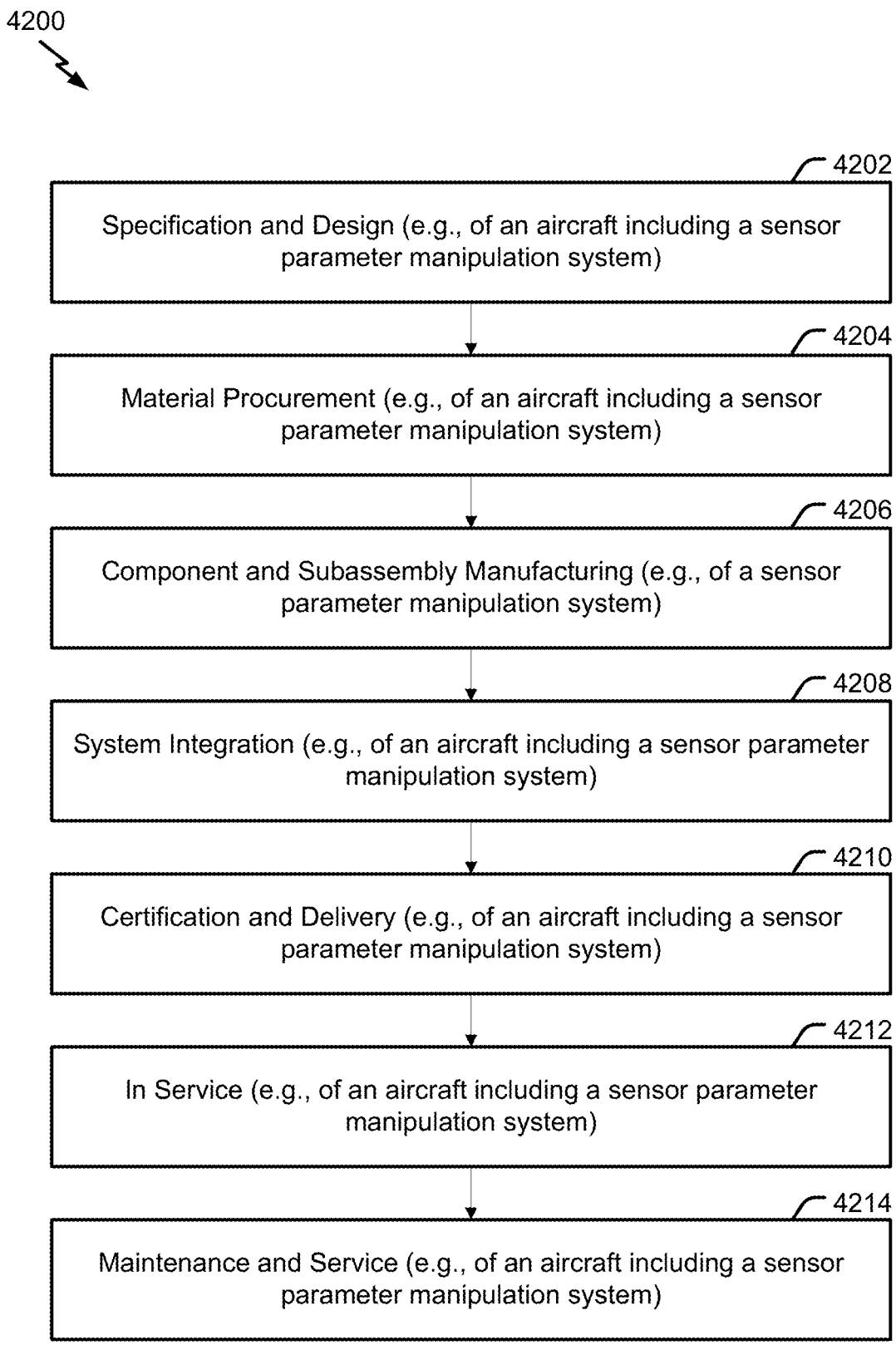
FIG. 42 is a flow chart of a method associated with a parameter manipulation system.
Figure 43:
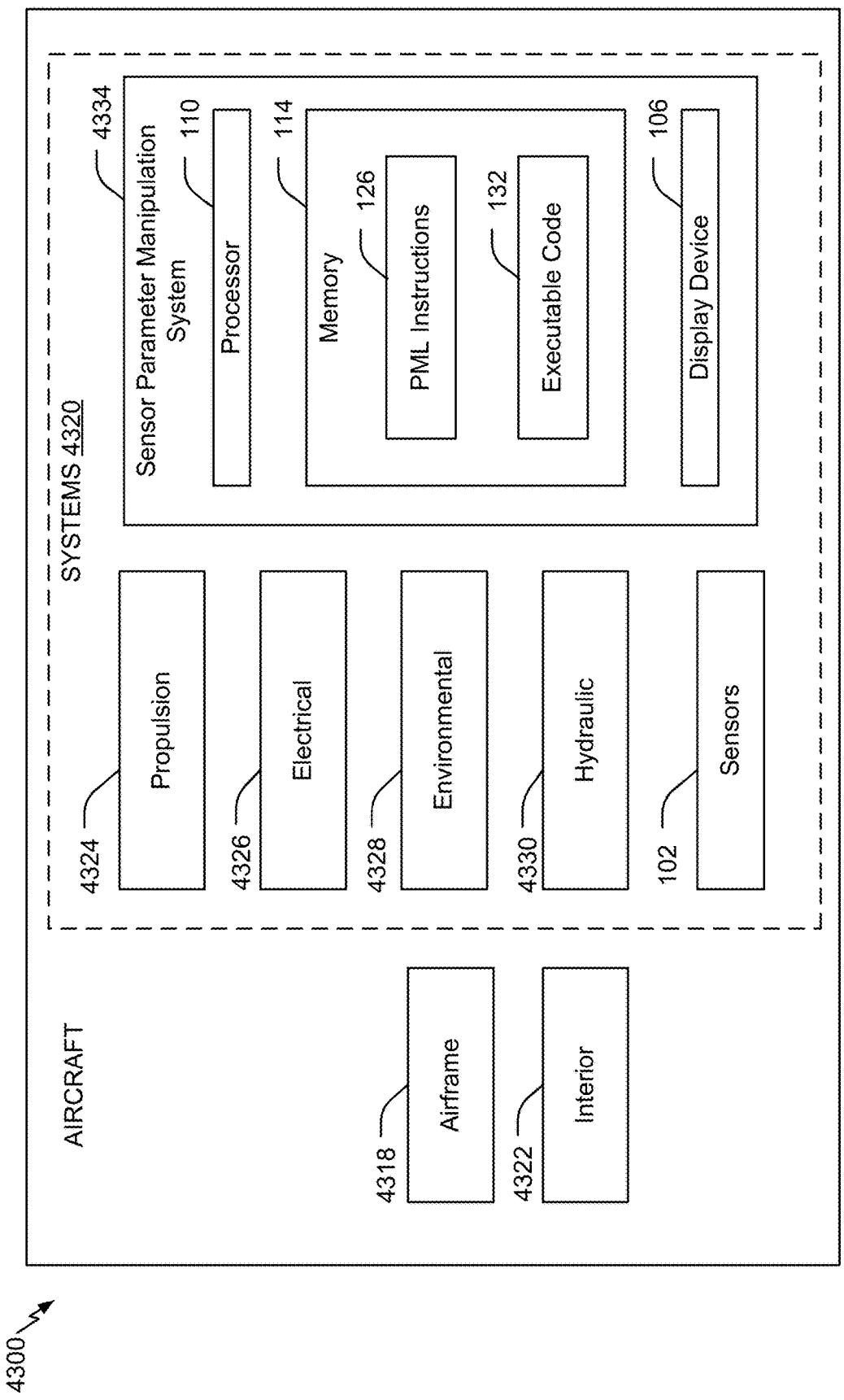
FIG. 43 is a block diagram of an aircraft including a parameter manipulation system.

Referring to FIGS. 42 and 43, examples of the disclosure are described in the context of a vehicle manufacturing and service method 4200 as illustrated by the flow chart of FIG. 42 and a vehicle system 4300 as illustrated by the block diagram of FIG. 43. A vehicle produced by the vehicle manufacturing and service method 4200 of FIG. 42 and a vehicle 4300 of FIG. 43 may include aircraft, an automobile, a train, a motorcycle, a bus, a ship or boat, a rocket, a spacecraft, an autonomous vehicle, or another vehicle, as illustrative, non-limiting examples.

Referring to FIG. 42, a flowchart of an illustrative example of a method associated with a parameter manipulation system is shown and designated 4200. During pre-production, the exemplary method 4200 includes, at 4202, specification and design of a vehicle, such as the vehicle 4300 described with reference to FIG. 43. During the specification and design of the vehicle, the method 4200 includes specifying one or more sensors, a processor, a memory, a display device, or a combination thereof. In a particular implementation, the one or more sensors, the processor, the memory, and the display device include or correspond to the sensors 102, the processor 110, the memory 114, and the display device 106, respectively, of FIG. 1. At 4204, the method 4200 includes material procurement. For example, the method 4200 may include procuring materials (such as the one or more sensors, the processor, the memory, the display device, or a combination thereof) for the parameter manipulation system.

During production, the method 4200 includes, at 4206, component and subassembly manufacturing and, at 4208, system integration of the vehicle. In a particular implementation, the method 4200 includes component and subassembly manufacturing (e.g., producing the one or more sensors, the processor, the memory, the display device, or a combination thereof) of the parameter manipulation system and system integration (e.g., coupling the one or more sensors to the processor) of the parameter manipulation system. At 4210, the method 4200 includes certification and delivery of the vehicle and, at 4212, placing the vehicle in service. In some implementations, certification and delivery includes certifying the parameter manipulation system. Placing the vehicle in service can also include placing the parameter manipulation system in service. While in service by a customer, the vehicle may be scheduled for routine maintenance and service (which can also include modification, reconfiguration, refurbishment, and so on). At 4214, the method 4200 includes performing maintenance and service on the vehicle. In a particular implementation, the method 4200 includes performing maintenance and service on the parameter manipulation system. For example, maintenance and service of the parameter manipulation system includes replacing one or more of the one or more sensors, the processor, the memory, the display device, or a combination thereof.

Each of the processes of the method 4200 are performed or carried out by a system integrator, a third party, and/or an operator (e.g., a customer). For the purposes of this description, a system integrator includes without limitation any number of vehicle manufacturers and major-system subcontractors; a third party includes without limitation any number of venders, subcontractors, and suppliers; and an operator is an airline, leasing company, military entity, service organization, and so on.

Referring to FIG. 43, a block diagram of an illustrative implementation of a vehicle that includes components of a parameter manipulation system is shown and designated 4300. In a particular implementation, the vehicle 4300 includes an aircraft. In other implementations, the vehicle 4300 includes other types of vehicles. In at least one implementation, the vehicle 4300 is produced by at least a portion of the method 4200 of FIG. 42. As shown in FIG. 43, the vehicle 4300 includes an airframe 4318 with a plurality of systems 4320 and an interior 4322. Examples of the plurality of systems 4320 include one or more of a propulsion system 4324, an electrical system 4326, an environmental system 4328, a hydraulic system 4330, and a sensor system (e.g., the sensors 102). The sensors 102 include one or more sensors onboard the vehicle 4300 and configured to generate sensor data before, during, and after operation of the vehicle 4300.

The vehicle 4300 also includes a parameter manipulation system 4334. The parameter manipulation system 4334 includes the processor 110 and the memory 114, as described with reference to FIG. 1. The processor 110 is configured to receive the PML instructions 126 and to generate and execute the executable code 132 based on sensor data from the sensors 102. The parameter manipulation system 4334 optionally includes the display device 106 (configured to display the GUI 150, as described with reference to FIG. 1).

Any number of other systems may be included in the vehicle 4300. Although an aerospace example is shown, the present disclosure can be applied to other industries. For example, the parameter manipulation system 4334 can be used onboard a manned or unmanned vehicle (such as a satellite, a watercraft, or a land-based vehicle), or in a building or other structure.

Apparatus and methods included herein can be employed during any one or more of the stages of the method 4200 of FIG. 42. For example, components or subassemblies corresponding to production process 4208 can be fabricated or manufactured in a manner similar to components or subassemblies produced while the vehicle 4300 is in service, at 4212 for example and without limitation. Also, one or more apparatus implementations, method implementations, or a combination thereof can be utilized during the production stages (e.g., stages 4202-4210 of the method 4200), for example, by substantially expediting assembly of or reducing the cost of the vehicle 4300. Similarly, one or more of apparatus implementations, method implementations, or a combination thereof can be utilized while the vehicle 4300 is in service, at for example and without limitation, to maintenance and service, at 4214.

Although one or more of FIGS. 1-43 may illustrate systems, apparatuses, and/or methods according to the teachings of the disclosure, the disclosure is not limited to these illustrated systems, apparatuses, and/or methods. One or more functions or components of any of FIGS. 1-43 as illustrated or described herein may be combined with one or more other portions of another of FIGS. 1-43. For example, one or more elements of the method 300 of FIG. 3, the methods 1400-4200 of FIGS. 14-42, or a combination thereof, may be performed in combination with one or more elements of the method 300 of FIG. 3, the methods 1400-4200 of FIGS. 14-42, any combination thereof, or with other operations described herein. Accordingly, no single implementation described herein should be construed as limiting and implementations of the disclosure may be suitably combined without departing form the teachings of the disclosure. As an example, one or more operations described with reference to FIGS. 3 and 14-42 may be optional, may be performed at least partially concurrently, and/or may be performed in a different order than shown or described.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method for performing an operation on a flight sensor parameter, the method comprising:
   receiving instructions indicating a description of the flight sensor parameter and the operation to be performed on the flight sensor parameter, wherein the operation comprises performing a comparison of the flight sensor parameter to a threshold, to another flight sensor parameter of the flight sensor data, or to a combination thereof;
   generating executable code based on the instructions indicating the description and the operation;
   after generating the executable code, associating the executable code with flight sensor data from one or more sensors, wherein the flight sensor parameter comprises a variable of the flight sensor data; and
   executing the executable code by a processor using the flight sensor data as an input to generate an output that indicates results of the operation, wherein executing the executable code generates a time predicate associated with the flight sensor parameter and the comparison, and wherein the time predicate indicates a start time and an end time for a time period during which the comparison is true.

2. The method of claim 1, wherein the flight sensor parameter is formatted as time-value pairs of measurement values and time values.

3. The method of claim 1, wherein the operation comprises a comparison of the flight sensor parameter to a threshold.

4. The method of claim 1, wherein the operation comprises a comparison of the flight sensor parameter to another flight sensor parameter of the flight sensor data.

5. The method of claim 1, wherein the time predicate comprises a static field that includes a particular value responsive to the comparison always being true for the time period.

6. The method of claim 1, wherein the instructions indicating the description and the operation are in a first programming language, and wherein the executable code is in a second programming language that is different than the first programming language.

7. The method of claim 1, further comprising:
   generating training data based on the output and the flight sensor data; and
   training a machine learning classifier using the training data to configure the machine learning classifier to predict a fault state associated with an aircraft.

8. The method of claim 1, wherein the operation comprises a look expression, and wherein the output further indicates whether the flight sensor parameter has a particular value during a particular time period indicated as an input to the look expression.

9. The method of claim 1, wherein the operation comprises a filter expression, and wherein the output further indicates a list of time periods during which the flight sensor parameter has one or more particular values allowed by the filter expression.

10. The method of claim 1, wherein the operation comprises an aggregation expression, and wherein the output further indicates an aggregation of multiple flight sensor parameters indicated as inputs to the aggregation expression.

11. The method of claim 1, wherein the operation comprises a Boolean expression, and wherein the output further indicates a Boolean combination of inputs to the Boolean expression.

12. The method of claim 1, wherein the operation comprises an arithmetic expression, and wherein the output further indicates an arithmetic operation result of an arithmetic operation performed on inputs of the arithmetic expression.

13. The method of claim 1, wherein the operation comprises an invocation expression, and wherein the output further indicates an invocation result of a function indicated as an input to the invocation expression.

14. The method of claim 1, further comprising executing the executable code with second flight sensor data as input to generate a second output that indicates second results of the operation, wherein the second flight sensor data is included in a file that has a different file type than a file that includes the flight sensor data.

15. A system for performing an operation on a flight sensor parameter, the system comprising:
   one or more sensors coupled to an aircraft and configured to generate flight sensor data;
   a processor; and
   a memory coupled to the processor and storing instructions executable by the processor to perform operations comprising:
      receiving user input indicating a description of the flight sensor parameter and the operation to be performed on the flight sensor parameter, wherein the operation comprises performing a comparison of the flight sensor parameter to a threshold, to another flight sensor parameter of the flight sensor data, or to a combination thereof;
      generating executable code based on the user input indicating the description and the operation;
      after generating the executable code, associating the executable code with the flight sensor data, wherein the flight sensor parameter comprises a variable of the flight sensor data; and
      executing the executable code using the flight sensor data as an input to generate an output that indicates results of the operation, wherein executing the executable code generates a time predicate associated with the flight sensor parameter and the comparison, and wherein the time predicate indicates a start time and an end time for a time period during which the comparison is true.

16. The system of claim 15, further comprising a display device coupled to the processor and configured to display the output.

17. The system of claim 15, wherein the one or more sensors, the processor, and the memory are integrated within the aircraft.

18. The system of claim 15, wherein the operations further comprise providing supervised training data to a machine learning classifier to configure the machine learning classifier to predict a fault state of the aircraft, and wherein the supervised training data is based on the output and the flight sensor data.

19. A non-transitory computer-readable storage medium storing instructions that, when executed by a processor, cause the processor to perform operations for performing a command on a flight sensor parameter, the operations comprising:
- receiving user input indicating a description of the flight sensor parameter and the operation to be performed on the flight sensor parameter, wherein the operation comprises performing a comparison of the flight sensor parameter to a threshold, to another flight sensor parameter of the flight sensor data, or to a combination thereof;
- generating executable code based on the user input indicating the description and the operation;
- after generating the executable code, associating the executable code with flight sensor data from one or more sensors, wherein the flight sensor parameter comprises a variable of the flight sensor data; and
- executing the executable code using the flight sensor data as input to generate an output that indicates results of the operation, wherein executing the executable code generates a time predicate associated with the flight sensor parameter and the comparison, and wherein the time predicate indicates a start time and an end time for a time period during which the comparison is true.

20. The non-transitory computer-readable storage medium of claim 19, wherein the time-predicate comprises a non-static field that indicates the start time and the end time, wherein the non-static field has a variable length depending on a number of time periods for which the comparison is true.

\* \* \* \* \*